United States Patent
Hill et al.

(10) Patent No.: US 7,485,184 B2
(45) Date of Patent: Feb. 3, 2009

(54) SACRIFICIAL AGENTS FOR FLY ASH CONCRETE

(75) Inventors: Russell Hill, San Antonio, TX (US); Carmel R. Jolicoeur, Deauville (CA); Monique Page, Brossard (CA); Ioan Spiratos, Laprairie (CA); Thi Cong To, Rock Forest (CA)

(73) Assignee: Handy Chemicals Ltd., Quebec (CA)

( * ) Notice: Subject to any disclaimer, the term of this patent is extended or adjusted under 35 U.S.C. 154(b) by 473 days.

(21) Appl. No.: 10/762,762

(22) Filed: Jan. 22, 2004

(65) Prior Publication Data

US 2004/0206276 A1 Oct. 21, 2004

Related U.S. Application Data

(60) Provisional application No. 60/442,048, filed on Jan. 24, 2003.

(51) Int. Cl.
*C04B 18/06* (2006.01)
(52) U.S. Cl. ............... 106/705; 106/742; 106/726; 106/727; 106/823; 106/DIG. 1
(58) Field of Classification Search ............... 106/724, 106/726, 727, 696, 823, 705, DIG. 1
See application file for complete search history.

(56) References Cited

U.S. PATENT DOCUMENTS

| | | | | |
|---|---|---|---|---|
| 4,257,815 A | | 3/1981 | Hauser | 106/98 |
| 4,453,978 A | * | 6/1984 | Okimura et al. | 106/DIG. 1 |
| 4,547,223 A | | 10/1985 | Goto et al. | 106/90 |
| 5,110,362 A | * | 5/1992 | Hoarty et al. | 106/708 |
| 5,326,396 A | | 7/1994 | Abdelrazig et al. | 106/808 |
| 5,326,397 A | | 7/1994 | Abdelrazig et al. | 106/808 |
| 5,389,143 A | | 2/1995 | Abdelrazig et al. | 106/696 |
| 5,556,460 A | | 9/1996 | Berke et al. | 106/823 |

(Continued)

FOREIGN PATENT DOCUMENTS

DE 19528912 2/1996

(Continued)

OTHER PUBLICATIONS

"Clean Coal Technology Glossary," Illinois Clean Coal Institute Energy Research for a Cleaner Environment, www.icci.org/glossary.html, retrieved Jan. 9, 2008.

(Continued)

*Primary Examiner*—Paul Marcantoni
(74) *Attorney, Agent, or Firm*—Fish & Richardson P.C.

(57) ABSTRACT

A method of producing cementitious mixtures containing fly ash as one of the cementitious components, under air entrainment conditions. The method involves forming a mixture comprising water, cement, fly ash, optionally other cementitious materials, aggregate, conventional chemical admixtures, and an air entrainment agent and agitating the mixture to entrain air therein. Additionally, at least one sacrificial agent is also included in the mixture. The sacrificial agent is a material or mixture of materials that is not required to act as an air entrainment agent but interacts preferentially with components of the fly ash that otherwise neutralize, repress or depress the activity of the air entrainment agent. The invention includes cementitious mixtures and hardened concretes resulting from the method and fly ash treated with sacrificial agent, or air entrainment agent/sacrificial agent combinations, and processes for selecting suitable sacrificial agents.

67 Claims, 8 Drawing Sheets

U.S. PATENT DOCUMENTS

| | | | |
|---|---|---|---|
| 5,603,760 | A | 2/1997 | Berke et al. .................. 106/802 |
| 5,604,273 | A | 2/1997 | Kerkar et al. .................. 524/4 |
| 5,622,558 | A | 4/1997 | Berke et al. .................. 406/802 |
| 5,654,352 | A * | 8/1997 | MacDonald .................. 524/18 |
| 5,938,835 | A | 8/1999 | Shawl et al. .................. 106/724 |
| 6,136,089 | A | 10/2000 | Hurt et al. .................. 106/705 |
| 6,166,119 | A | 12/2000 | Matsuo et al. .................. 524/376 |
| 6,277,189 | B1 * | 8/2001 | Chugh .................. 106/705 |
| 6,599,358 | B1 * | 7/2003 | Boggs .................. 106/705 |
| 6,626,663 | B1 | 9/2003 | Zhu .................. 432/120 |
| 6,670,415 | B2 | 12/2003 | Jardine et al. .................. 524/445 |
| 6,706,111 | B1 | 3/2004 | Young .................. 106/705 |
| 6,712,900 | B2 | 3/2004 | Wombacher et al. .................. 106/823 |
| 6,875,266 | B1 * | 4/2005 | Naji et al. .................. 106/724 |
| 2004/0129180 | A1 | 7/2004 | Boggs .................. 106/705 |
| 2004/0144287 | A1 | 7/2004 | Tardif et al. .................. 106/705 |
| 2004/0200389 | A1 * | 10/2004 | Young .................. 106/705 |

FOREIGN PATENT DOCUMENTS

| | | |
|---|---|---|
| GB | 2292141 | 2/1996 |
| JP | 56-22665 | 3/1981 |
| JP | 56022665 | 3/1981 |
| JP | 05024900 | 2/1993 |
| JP | 08337449 | 12/1996 |
| JP | 2002234763 | 8/2002 |
| WO | WO 85/01500 | 4/1985 |

OTHER PUBLICATIONS

"Definition of Fly Ash," Britannica Online Encyclopedia, http://www.britannica.com/dictionary?book=Dictionary&va=fly%20ash&query=fly%20ash, retrieved Jan. 9, 2008.

"Glossary of Environmental Terms," San Bernardino Country Fire Department, Hazardous Materials Division, www.sbcfire.org/hazmat/env_terms.asp, updated Oct. 1, 2001, retrieved Jan. 10, 2008.

"Terms of Environment: Glossary, Abbreviations, and Acronyms," U.S. Environmental Protection Agency, www.epa.gov/OCEPAterms/fterms.html, updated Oct. 2, 2006, retrieved Jan. 10, 2008.

"Air entraining agent for concrete-comprises an anionic surfactant and a glycol ether," Section Ch, Week 198117, Derwent Publications Ltd., London, GB, 1981.

Berke et al., "Improving concrete performance with shrinkage-reducing admixtures," *ACI*, SP-217-3, 2003.

Ribeiro et al., "Effectiveness of shrinkage-reducing admixtures on different concrete mixtures," *ACI*, SP-217, 2003.

Roncero et al., "Evaluation of the influence of a shrinkage reducing admixture on the microstructure and long-term behavior of concrete," *Proc. Seventh CANMET/ACI Intnl. Conf. on Superplasticizers and Other Chemical Admixtures in Concrete (Berlin)*, Supplementary papers, 207-226, 2003.

Shoya et al., "Improvement of drying shrinkage and shrinkage cracking of concrete by special surfactants," *Proceedings of the International RILEM Symposium*, May 14-17, 484-495, 1990.

* cited by examiner

SACRIFICIAL AGENTS FOR FLY ASH CONCRETE

CROSS-REFERENCE TO RELATED APPLICATIONS

This application is related to commonly owned provisional application Ser. No. 60/442,048, filed Jan. 24, 2003, and claims the benefit of the earlier filing date of this application under 35 U.S.C. § 119(e). The disclosure of provisional application Ser. No. 60/442,048 is incorporated hereby by reference in its entirety.

BACKGROUND OF THE INVENTION

I. Field of the Invention

This invention relates to the use of sacrificial agents in fly ash concrete and similar cementitious mixtures, and to the resulting mixtures and compositions. More particularly, the invention relates to sacrificial agents that reduce or eliminate detrimental effects of fly ash on the air entrainment properties of fresh concrete and similar mixtures.

II. Background Art

The partial replacement of portland cement by fly ash is growing rapidly, driven simultaneously by more demanding performance specifications on the properties of concrete and by increasing environmental pressures to reduce portland cement consumption. Fly ash can impart many beneficial properties to concrete such as improved rheology, reduced permeability and increased later-age strength; however, it also may have a negative influence on bleed characteristics, setting time and early strength development. Many of these issues can be managed by adjusting mixture proportions and materials, and by altering concrete placement and finishing practices. However, other challenging problems encountered when using certain fly ash are not always easily resolved. The most important difficulties experienced when using fly ash are most often related to air entrainment in concrete.

Air entrained concrete has been utilized in the United States since the 1930's. Air is purposely entrained in concrete, mortars and grouts as a protective measure against expansive forces that can develop in the cement paste associated with an increase in volume resulting from water freezing and converting to ice. Adequately distributed microscopic air voids provide a means for relieving internal pressures and ensuring concrete durability and long term performance in freezing and thawing environments. Air volumes (volume fraction) sufficient to provide protective air void systems are commonly specified by Building Codes and Standard Design Practices for concrete which may be exposed to freezing and thawing environments. Entrained air is to be distinguished from entrapped air (air that may develop in concrete systems as a result of mixing or the additions of certain chemicals). Entrained air provides an air void system capable of protecting against freeze/thaw cycles, while entrapped air provide no protection against such phenomena.

Air is also often purposely entrained in concrete and other cementitious systems because of the properties it can impart to the fresh mixtures. These can include: improved fluidity, cohesiveness, improved workability and reduce bleeding.

The air void systems are generated in concrete, mortar, or paste mixtures by introducing air entrainment admixtures (referred to as air entrainment agents or air-entraining agents) which are a class of specialty surfactants. When using fly ash, the difficulties in producing air-entrained concrete are related to the disruptive influence that some fly ashes have on the generation of sufficient air volumes and adequate air void systems. The primary influencing factor is the occurrence of residual carbon, or carbonaceous materials (hereafter designated as fly ash-carbon), which can be detected as a discrete phase in the fly ash, or can be intimately bound to the fly ash particles. Detrimental effects on air entrainment by other fly ash components may also occur, and indeed air entrainment problems are sometimes encountered with fly ash containing very low amounts of residual carbon.

Fly ash-carbon, a residue of incomplete coal or other hydrocarbon combustion, is in many ways similar to an 'activated carbon'; as typical of the latter, fly ash-carbon can adsorb organic molecules in aqueous environments. In cement paste containing organic chemical admixtures, the fly ash-carbon can thus adsorb part of the admixture, interfering with the function and performance of the admixture. The consequences of this adsorption process are found to be particularly troublesome with air entrainment admixtures (air entrainment agents) which are commonly used in only very low dosages. In the presence of significant carbon contents (e.g. >2 wt %), or in the presence of low contents of highly reactive carbon or other detrimental fly ash components, the air entrainment agents may be adsorbed, interfering with the air void formation and stability; this leads to tremendous complications in obtaining and maintaining specified concrete air contents.

To minimize concrete air entrainment problems, ASTM guidelines have limited the fly ash carbon content to less than 6 wt %; other institutions such as AASHTO and State departments of transportation have more stringent limitations. Industry experience indicates that, in the case of highly active carbon (for example, high specific surface area), major interferences and problems can still be encountered, even with carbon contents lower than 1 wt %.

Furthermore, recent studies indicate that, while fly ash carbon content, as measured by loss on ignition (LOI) values, provides a primary indicator of fly ash behaviour with respect to air entrainment, it does not reliably predict the impact that a fly ash will have on air entrainment in concrete. Therefore, there currently exist no means, suitable for field quality control, capable of reliably predicting the influence that a particular fly ash sample will have on air entrainment, relative to another fly ash sample with differing LOI's, sources, or chemistries. In practice, the inability to predict fly ash behaviour translates into erratic concrete air contents, which is currently the most important problem in fly ash-containing concrete.

Variations in fly ash performance are important, not only because of their potential impact on air entrainment and resistance to freeze thaw conditions, but also because of their effects related to concrete strength. Just as concrete is designed according to Building Standards for a particular environment, specifications are also provided for physical performance requirements; a common performance requirement being compressive strength. An increase in entrained air content can result in a reduction in compressive strength of 3-6% for each additional percentage of entrained air. Obviously, variations in fly ash-carbon, which would lead to erratic variations in air contents, can have serious negative consequences on the concrete strength.

The fly ash-carbon air entrainment problem is an on-going issue that has been of concern since fly ash was first used nearly 75 years ago. Over the past ten years, these issues have been further exacerbated by regulations on environmental emissions which impose combustion conditions yielding fly ash with higher carbon contents. This situation threatens to make an increasingly larger portion of the available fly ash materials unsuitable for use in concrete. Considering the economic impact of such a trend, it is imperative to develop practical corrective schemes which will allow the use, with minimal inconvenience, of fly ash with high carbon contents (e.g., up to 10 wt %) in air-entrained concrete.

Air entrainment in fly ash-concrete may become yet more complicated by pending regulations that will require utilities to reduce current Hg emissions by 70-90%. One of the demonstrated technologies for achieving the Hg reduction is the injection of activated carbon into the flue gas stream after combustion so that volatile Hg is condensed on the high surface area carbon particles and discarded with the fly ash. Current practices are designed such that the added activated carbon is generally less than 1% by mass of the fly ash, but preliminary testing indicates this is disastrous when using the modified fly ash in air-entrained concrete.

The origin of air entrainment problems in fly ash concrete, and potential approaches to their solution, have been the subject of numerous investigations. Most of these investigations focussed on the 'physical' elimination of the carbon by either combustion processes, froth floatation, or electrostatic separation. To date, the proposed fly ash treatment approaches have found limited application due to their inherent limitations (e.g., separation techniques have limited efficiency in low carbon fly ash; secondary combustion processes are most suitable for very high carbon contents), or due to their associated costs.

"Chemical" approaches have also been proposed to alleviate carbon-related problems in concrete air entrainment, for example through the development of alternative specialty surfactants for air entrainment agents such as polyoxyethylene-sorbitan oleate as an air entrainment agents (U.S. Pat. No. 4,453,978). Various other chemical additives or fly ash chemical treatments have been proposed, namely:

- the addition of inorganic additives such as calcium oxide or magnesium oxide (U.S. Pat. No. 4,257,815); this invention prescribes the use of inorganic additives which may influence other properties of fresh mortars or concrete, for example, rate of slump loss and setting time;
- the addition of C8 fatty acid salts (U.S. Pat. No. 5,110,362); the octanoate salt is itself a surfactant, and it is said to "stabilize the entrained air and lower the rate of air loss" (claim 1 of U.S. Pat. No. 5,110,362);
- the use of a mixture of high-polymer protein, polyvinyl alcohol and soap gel (U.S. Pat. No. 5,654,352); this discloses the use of protein and polyvinyl alcohol, and optionally a colloid (for example, bentonite) to formulate air entrainment admixtures;
- treatment with ozone (U.S. Pat. No. 6,136,089); the ozone oxidizes fly ash-carbon, reducing its absorption capacity for surfactants and thus making the fly ash more suitable for use in air entrained systems.

While each of the proposed solution may have potential merit, none has found significant acceptance in the industry, either because of their complexity and cost, or because of their limited performance in actual use. For example, a clear limitation to the addition of a second surfactant (e.g., C8 fatty acid salt), to compensate for the adsorption of the air entrainment agents surfactant, simply shifts the problem to controlling air content with a combination of surfactants instead of a single one. The problem of under- or over-dosage of a surfactant mixture is then the same as the problem discussed above with conventional air entrainment agents.

Hence, no practical solution currently exists which could efficiently relieve air entrainment problems for a wide variety of fly ash materials, in ready mix facilities or in the field.

SUMMARY OF THE INVENTION

An object of the present invention is to facilitate the formation of cementitious mixtures containing fly ash, and solid products derived therefrom.

Another object of the invention is to facilitate air entrainment into such mixtures in a reliable and predictable fashion.

According to one aspect of the present invention, there is provided a method of producing an air-entraining cementitious mixture containing fly ash, comprising the steps of: forming a mixture comprising water, cement, fly ash, (and optionally other cementitious components, sand, aggregate, etc.) and an air entrainment agent (and optionally other concrete chemical admixtures); and entraining air in the mixture; wherein an amount of at least one sacrificial agent is also included in the mixture, the at least one sacrificial agent being a material that, when present in the mixture in the amount, need not itself act as an air entrainment agent and interacts preferentially with components of the fly ash that otherwise neutralize activity of the air entrainment agent, thereby permitting the air entrainment agent to function to entrain air in the mixture.

The amount of the sacrificial agent used in the cementitious mixture preferably exceeds the amount necessary to interact with all of the components of the fly ash. Thus, if the fly ash varies in content of the detrimental components from a minimum content to a maximum content according to the source or batch of the fly ash, the amount of the sacrificial agent preferably exceeds the amount necessary to interact with all of the detrimental components of the fly ash when present at their maximum content.

The sacrificial agent is preferably an aromatic organic compound bearing one or more sulfonate, carboxylate or amino group, and combinations of such groups, a glycol or glycol derivate having molecular weights of about 2000 Da or less, and any combination thereof. More preferably, the sacrificial agent is benzylamine, sodium 1-naphthoate, sodium 2-naphthalene sulfonate, sodium di-isopropyl naphthalene sulfonate, sodium cumene sulfonate, sodium di-butyl naphthalene sulfonate, ethylene glycol phenyl ether, ethylene glycol methyl ether, butoxyethanol, di-ethylene glycol butyl ether, di-propylene glycol methyl ether, polyethylene glycol and 1-phenyl 2-propylene glycol or a combination thereof. A combination of ethylene glycol phenyl ether and sodium di-isopropyl naphthalene sulfonate is particularly preferred, wherein the relative proportion of the ethylene glycol phenyl ether and the sodium di-isopropyl naphthalene sulfonate may vary in weight ratio from 1:5 to 50:1, and preferably in the range of about 1:1 to 20:1.

Even more preferably, the sacrificial agent is a compound selected from alcohols, diols, polyols, ethers, esters, carboxylic acids, carboxylic acid derivatives, aromatic sulfonates, amines, alcoholamines, amides, ammonium salts, and polyglycols, particulary those for which LogKow in the range of −3 to +2 (more preferably −2 to +2), and/or the HLB value is in the range of 5 to +20.

The total dosage of these combined sacrificial agents may vary widely. While there is no theoretical limit to the dosage of sacrificial agents (some may be added to considerable excess without detrimental effect), the practical maximum dosage would be that at which some property of the mixture, e.g. setting time, fluidity, bleeding, etc., would be affected significantly. With some sacrificial agents, this could be as high as 0.5% by weight of the cementitious material; if typically the fly ash constitutes 25 wt % of the cementitious material, the corresponding maximum dosage by wt of the fly ash would thus be 2.0%. From a cost perspective, depending on the particular sacrificial agent and other factors, the practical upper limit may commonly be in the order of 0.2% by weight of the cementitious material.

Preferably, the dosages vary from 0.01% to 0.5% by weight of cementitious materials (cement and fly ash) depending on the type and composition of the fly ash; more preferably the total dosage is in the range of 0.01% to 0.2%. In terms of the concentration of sacrificial agents relative to the fly ash, the total dosage is preferably from 0.01% to 1% by weight (wt/wt), or more preferably 0.02% to 0.5% by weight, or 0.02% to 0.2% by weight. Concentration relative to fly ash is important when the sacrificial agent is added first to the fly ash. If, typically, the fly ash is added in an amount of 30:70 by weight relative to the cement, a concentration range of 0.1% to 0.2% by weight fly ash would then translate to a range of 0.03% to 0.06% by weight of the cementitious material.

The sacrificial agent may be added to the air entrainment agent prior to mixing the air entrainment agent with the fly ash, cement and water. Alternatively, the sacrificial agent may be added to the fly ash prior to mixing the fly ash with the cement, water and the air entrainment agent. In the latter case, the sacrificial agent may be added to the fly ash by spraying a liquid containing the sacrificial agent onto the fly ash, or by blending a spray-dried solid sacrificial agent formulation with the fly ash.

Alternatively, the sacrificial agent may be added after the fly ash cement, water and conventional air entrainment agent have been mixed together.

The invention also relates to an air-entraining cementitious mixture produced by the process as described above, and a hardened mass of cementitious material produced by setting and hardening the air entrainment cementitious mixture.

According to another aspect of the invention, there is provided an air-entraining cementitious mixture containing air, water, cement, fly ash, an air entrainment agent and an amount of sacrificial agent, the sacrificial agent being a material that, when present in the mixture in the appropriate amount, does not itself act as an air entrainment agent to a substantial amount (i.e. less than 2% vol of air entrainment), but interacts preferentially with components of the fly ash that neutralize the activity of the air entrainment agent, thereby permitting the air entrainment agent to function to entrain air as if the components were not present in the fly ash.

According to another aspect of the invention, there is provided an air-entraining (air-entrained) hardened cementitious mass containing air, water, cement, fly ash, an air entrainment agent and an amount of at least one sacrificial agent, the sacrificial agent being a material that, when present in an amount in a mixture, which is a precursor of the hardened mass, does not itself act as an air entrainment agent but interacts preferentially with components of the fly ash that neutralize the activity of the air entrainment agent, thereby permitting the air entrainment agent to function to entrain air as if the components were not present in the fly ash.

According to yet another aspect of the invention, there is provided a mixture (composition) suitable for use as a component of fly ash concrete or mortar, the mixture comprising fly ash and at least one sacrificial agent, the sacrificial agent being a material that does not itself act as an air entrainment agent when mixed with cement powder, an air entrainment agent and water, but interacts preferentially with components of the fly ash that neutralize activity of the air entrainment agent, thereby permitting the air entrainment agent to function as if the components were not present in the fly ash.

According to yet another aspect of the invention, there is provided a mixture suitable for use as a component of fly ash concrete or mortar, the mixture comprising an air entrainment agent and at least one sacrificial agent, the sacrificial agent being a material that does not itself act as an air entrainment agent when mixed with cement powder and water but interacts preferentially with components of the fly ash that neutralize activity of the air entrainment agent, thereby permitting the air entrainment agent to function as if the components were not present in the fly ash.

The invention additionally relates to a mixture of sacrificial agents for use in the preparation of an air entrainment fly ash concrete, the mixture comprising a combination of ethylene glycol phenyl ether with or without the addition of sodium di-isopropyl naphthalene sulfonate and other typical air entrainment admixture surfactants.

The invention also relates to methods of selecting suitable sacrificial agents from candidate compounds.

In one form of the present invention, compounds suitable as sacrificial agents may be compounds other than aromatic carboxylic acids or salts thereof (specifically hydroxyl-substituted aromatic carboxylic acids and salts, e.g. benzoic acid, phthalic acid, isophthalic acid, terephthalic acid and their salts, or salicylic acid, m-hydroxybenzoic acid, p-hydroxybenzoic acid, and their salts (e.g. lithium salicylate)). In such a form of the invention, these compounds are specifically excluded from the scope of claim.

In another form of the present invention, compounds suitable as sacrificial agents may include aromatic carboxylic acids or salts thereof (specifically hydroxyl-substituted aromatic carboxylic acids and salts, e.g. benzoic acid, phthalic acid, isophthalic acid, terephthalic acid and their salts, or salicylic acid, m-hydroxybenzoic acid, p-hydroxybenzoic acid, and their salts (e.g. lithium salicylate)).

As noted above, the invention concerns the novel uses of selected chemical additives, labelled "sacrificial agents" to eliminate or drastically reduce air entrainment problems encountered in concrete containing fly ash. Such additives, or combinations of such additives, may be added before (e.g. in the fly ash material), during, or after the concrete mixing operation. The use of these materials has the following advantages, at least in preferred forms of the invention. They:

enable adequate levels (typically 5-8 vol %) of gas, normally air, to be entrained in concrete or other cemetitious products, with dosages of conventional air entrainment agents that are more typical of those required when no fly ash, or fly ash with low carbon content, is used;

confer predictable air entrainment behaviour onto fly ash-concrete regardless of the variability in the fly ash material, such as the source, carbon content, chemical composition;

do not interfere with cement hydration and concrete set time;

do not alter other physical and durability properties of concrete;

do not significantly alter their action in the presence of other concrete chemical admixtures, for example, water reducers, superplasticizers and set accelerators; and do not cause detrimental effects when added in excessive dosages, such as excessive air contents, extended set times, or strength reduction.

The acceptability of 'over dosage' of these sacrificial agents is a key preferred feature of the present invention, at least in its main forms, since large fluctuations in fly ash properties (carbon content, reactivity, etc.) can be accommodated by introducing a moderate excess of these sacrificial agents without causing other problems. This provides operators with a substantial trouble-free range or 'comfort zone'.

The cementitious mixtures of the present invention may contain conventional ingredients such as sand and aggregate, as well as specific known additives.

Definitions

The term "fly ash", as defined by ASTM C 618 (Coal Fly Ash or Calcined Natural Pozzolan For Use in Concrete) refers to a by product of coal combustion. However, the present invention may employ similar combustion products which are fine ashes or flue dusts resulting from co-firing various fuels with coal, or resulting from the combustion of other fuels that produce an ash having pozzolanic qualities (the ability to form a solid when mixed with water and an activator such ash lime or alkalis) or hydraulic qualities (the ability to form a solid when mixed with water and set). The ash itself has pozzolanic/hydraulic activity and can be used as a cementitious material to replace a portion of portland cement in the preparation of concrete, mortars, and the like. In general, the term fly ash as used herein includes:
1) Ash produced by co-firing fuels including industrial gases, petroleum coke, petroleum products, municipal solid waste, paper sludge, wood, sawdust, refuse derived fuels, switchgrass or other biomass material, either alone or in combination with coal.
2) Coal ash and/or alternative fuel ash plus inorganic process additions such as soda ash or trona (native sodium carbonate/bicarbonate used by utilities).
3) Coal ash and/or alternative fuel ash plus organic process additives such as activated carbon, or other carbonaceous materials, for mercury emission control.
4) Coal ash and/or alternative fuel ash plus combustion additives such as borax.
5) Coal ash and/or alternative fuel gases plus flue gas or fly ash conditioning agents such as ammonia, sulfur trioxide, phosphoric acid, etc.

The term "fly ash concrete" means concrete containing fly ash and portland cement in any proportions, but optionally additionally containing other cementitious materials such as blast furnace slag, silica fume, or fillers such as limestone, etc. The proportions in which fly ash is typically used in concrete is well known to persons skilled in the art and is often in the range of 20-40% by weight of cementitious materials and may go up to 60 to 80% in so-called High Volume Fly Ash concrete.

The term "surfactants" is also well understood in the art to mean surface active agents. These are compounds that have an affinity for both fats (hydrophobic) and water (hydrophilic) and so act as foaming agents (although some surfactants are non-foaming, e.g. phosphates), dispersants, emulsifiers, and the like, e.g. soaps.

The term "air entrainment agent" (AEA) means a material that results in a satisfactory amount of air being entrained into a cementitous mixture, e.g. 5-9 vol % air, when added to a cementitious formulation. Generally, air entrainment agents are surfactants (i.e. they reduce the surface tension when added to aqueous mixtures), and are often materials considered to be soaps.

The mode of action of air entrainment agents, and the mechanism of air void formation in cementitious mixtures are only poorly understood. Because of their influence on the surface tension of the solution phase, the surfactant molecules are believed to facilitate the formation of small air cavities or voids in the cementitious paste, by analogy to formation of air 'bubbles'. It is also believed that the wall of these voids are further stabilized through various effects, such as incorporation into the interfacial paste/air layer of insoluble calcium salts of the surfactants, or of colloidal particles (see References 1-3 at the end of this description).

The performance of surfactants as concrete air entrainment admixture depends on the composition of the surfactant: the type of hydrophilic group (cationic, anionic, zwitterionic, or non-ionic), the importance of its hydrophobic residue (number of carbon groups, molecular weight), the chemical nature of this residue (aliphatic, aromatic) and the structure of the residue (linear, branched, cyclic), and on the balance between the hydrophilic and lipophilic portions of the surfactant molecule (HLB). Cationic and non-ionic surfactants were reported to entrain more air than anionic surfactants because the latter are often precipitated as insoluble calcium salts in the paste solution; however, the stability of the air void has also been reported to be greater with anionic surfactant than with cationic or non-ionic surfactants. Typical examples of compounds used as surface active agents are sodium salts of naturally occurring fatty acid such as tall oil fatty acid, and sodium salts of synthetic n-alkylbenzene sulfonic acid. As noted in Reference 2 at the end of this description, common concrete air entrainment (or air-entraining) agents include those derived from the following anionic surfactants: neutralized wood resins, fatty acids salts, alkyl-aryl sulfonates, alkyl sulfates.

The term "sacrificial agent" (SA) means a material, or a mixture of materials, that preferentially interacts with (and/or neutralizes the detrimental effects of) components of fly ash that would otherwise interact with an air entrainment agent and reduce the effectiveness of the air entrainment agent to incorporate air (or other gas) into the cementitious mixture. The sacrificial agents, need not be 'surfactants' nor 'air entrainment agents' and, in the amounts used in the cementitious mixture, must not themselves act to entrain more than nominally 2 vol % additional air (more desirably less than 1 vol % additional air) into a similar control mixture containing no fly ash. Preferably, the sacrificial agent, in the amounts employed in fly ash-containing mixtures, is responsible for introducing substantially no air into a similar control mixture containing no fly ash. The sacrificial agent should also preferably not reduce the ability of the air entrainment agent to incorporate air (i.e. they should preferably not have a "defoaming" effect). Ideally, the sacrificial agent should preferably neither promote nor inhibit the functioning of the air entrainment agent compared with its functioning in a similar mixture containing no fly ash.

The term "cementitious mixture" means a mixture such as concrete mix, mortar, paste, grout, etc., that is still in castable form and that, upon setting, develops into a hardened mass suitable for building and construction purposes. Likewise, the term "cement" means a product (other than fly ash) that is capable of acting as the principal hardenable ingredient in a cementitious mixture. The preferred cement is, of course, portland cement, but at least a portion may include blast furnace slag, gypsum, etc.

The term "second protocol rating" means a rating awarded to a compound according to the procedure set out later in this description under the heading "SECOND PROTOCOL TO IDENTIFY ADDITIONAL SACRIFICIAL AGENTS".

The term "percent" or "%" as used herein in connection with a component of a composition means percent by weight based on the cementitious components (cement powder and fly ash) of a cementitious mixture (unless otherwise stated). When referring to air content, the term % means percent by volume or vol %.

Abbreviations

| Sacrificial agents | |
|---|---|
| Benzylamine | BA |
| Sodium isopropyl benzene sulfonate | Cumene |
| Sodium di-butyl naphthalene sulfonate | DBNS |
| Di-ethylene glycol butyl ether | Di-EGBE |
| Di-propylene glycol methyl ether | Di-PGME |
| Ethylene glycol methyl ether | EGME |
| Ethylene glycol phenyl ether | EGPE |
| 1-Naphthoic acid sodium salt | NA |
| Sodium Di-isopropopyl naphthalene sulfonate | ND |
| Sodium 2-Naphthalene sulfonate | NS |
| Polyethylene glycol (Molecular weight = 200) | PEG 200 |
| Polyethylene glycol (Molecular weight = 1500) | PEG 1500 |
| 1-Phenyl 2-propylene glycol | 1-Phe 2-Pro |
| Other | |
| Fly Ash | FA |
| portland cement A | PCA |
| portland cement C | PCC |
| Sacrificial agent | SA |
| Commercial air entrainment agents | e.g. Air 30 and Air 40 |
| Air entrainment agents or admixtures | AEA |
| relative to cementitious materials (CM) | wt % |
| Amount of air entrained | vol % |
| Average of Air Entrained | Aver (%) |
| Relative Standard Deviation | RSD (%) |
| DDBS | Sodium dodecylbenzene sulfonate |
| HLB | Hydrophilic Lipophilic Balance |
| $K_{ow}$ | Ratio of solubility in oil (octanol) and in water |
| $LogK_{ow}$ | Logarithm of $K_{ow}$ |
| LOI | Loss on ignition |

BRIEF DESCRIPTION OF THE DRAWINGS

FIGS. 4 to 7 show that, in all cases tested, the air entrained in fly ash concrete is severely reduced when the fly ash has significant loss on ignition (LOI) values. However, the level of reduction is not always related to the LOI values of the fly ash. Using the air entrainment agents in conjunction with the sacrificial agents of the invention (e.g. a combination of sodium di-isopropyl naphthalene sulfonate/ethylene glycol phenyl ether) at increasing dosage, the air entrained is enhanced to acceptable levels. When the sacrificial agent is added at excessive dosages, the air entrained levels-off at desirable practical values.

AEA (PC): air entrainment agent at fixed dosage (DDBS, 0.0125%) in a Portland cement paste AEA (FA-PC): air entrainment agent at fixed dosage (DDBS, 0.0125 wt %) in a ~50:50 fly ash:Portland cement paste 0.1% SA (PC): air entrainment by SA at 0.1% dosage in the Portland cement paste AEA+0.05% SA (FA-PC): air entrainment agent at fixed dosage (DDBS, 0.0125%) plus candidate SA at 0.05% in a 50:50 fly ash:Portland cement paste AEA+0.1% SA (FA-PC): air entrainment agent at fixed dosage (DDBS, 0.0125%) plus candidate SA at 0.1% in a 50:50 fly ash:Portland cement paste.

Figure 8:
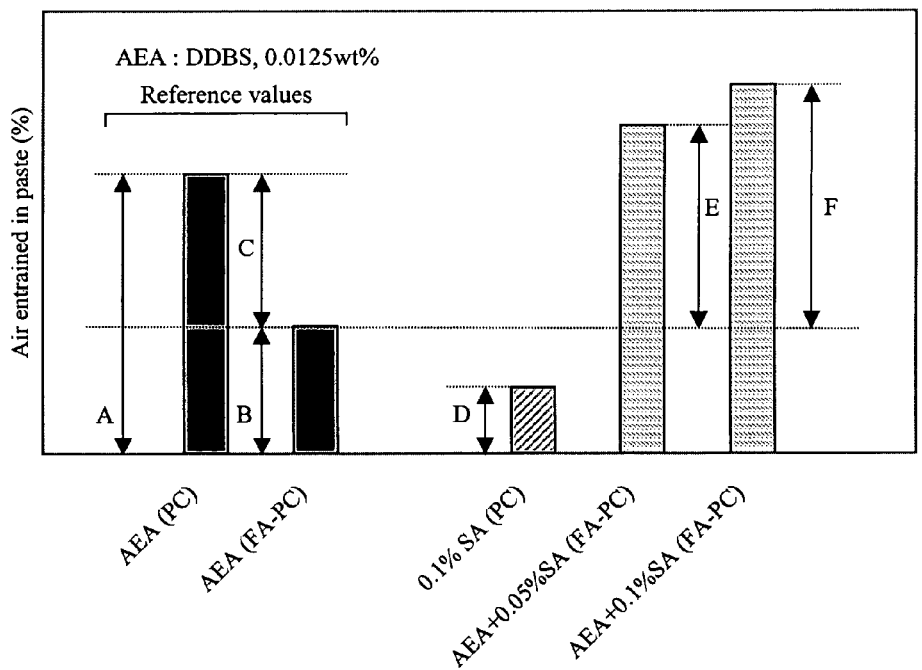
FIG. 8 is a schematic illustration of paste air results obtained by a protocol for assessment of the relative performance of candidate sacrificial agents, as described below. The entries identifying the various values are shown in abbreviated form (all dosages are expressed as wt % of cementitious materials). The abbreviation are explained as follows.
Figure 9:
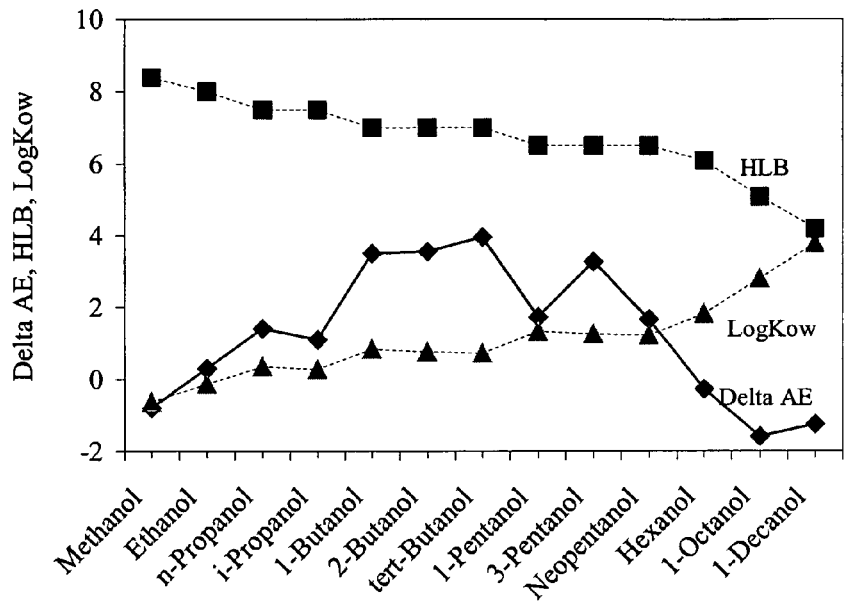

FIG. 9 is a graph showing sacrificial agent performance expressed as percentage air entrainment recovery (Delta AE) in fly ash-cement pastes (item F of FIG. 8). This data was calculated from the information in Column 4 of Table 36 below. The data is for various aliphatic alcohols and compares Delta AE with values of $LogK_{ow}$ and HLB values for these compounds.

Figure 10:
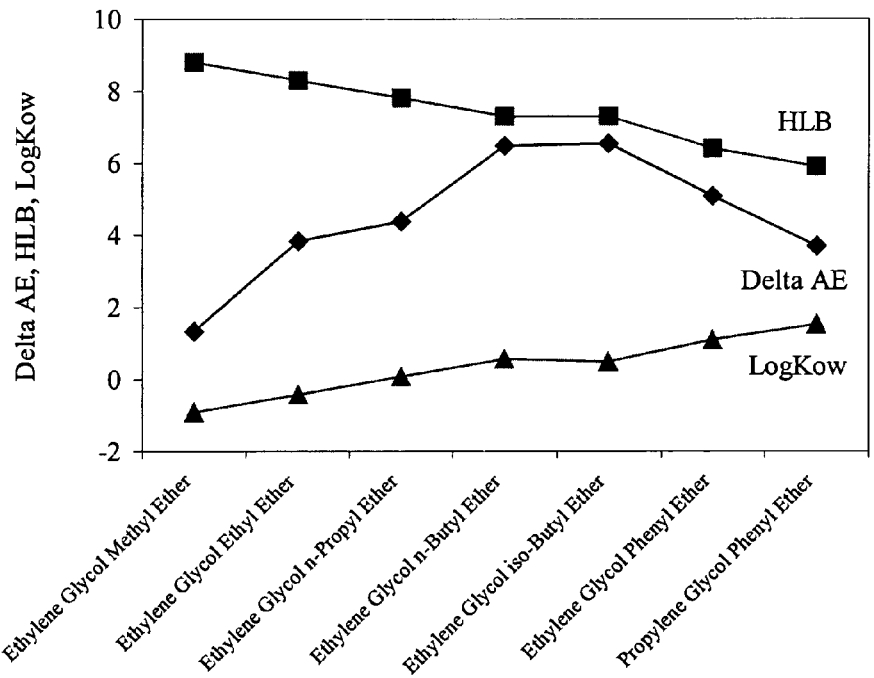

FIG. 10 is a graph showing sacrificial agent performance expressed as percentage air entrainment recovery (Delta AE) in fly ash-cement pastes (item F of FIG. 8). This data was calculated from the information in Column 4 of Table 36 below. The data is for various ethers and compares Delta AE with values of $LogK_{ow}$ and HLB values for these compounds.

Figure 11:
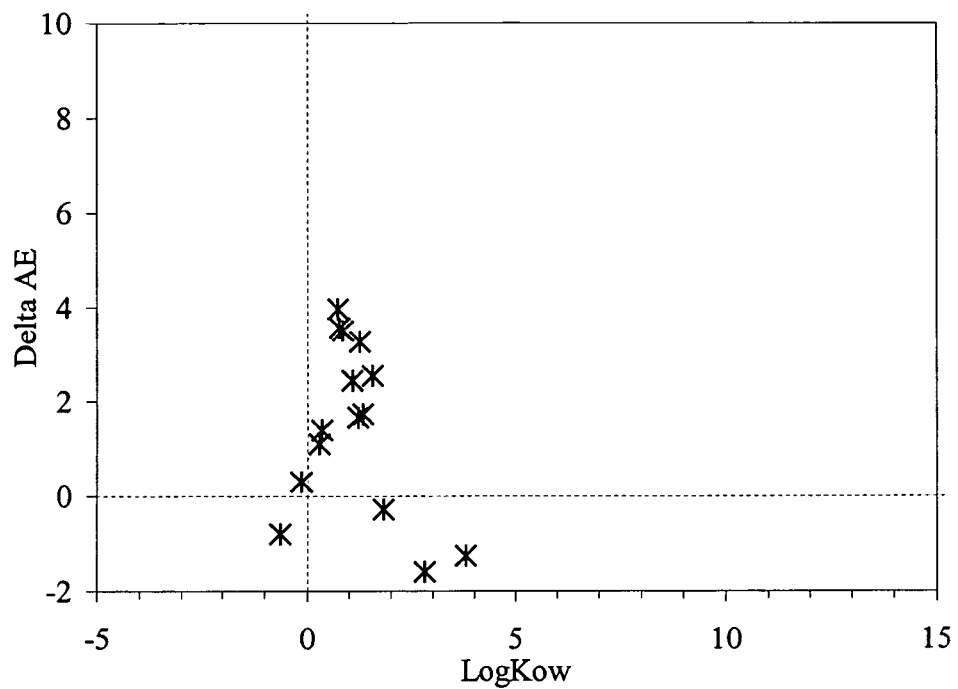

FIG. 11 is a graph showing air entrainment recovery (Delta AE) for various alcohols in fly ash-cement pastes as a function of $LogK_{ow}$ values of the alcohols.

Figure 12:
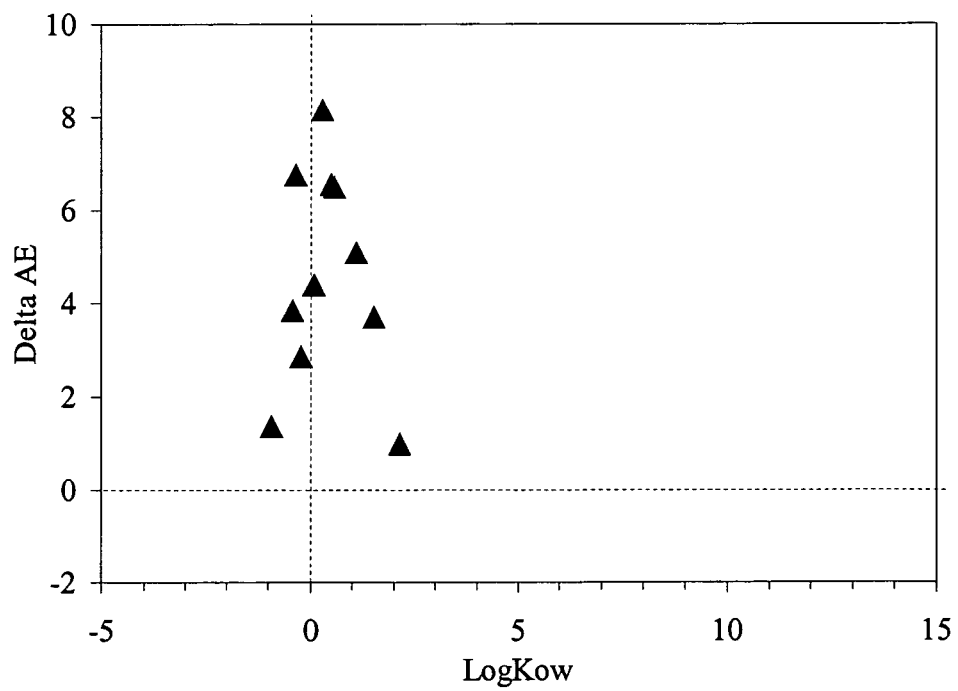

FIG. 12 is a graph showing air entrainment recovery (Delta AE) for various glycol ethers in fly ash-cement pastes as a function of $LogK_{ow}$ values of the glycol ethers.

Figure 13:
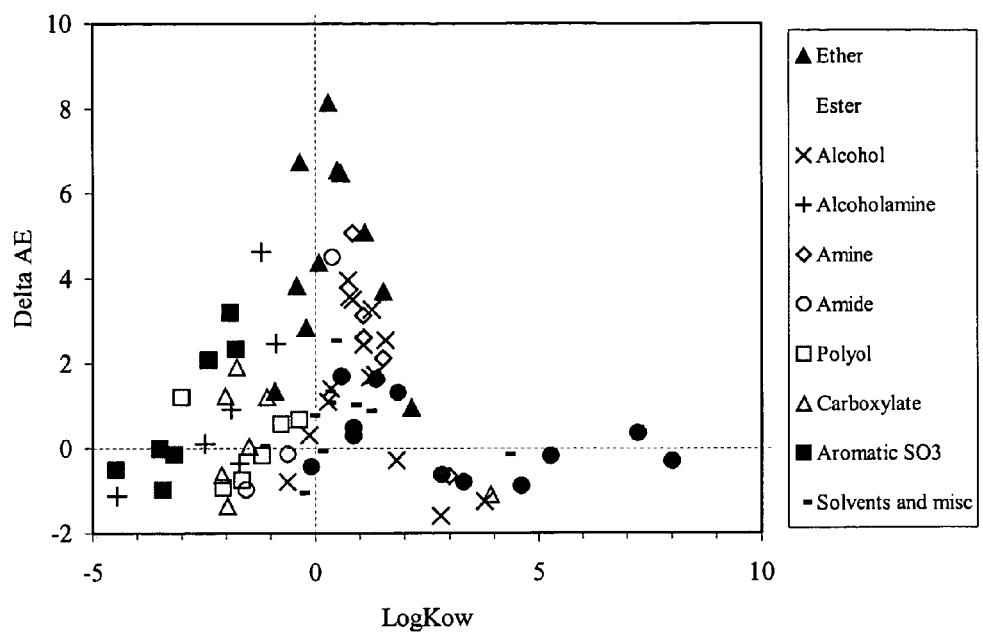

FIG. 13 is a graph showing air entrainment recovery (Delta AE) for all chemicals tested in fly ash-cement pastes, plotted against their $LogK_{ow}$ values.

Figure 14:
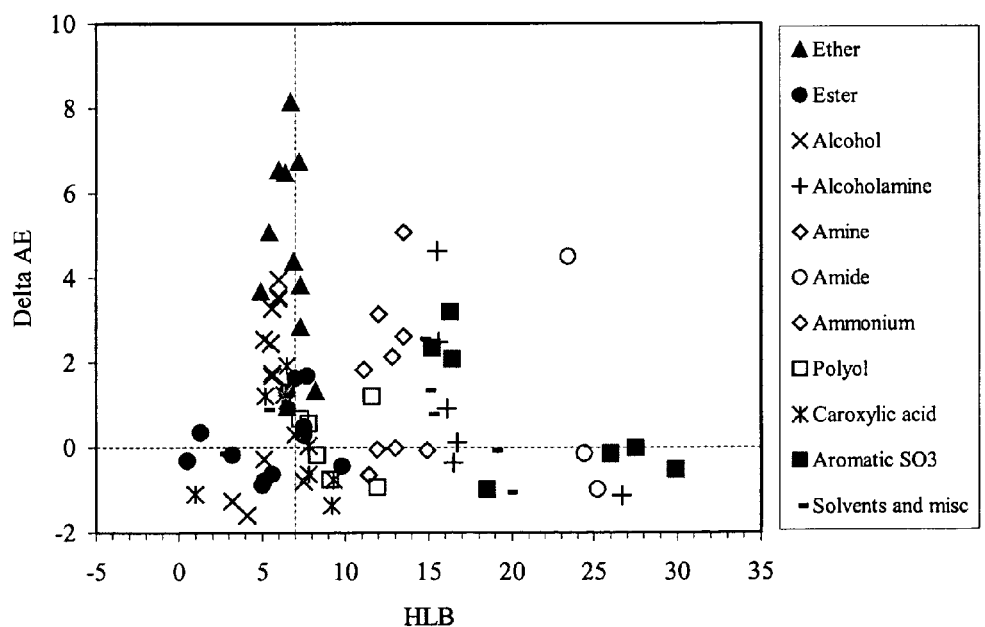

FIG. 14 is a graph showing air entrainment recovery (Delta AE) for all chemicals tested in fly ash-cement pastes, plotted against their HLB values.

Figure 15:
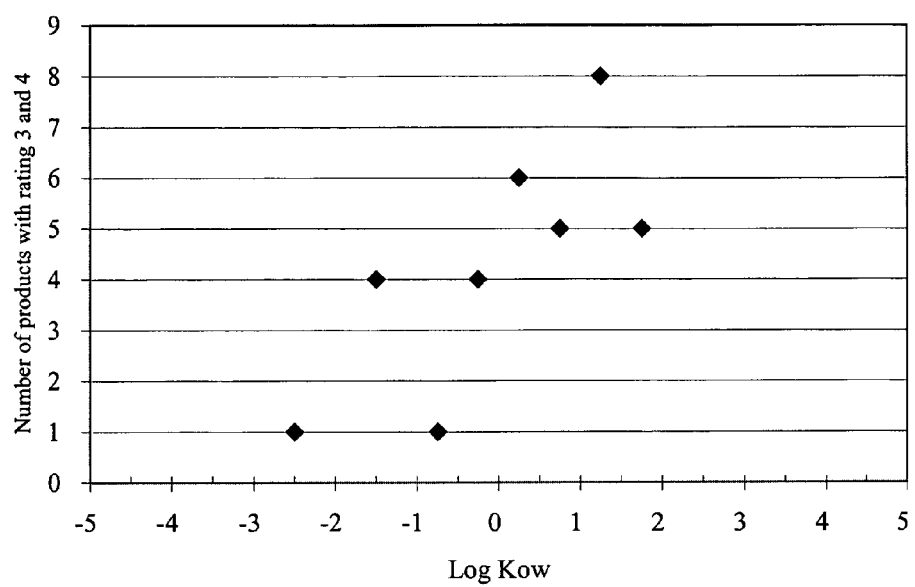

FIG. 15 is a graph showing a number of candidate sacrificial agents having high ratings (ratings of 3 or 4) over the $LogK_{ow}$ scale in consecutive ranges of 0.5 Log units.

DETAILED DESCRIPTION OF THE INVENTION

In the following description, reference is made to air entrainment in concrete and cementitious mixtures. It will be realized by persons skilled in the art that other inert gases, such as nitrogen, that act in the same way as air, can be entrained in concrete and cementitious mixtures. The use of air rather than other gases is naturally most frequently carried out for reasons of simplicity and economy. Techniques for entraining air in cementitious mixtures using air-entraining agents are well known to persons skilled in the art. Generally, when an air entrainment agent is used, sufficient air is entrained when the ingredients of the mixture are simply mixed together and agitated in conventional ways, such as stirring or tumbling sufficient to cause thorough mixing of the ingredients.

As noted earlier, air entrainment problems in fly ash concrete have been traced to undesirable components contained in the fly ash materials, particularly residual carbon. These fly ash components can adsorb and/or react or interact with the air entrainment agent (surface active compounds, e.g. soaps) used for entrainment air in concrete, thereby neutralizing or diminishing the functionality of such agents and consequently reducing the uptake of air. Up to the present, the industrial approach to dealing with these air entrainment problems consisted in adding higher dosages of the air entrainment agents in order to overwhelm the deleterious processes. Because the quantities of detrimental components in fly ash can vary greatly among fly ashes from different sources, or for a fly ash from any particular source at different times, the current practices lead to other complications, namely in assessing the adequate dosage of air entrainment agents to achieve a specified air content, in maintaining the specified air content over adequate time periods, in guarding against excessive entrained air contents that would detrimentally impact concrete strength and durability, in obtaining specified air void parameters, etc. In particular, the fact that excessive dosages of the air entrainment agent can result in excess air entrainment and subsequent reduction in concrete compressive strength, is particularly serious and a major disadvantage of the prior approach.

To address the above problems, the inventors of the present invention developed the concept of using a different class of material (i.e. something other than an air entrainment agent) to neutralize or eliminate the effect of the harmful components of fly ash on the air entrainment agent. The inventors surmised that such a material would have to act preferentially (i.e. when present at the same time as the air entrainment agent, or even after the contact of the air entrainment agent with the fly ash, they would interact with the fly ash), and that they would not themselves act to entrain air in significant amounts or to harm the setting action or properties of the cementitious material in the amounts employed. The inventors have now found certain classes of chemical compounds (additives) capable of "neutralizing" the detrimental fly ash components, while having little or no influence on the air entrainment process provided by conventional air entrainment agents and having no adverse effects on the properties of the concrete mix and hardened concrete product. Such chemical additives, referred to herein as "sacrificial agents", introduced into the mixture at an appropriate time, render fly ash concrete comparable to normal concrete with respect to air entrainment. The finding of economically viable chemical additives of this type, as well as practical processes for their introduction into concrete systems, constitutes a major advantage for fly ash concrete technologies.

In order to confirm this approach to the problem and to identify suitable additives, the inventors designed a broad research program to investigate the origins of air entrainment problems in fly ash concrete, and chemical solutions to alleviate these problems. The program comprised a broad base study on pastes, mortars and concrete containing cement only and fly ash-cement mixes, with various fly ashes exhibiting a wide range of carbon contents (represented by loss-on-ignition—LOI) values and physico-chemical properties. Extensive testing was carried out on air entrainment in fly ash concrete under standard industrial practices; the work included studies on the impact of candidate sacrificial agents, on the properties of fresh and hardened concrete, and investigations of possible interactions between these agents and other common chemical additives (admixtures) used in concrete technology. The experimental protocols and key results of this program are presented below and the same protocols may be employed to identify further sacrificial agents suitable for use in the present invention, as detailed more specifically in following sections.

For practical reasons, namely effectiveness, solubility in mixed formulations of sacrificial agents and cost, it has been found that the following classes of compounds are the most suitable, namely: alcohols, glycol ethers, polyglycols, aromatic sulfonates, esters and alcoholamines, alkyl carboxylates, and also aromatic compounds bearing sulfonate groups, carboxylate groups, amino groups or combinations of such groups, and low molecular weight glycols and glycol derivates (i.e. those having molecular weights of 2000 Da or less, preferably 1500 Da or less), and combinations of such compounds. By testing a variety of compounds as potential sacrificial agents, it has been discovered that the following compounds, in particular, are effective as sacrificial agents to varying degrees: benzylamine, sodium 1-naphthoate, sodium 2-naphthalene sulfonate, sodium di-isopropyl naphthalene sulfonate, sodium cumene sulfonate, sodium di-butyl naphthalene sulfonate, ethylene glycol phenyl ether, ethylene glycol methyl ether, butoxyethanol, di-ethylene glycol butyl ether, di-propylene glycol methyl ether, polyethylene glycol and 1-phenyl 2-propylene glycol. All of these compounds, and others mentioned later in this description, are known and commercially available from suppliers of organic chemical (e.g. from Aldrich, Rutgers, Stepan, Anachemia, Baker, BDH, Eastman, Fisher, Mallinckodt, Polysciences, Pfaltz & Bauer, TCI, etc., all of which are well known suppliers of chemicals to persons in this field of art). They are preferably used in pure or substantially pure form.

It has been found that these compounds may be used alone or in any combination. However, specific combinations are particularly effective and synergistic effects may occur with certain combinations. A particularly effective combination of sacrificial agents is ethylene glycol phenyl ether and sodium di-isopropyl naphthalene sulfonate. When combinations of sacrificial agents are employed, they may be used in any relative proportion, but the total amount employed most preferably falls within the range of 0.01 to 0.5 wt % of the cementitious components of the mixture, and more preferably 0.01 to 0.2 wt %. Because of the surfactant properties and high effectiveness of sodium di-isopropyl naphthalene sulfonate, it is preferable to keep the amount low and to use another sacrificial agent, e.g. ethylene glycol phenyl ether, to achieve an optimum activity against the harmful components of the fly ash without causing air entrainment. In such cases, the dosage of sodium di-isopropyl naphthalene sulfonate relative to ethylene glycol phenyl ether is preferably within the range of 1:20 to 1:2, respectively, by weight. In some cases, it may be advantageous to mix a sacrificial agent having different HLB values (e.g. high and low values) to produce a combined sacrificial agent mixture that is approximately neutral in its effect on the entrainment of air in the mixture. In this way, it may be possible to use highly active sacrificial agents that would otherwise interfere too much with the entrainment of air.

The amounts of such sacrificial agents should be sufficient to preferentially neutralize the harmful components of the fly ash that adsorb or react with the air entrainment agents. The required minimum dosage may be determined experimentally through air entrainment protocols since, as discussed earlier and shown below, the deleterious effects of fly ash components are not directly related to their carbon content or LOI. However, it is a particular advantage of the present invention that the sacrificial agents may be used in reasonable excess over the neutralizing amounts without entrainment of excess air (or reduction of such entrainment) or harming the concrete mixture or the subsequent setting action or properties of the hardened concrete. This means that an amount can be determined which exceeds the neutralizing amount required for a fly ash containing the highest amount of the harmful components likely to be encountered, and this amount can then be safely used with any fly ash cement mixture. Typically, as noted above, the minimum amount of sacrificial agent employed is usually about 0.01% by weight of total cementitious materials (cement and fly ash).

The sacrificial agents of the present invention may be added at any time during the preparation of the concrete mix, but are preferably added before or at the same time as the air entrainment agents so that they may interact with the fly ash before the air entrainment agents have an opportunity to do so. The mixing in this way may be carried out at ambient temperature, or at elevated or reduced temperatures if such temperatures are otherwise required for particular concrete mixes. The sacrificial agents may also be premixed with the fly ash or with the air entrainment agent.

It is particularly convenient to premix the sacrificial agent with the fly ash because the sacrificial agent may commence the interaction with the harmful components of the fly ash even before the cementitious mixture is formed. The sacrificial agent may simply be sprayed or otherwise added in liquid form onto a conventional fly ash and left to be absorbed by the fly ash and thus to dry. If necessary, the sacrificial agent may be dissolved in a volatile solvent to facilitate the spraying procedure. Fly ash treated in this way may be prepared and sold as an ingredient for forming fly ash cement and fly ash concrete.

Surprisingly, it has also been found that the sacrificial agent is even effective when added after the mixing of the other components of the cementitious mixture (including the air entrainment agent). The inventors cannot explain this observation but it appears that the sacrificial agent may reverse any preliminary deactivation of the air entrainment agent caused by contact with the fly ash, and thus reactivate the air entrainment agent for further air entrainment. It is observed, however, that the beneficial effect of the sacrificial agents is somewhat lower when added at this stage rather than when added before or during the mixing of the other components.

As noted above, an important feature of the present invention is that the chemical additives used as sacrificial agents are not required to be effective air entrainment agents in the amounts employed, so that they do not contribute directly to air entrainment and can thus also be used in normal concrete containing no fly ash. This confers on the sacrificial agents the particularly important feature that these sacrificial agents can be introduced at dosages higher than the minimum dosage required to restore normal air entrainment without leading to erratic air entrainment and excessive air entrained levels. If one of the sacrificial agents used in a combination of sacrificial agents exhibits some surfactant (air entrainment) properties, it should preferably be proportioned in such a way that the combination of sacrificial agents will entrain less than 2% air (more preferably less than 1% air, and ideally substantially no air), above the control values, in normal concrete without any fly ash. That is to say, when a concrete formulation is produced without fly ash, but with an air entrainment agent, the extra amount of air entrained when a sacrificial agent is added represents the extra air entrained by the sacrificial agent. The amount of air entrained in a cementitious mixture can be measured by determination of specific gravity of the mixture, or other methods prescribed in ASTM procedures (ASTM C231, C173, C138—the disclosures of which are incorporated herein by reference).

Typical concrete air entrainment agents are n-dodecylbenzene sulfonate salts (referred to as Air 30) and tall oil fatty acid salts (referred to as Air 40). The typical dosage range of these ingredients in portland cement concrete mixes is 0.002 to 0.008 wt % of the cementitious components, resulting in the entrainment of 6-8 vol % air.

Other essential components of the cementitous mixtures of the present invention are water, cement and fly ash. These may be used in proportions that depend on the type of material desired (e.g., pastes, grouts, mortars, concrete) and on the required fresh and hardened properties of the finished material. Such systems and their composition, as well as equipment and protocols for their preparation, are well known in the art; for mortars and concrete, these are adequately described in standard reference texts, such as ASTM Cement and Concrete (e.g., 4.01, 4.02); Design and Control of Concrete Mixtures—Portland Cement Association; and American Concrete Institute—Manual of Concrete Practice (the disclosures of which are incorporated herein by reference). For pastes, the composition and preparation equipment and protocols will be described in detail in following sections. In practice, the content of various ingredients in a cementitious mixture are often reported as weight ratios with respect to the cement or to the total cementitious materials when other cementitious materials such as fly ash, slag, etc., are present. These ratios are well known to persons skilled in the art.

Once formed, the cementitious mixture of the present invention may be used in any conventional way, e.g. poured into a form and allowed to harden and set. The hardened product will contain fly ash and entrained air, but no excess of air entrainment agent that could adversely affect the air content and properties of the hardened product.

The cementitious mixtures of the invention may include other standard or specialized concrete ingredients know to persons skilled in the art.

First Protocol to Identify Additional Sacrificial Agents

While the present disclosure mentions several classes of sacrificial agents, as well as several individual compounds, that are effective in the present invention, other compounds and classes of compounds may also be effective. To enable ready identification of such compounds and classes of compounds, the following protocol has been developed.

1. Determine the solubility of the candidate chemical in cementitious systems (alkaline fly ash slurries, or fly ash cement pastes), containing different fly ashes having various levels of the deleterious components, according to the methods described in Example 1 below; under conditions such as those pertaining to the data in Table 5 below. Chemicals with potential value as sacrificial agents should be partly soluble so that they can retain their inherent activity.
2. Determine the level of interaction/reaction between the candidate sacrificial agent with the deleterious components of the fly ash, particularly the carbon, again under conditions pertaining to the data in Table 5 below. Potentially valuable candidates will show partial adsorption onto the fly ash which contain deleterious components towards air entrainment.
3. Under conditions pertaining to the data for Tables 6-11 below:
   Evaluate the level of air entrainment by the candidate in portland cement paste; preferably the candidate should entrain low levels of air by itself (as in Table 6 below).
   Determine if the candidate sacrificial agent has interactions (interference or synergy) with typical concrete air entrainment admixtures in portland cement pastes (as in Table 8 below)
4. Suitable candidates will show little or nor air entrainment by themselves and little interference on the function and performance of the conventional air entrainment admixture.
5. Determine how effective the candidate sacrificial agent may be at reducing variability in air entrainment by a conventional AEA in fly ash—cement pastes; under conditions pertaining to the data in Tables 7-11 below, evaluate paste air entrainment in pastes containing a variety of fly ash having a wide range of properties and residual carbon. Valuable candidate SA will show both, increased air entrainment in more 'difficult' mixtures and a substantial reduction in the variability of the air entrained in the different fly ash-cement pastes (at constant fluidity); typically the relative standard deviation on entrained air values within the set of pastes should be reduced by 50% or more.
6. Under conditions pertaining to data in Tables 8-11 below, investigate potential synergy between the candidate SA and other known SA's and conventional air entrainment admixtures. Such synergy will be manifested by higher air contents in the most difficult systems and a further reduction in the variability of air entrainment among mixtures containing different fly ash.
7. Promising candidates must then be tested and confirmed in fly ash mortars and/or concrete under conditions such as those described for the data in Tables 14-35 below. Useful SA will exhibit the following features:
   enable adequate levels (typically 5-8 vol %) of air to be entrained in concrete or other cementitious products, with dosages of conventional air entrainment agents that are typical of those required when no fly ash, or fly ash with low carbon content, is used;
   entrain predictable air levels into fly ash-concrete regardless of the variability in the fly ash material, such as the source, carbon content, chemical composition;
   exhibit no interference with cement hydration and concrete set time;
   induce no significant changes to other physical and durability properties of concrete;
   are not significantly affected by the presence of other concrete chemical admixtures, for example, water reducers, superplasticizers and set accelerators; and
   cause no detrimental effects when added in excessive dosages, such as excessive air contents, extended set times, or strength reduction.

Second Protocol to Identify Additional Sacrificial Agents

While the first protocol described above yields reliable evaluations of the relative merit of various groups of sacrificial agents, and has produced the results shown in Examples 1 to 31 below, the protocol is very labour intensive, time- and material-consuming. To alleviate these problems, a second testing protocol has been devised, based upon the results already collected in Examples 1 to 31.

In order to rapidly screen a large number of potential candidates for use as fly ash concrete sacrificial agents, a second protocol has been devised using the paste air measurement equipment and procedure described later in this description, in the section entitled "Examples relating to Air entrainment in cement or FA:cement pastes —Maximum air protocol". This second protocol was designed to test the usefulness of a candidate sacrificial agent (SA) through a minimum number of paste air measurements, comprising, typically, the following air entrainment (AE) measurements, using a reference concrete air entrainment agent (AEA):

AE by SA in a portland cement paste
AE by a standard AEA in a portland cement paste
AE by a standard AEA in a FA-cement paste
AE by a standard AEA in FA-cement paste at two SA dosages Description of Second Sacrificial Agent Testing Protocol The second sacrificial agents evaluation protocol has been designed to assess the relative potential value of candidate sacrificial agents with a maximum of five paste air measurements.

The first two measurements (of entrained air) are carried out with a standard AEA in a portland cement paste and in a FA:cement paste; these two tests provide reference values which can be used for the relative assessment of a series of sacrificial agents. The other three paste air measurements pertain to the properties and effectiveness of the sacrificial agents. Hence, once the reference AEA values are determined, the potential merit of a candidate SA can be assessed from only three paste air measurements.

Details of the systems and procedures used are given below, the results of which are illustrated schematically in FIG. 8 of the accompanying drawings.

Reference AE Measurements in Cement and FA: Cement Pastes

1. Measurement of the air entrained by a standard air-entraining admixture in a cement paste of fixed composition and fluidity; the latter is a reference system which provides 'reference' air entrainment values ('A' in FIG. 8). For this reference system the following conditions were adopted (such conditions can be optimized to best suit the particular materials and AEA admixture used):

Water: approx 200 g (adjusted to achieve fixed fluidity as given below)
Cement (A): 400 g
Ratio w/c: 0.43 to 0.44
Air entrainment agent: Sodium Dodecylbenzene sulfonate (DDBS)
Air entrainment agent concentration: 0.0125 wt % (cementitious)
Paste fluidity: adjusted to yield mini-slump spread diameter (see later) of 105±5 mm 2. Measurement of the air entrained in a 50:50 FA:cement paste by DDBS at the same dosage and under the same condition as given in 1 above; the observed AE value will serve as a second reference value throughout the series of tests, and it is illustrated as 'B' in FIG. 8. The difference between 'B' and 'A' in FIG. 8 is the reduction in air entrainment due to the presence of the fly ash; this is illustrated as 'C' in FIG. 8.

In the present SA testing and evaluation protocol, the fly ash selected should remain the same for the entire set of additives tested, in order to provide reliable relative performance ranking. For the present series of test, the Fly Ash selected was the one identified as B1 in Table 1 below; the physico-chemical properties of this fly ash are reported in Table 1.

AE Measurements to Assess Performance of Sacrificial Agents

In testing for the relative performance of the sacrificial agent, the sacrificial agent dosage was chosen in the range 0-0.1 wt %, which corresponds to typical dosage values observed in paste, mortar and concrete tests reported in Tables 2, 3 and 4 and Tables 7 to 34.

Also, in the concentration range in which they are used, SA should not interfere markedly with the performance of AE admixtures; hence the air entrainment by SA alone in cement pastes should also be measured at their maximum expected practical dosage. For most sacrificial agents of the present invention, the maximum practical dosage will be of the order of 0.2% by weight of cementitious material, and most typically 0.1% by wt cementitious; for sacrificial agents which exhibit some concrete air entrainment by themselves, the maximum dosage may be limited to lower values.

The following paste air entrainment measurements will then enable a primary assessment of SA candidate 3. Measurement of the air entrainment of the SA, by itself, in a cement-only paste at a dosage of 0.1 wt %; this is illustrated as 'D' in FIG. 8.

4. Measurement of the air entrained by DDBS in the FA-cement paste comprising 0.05% wt SA, under the same conditions as described in 2 above. The air entrainment value observed in this system, compared to that observed in the absence of the SA, yields the air recovery due to the SA, and is illustrated schematically as 'E' in FIG. 8.

5. Same as in 4 above, but with a higher SA concentration at 0.1 wt %; the air entrainment observed, again compared to the value observed in the absence of the SA, yields a second value of air recovery by the SA and is illustrated as 'F' in FIG. 8.

While it is preferable to carry out both of steps 4 and 5, a single step can be carried out at a single concentration of SA (e.g. 0.1 wt %) if required to simplify the procedure.

As noted above, this second testing protocol will provide a relative assessment of the potential of a series of compounds, all tested under the specified set of conditions, using the specified materials, equipment and protocols throughout the series of test. For example, changes in the cement source, the fly ash used, the air entrainment agent type and concentration may alter the tests results, as was shown using the first testing protocol described earlier (see results in Tables 7 to 34 of Examples below). However, compounds found effective in this protocol should also be effective in other conditions, although the level of effectiveness may change. Conversely, compounds found ineffective according to this protocol should be ineffective in other conditions.

Required Properties of Sacrificial Agents and Selection Criteria for Candidate Products Properties of Ideal Sacrificial Agent The properties of an ideal sacrificial agent (SA) for air entrainment in fly ash concrete are readily identified from specific requirements of the application (as outlined in the first protocol). From a performance standpoint, the ideal sacrificial agent should exhibit:

Minimum air entrainment by itself, in cementitious systems, at the normal application dosage.
Full recovery of the air entrainment reduction due to fly ash carbon.
Minimal influence of SA overdosage, within a reasonable range, on air entrainment; this allows voluntary overdosage to compensate for variation in the fly ash carbon or other properties;
Minimal influence on air void parameters (air void average size, distribution, average spacing).
Minimal influence of the SA, at its normal dosage, on other concrete properties, e.g., setting time, slump, slump loss as function of time, bleeding and segregation.

Other desirable (but secondary) properties, which may also be considered for a large scale application include:

Significant solubility in water, or in liquid formulations
Low vapour pressure so that the SA is not lost significantly to evaporation before use
Minimum deleterious effects with respect to human health and environment (i.e. it is preferable to use SAs that are known to be safe compounds)
Low cost.

Selection Criteria for Sacrificial Agents

For the purpose of rating the relative performance of various SA, initially neglecting considerations on 'other desirable properties' as outlined above, two types of criteria can be used:

Qualitative rejection criteria and
Quantitative performance criteria

Qualitative Rejection Criteria

The following conditions would preclude the use of a particular SA:

The candidate SA has either a non significant effect, a nil effect, or a negative effect, i.e., de-foaming effect.
The candidate SA entrains an excessive amount of air, by itself, at the dosage of its intended usage.

Any SA candidate rejected under these two criteria could potentially be used in conjunction with other SA candidate to achieve the quantitative performance criteria described below. The general principle allowing such product combinations will be outlined below in the Section entitled: RELATIONSHIP BETWEEN THE PERFORMANCE OF SACRIFICIAL AGENTS AND THEIR MOLECULAR PARAMETERS.

Quantitative Performance Criteria and Rating

The candidate sacrificial agents tested were rated according to the level of air entrainment recovery they exhibit, through the paste air testing protocol described above. For the relative performance rating of the group of products chosen as potential SA and listed in Table 36, the following rating scheme (Tables A and B) was adopted (referring to FIG. 8 and quantities defined therein):

TABLE A

| | Col. 1 | Col. 2 |
|---|---|---|
| AE recovery to cement paste value (C in FIG. 8) | Recovery by 0.05% SA (E in FIG. 8) | Recovery by 0.1% SA (F in FIG. 8) |
| <50% of C | Rating 0 | Rating 0 |
| 50-100% of C | Rating 1 | Rating 1 |
| >100% of C | Rating 2 | Rating 2 |

TABLE B

Overall performance rating: Sum of ratings from air entrainment recovery values (col. 1 and col. 2 in Table above)

| Rating | Overall performance |
|---|---|
| 0 | Fail |
| 1 | Poor |
| 2 | Good |
| 3 | Preferred |
| 4 | Most preferred |

Using this rating scheme, the potential value of each candidate SA is thus rated with a single-digit number ranging between 0 and 4. Examining the ratings attributed to the various chemicals tested (Table 36, col. 5), it is readily seen that valuable sacrificial agents with high ratings (e.g., 3 or 4) are found in many families of chemical compounds, namely: alcohols, glycol ethers, carboxylic acids, aromatic sulfonates, esters, amines, alcohol amines, amides, quaternary ammonium salts and polyglycols. For the entire group of 104 compounds tested, the following breakdown is observed:

Listed below are the different groups of compounds according to their ratings—best: 4, worst: 1; all acid compounds were tested in the form of sodium salts:

Rating 1 (13 compounds): n-Propanol, i-Propanol, Hexanol, Sorbitol, Ethylene Glycol Methyl Ether, Methyllaurate, Ethylcaproate, Phenyl acetic acid, 2-Naphthoic acid, 2-(2-Aminoethoxy)ethanol, tri-Ethylene Glycol, 2-Butanone (Methyl ethyl ketone), n-Vinyl-2-pyrrolidinone.

Rating 2 (11 compounds): Glycerol, p-Dimethoxybenzene, Methyloctanoate, Methylpalmitate, Methyloleate, Ethylene glycol mono-ethyl ether acetate, Aniline, Urea, Dimethylurea, Methyl isobutylketone, Butyraldehyde.

Rating 3 (15 compounds): 1-Pentanol, Neopentanol, Benzyl alcohol, Phenyl ethyl alcohol, Ethylpropionate, Ethylbutyrate, 4-Ethyl benzene sulfonic acid, 2-Naphthalenesulfonate Na, p-Toluene Sulfonic acid, Benzyl amine, Di-isopropanolamine, Tetrapropyl ammonium hydroxide, Tetrabutyl ammonium chloride, Polyethylene glycol 200, 1-Ethyl-2-Pyrrolidinone.

Rating 4 (25 compounds) 1-Butanol, 2-Butanol, t-Butanol, 3-Pentanol, Ethylene Glycol Ethyl Ether, Ethylene Glycol n-Propyl Ether, Ethylene Glycol n-Butyl Ether, Ethylene Glycol iso-Butyl Ether, Ethylene Glycol Phenyl Ether, Propylene Glycol Phenyl Ether, di-Propylene Glycol mono Methyl Ether, di-Ethylene Glycol Butyl Ether, Ethylene Glycol di-Methyl Ether, Hexanoic acid, Tween® (POE (20) Sorbitan monolaurate), Methylnaphthalene sulfonate Na, Triethylamine, n-butyl amine, Tri-iso-propanolamine, n-butyl urea, Polyethylene glycol 400, Polyethylene glycol 2000, tri-Propylene glycol, Polypropylene glycol 425, P(EG-ran-propyleneglycol) 2500.

It is to be noted that compounds rated 'zero' are considered unacceptable for use as single SAs, but could be used in mixtures with other compounds rated higher to produce a combined sacrificial agent that is effective in the invention. Also, while SAs should themselves entrain less than 2 vol % air (Volume D of FIG. 8), candidate compounds for which Volume D is greater than 2 vol % may be considered (if Volume E and/or F is sufficiently high) for use in combination with other compounds for which Volume D is lower, thereby providing an average volume of air entrainment due to the sacrificial agent of less than 2 vol %.

Compounds found effective according to the second protocol may be subjected to an abbreviated version of the first protocol to determine the most preferred compounds and effective dosages, etc.

Relationship Between the Performance of Sacrificial Agents and Their Molecular Parameters As noted above, valuable SA were found in many functional classes of chemical compounds. This finding indicates that the specific nature of the functional group of the SA is perhaps not the prevailing (or only) factor in determining the performance of a SA. Without wishing to be bound to any particular theory, based upon the assumed mode of action of SA in fly ash concrete, i.e., competitive adsorption of the SA and AEA, a second molecular feature which may be important, is their 'hydrophobic character'. This particular feature of chemical compounds is quantitatively defined by their 'Hydrophilic Lipophilic Balance' (HLB) rating, or their oil/water (or octanol/water) partition coefficients ($K_{OW}$).

The HLB Scale

The HLB concept and its application in colloid chemistry are described in References 4 and 5 listed at the end of this specification (the disclosures of which references are incorporated herein by reference), and may be understood as follows. A given molecule, comprising a hydrophilic (water-soluble) group and a lipophilic (hydrophobic) moiety, will exhibit an overall character which depends on the relative magnitude of its hydrophilic and hydrophobic groups. The HLB scale provides a measure of this mixed character; the HLB scale typically varies between 0 and 20, the more hydrophilic the molecule, the higher the HLB value.

The HLB was initially designed to characterize the relative ability of surfactants to emulsify oil in water, or vice-versa (Reference 6). Typically, the HLB value of a non-ionic surfactant could be estimated as the weight fraction of the hydrophilic portion of the surfactant molecule, divided by 5 to yield a smaller, more convenient range of HLB numbers. References 5 and 6 show how to determine HLB values experimentally; for non-Ionic polyol ester surfactants, the experimental HLB value is obtained as:

HLB=20 (1−S/A) where S is the saponification number of the ester, and A is the acid number of the recovered acid.

While the HLB procedure was designed for surfactants, it was later extended to other organic molecules. This was achieved by assigning HLB values to different fragments and functional groups of surfactant molecules, based on experimental data for families of surfactants. The different 'group contributions' could then be used to calculate HLB values for other molecules comprising the same groups. This approach is described in general terms in standard textbooks (Reference 7) and is discussed in details by Davies (Reference 8) and McGowan (References 9 and 10); these authors provide tables of HLB group contributions and additivity schemes for calculating molecular HLB values. The calculated HLB values are reasonably accurate for most non-ionic molecules; in some cases, for example, molecules with multiple functional groups, or molecules with an ionic group, the accuracy of the calculated values will be affected (Reference 10). Because of these limitations, several compounds examined here could not be attributed meaningful HLB values.

Example of HLB Calculation:

Using the McGowan HLB group contribution scale (Reference 9), an example of HLB calculation is given below for Ethylene Glycol Phenyl Ether (or Ethanol, 2-phenoxy-, or 2-Phenoxyethanol); formula: $C_6H_5OCH_2CH_2OH$.

The table of HLB contributions assigned to various functional groups and molecular fragment is presented below (Table C). The fragments which comprise the EGPE molecule are identified in the first column, together with the number of each fragment or group. The calculated HLB is simply the sum of the group contributions listed in the last column. For EGPE, the calculated HLB value is found as 6.239.

TABLE C

Scale of HLB contributions assigned to various molecular groups in the McGowan additivity scheme (Reference 9)

| Number of groups | Hydrophilic groups | HLB | Calculation |
|---|---|---|---|
|  | Empirical HLB | 7 | 7 |
|  | —OSO3− | 12.05 | 0 |
|  | —SO3− | 12.25 | 0 |
|  | —COO− | 12.66 | 0 |
|  | —COO— ester | 2.28 | 0 |
|  | —COOH | 2.09 | 0 |
| 1 | OH (free) | 1.12 | 1.12 |
| 1 | —O— ether | 1.3 | 1.3 |
|  | >C=O | 0.972 | 0 |
|  | —CONH2 | 1.953 | 0 |
|  | —CONH— | 2.136 | 0 |
|  | —CONH< | 2.319 | 0 |
|  | —CON(CH3)2 | 1.003 | 0 |
|  | —CH(NH3+)COO− | 4.28 | 0 |
|  | >N+< (quater) | 9.4 | 0 |
|  | >N− (tertiary) | 9.18 | 0 |
|  | >NH | 8.89 | 0 |
|  | —NH2 | 8.59 | 0 |
|  | —N(CH3)2 | 7.53 | 0 |
|  | —N+(CH3)3 | 6.98 | 0 |
|  | C5H5N+ (pyrridonium) | 6.84 | 0 |
|  | Lipophylic groups | HLB |  |
|  | —CH< | −0.295 | 0 |
| 2 | —CH2- | −0.475 | −0.95 |
|  | —CH3- | −0.658 | 0 |
|  | —CH= | −0.402 | 0 |
|  | >C< | −0.109 | 0 |
| 1 | Phenyl- | −2.231 | −2.231 |

TABLE C-continued

Scale of HLB contributions assigned to various molecular groups in the McGowan additivity scheme (Reference 9)

| Number of groups | Hydrophilic groups | HLB | Calculation |
|---|---|---|---|
|  | naphthyl- | −3.475 | 0 |
|  |  | HLB | 6.239 |

(HLB = Sum of 7 + 1.12 + 1.3 − 0.95 − 2.231 = 6.239)

The Oil/Water (or Octanol/Water) Partition Coefficients $K_{OW}$

The hydrophobic-hydrophilic character of a molecule is also evidenced by its relative solubility in oil (octanol) and water, i.e. the ratio: solubility in oil (octanol)/solubility in water. This ratio can be measured directly from the equilibrium partitioning of the compound between oil (octanol) and water, and expressed as the equilibrium partition coefficient: $K_{OW}$. Highly hydrophobic compounds, being very oil-soluble, will exhibit high values of $K_{OW}$; conversely, hydrophilic compounds will exhibit low $K_{OW}$ values. For convenience, the values of $K_{OW}$ are reported on a logarithmic scale as $\log K_{OW}$. Unlike the HLB scale which best applies to non-ionic surfactant-type molecules, the $\log K_{OW}$ classification can include most types of compounds.

Experimental values of $K_{OW}$ are available for a variety of compounds (as disclosed in References 11 to 13 listed at the end of this specification). As with HLB values, the experimental data was used to assigned group contributions to various portions of molecules. From these assigned group values and additivity rules, values of $K_{OW}$ can be calculated for a wide variety of molecule of known composition and structure (as disclosed in References 11 to 13 listed at the end of this specification).

Example of $K_{ow}$ Calculation

The procedure for calculating a $K_{OW}$ value using the $K_{ow}$ in program available from Reference 11 is illustrated below for Ethylene Glycol Phenyl Ether (EGPE). The KowWin program for predicting $\log K_{ow}$ values can perform its calculation with either of the following inputs: 1—the Chemical Abstract (CAS) Registry number for the molecule of interest, or 2—the structure of the molecule, depicted in the 'SMILES' notation, which is explained in the $K_{ow}$Win program. For EGPE, the following information can be supplied:

Compound: Ethylene Glycol Phenyl Ether (or Ethanol, 2-phenoxy-, or 2-Phenoxyethanol)

Chemical formula: $C_6H_5OCH_2CH_2OH$

SMILES structural representation: O(c(cccc1)c1)CCO;

Chemical Abstract Registry Number (CAS): 000122-99-6

The output of the $K_{ow}$Win program for calculation of the EGPE $\log K_{ow}$ value is reproduced below. The programs lists the various fragments of the molecule, the number of such fragments (Col. 2), the unit contribution to $\log K_{ow}$ for each fragment (Col. 4) and the total contribution from each fragments (Col. 5). The sum of all contributions yields the estimated LogKow as 1.10. The program further provides a comparison with experimental $\log K_{ow}$ values when available; for EGPE, a value reported by Hansch (see table) is given as 1.16, in relatively good agreement with the computed value.

Example of Program Computation Output $K_{ow}$Win (Log$K_{ow}$) Log P Calculation SMILES: O(c(cccc1)c1)CCO CHEM: Ethanol, 2-phenoxy-

MOL FOR: $C_8H10 O2$

MOL WT: 138.17

| TYPE | NUM | LOGKOW v1.66 FRAGMENT DESCRIPTION | COEFF | VALUE |
|---|---|---|---|---|
| Frag | 2 | —CH2- [aliphatic carbon] | 0.4911 | 0.9822 |
| Frag | 1 | —OH [hydroxy, aliphatic attach] | −1.4086 | −1.4086 |
| Frag | 6 | Aromatic Carbon | 0.2940 | 1.7640 |
| Frag | 1 | —O— [oxygen, one aromatic attach] | −0.4664 | −0.4664 |
| Const | | Equation Constant | | 0.2290 |
| | | | $LogK_{ow}$ = | 1.1002 |
| | | | $LogK_{ow}$ Estimated: | 1.10 |

Experimental Database Structure Match:
Name: 2-Phenoxyethanol
CAS Registry Number: 000122-99-6
Experimental $LogK_{ow}$: 1.16
Experimental Reference: Hansch, C. et al. (1995)

The relationship between the performance of candidate sacrificial agents, expressed as the % air recovery, and the values of $K_{OW}$ ($LogK_{OW}$) and HLB is illustrated in FIG. 9 for a series of aliphatic alcohols. The data show that the capacity of the different alcohols to enhance air entrainment recovery (Delta AE) in the fly ash-cement paste is optimal in a certain range of HLB and $LogK_{OW}$ values: while the alcohols are displayed in decreasing order of HLB, or increasing order of $LogK_{OW}$, the air enhancement values (Delta AE) exhibit maximum values at intermediate range of HLB or $LogK_{OW}$ values. FIG. 10 illustrates similar data for a series of glycol ethers and, again, maximum values of Delta AE are observed in an intermediate range of HLB or $LogK_{OW}$ values;

The relative performance of broader series of alcohols and glycol ethers are illustrated in FIG. 11 and FIG. 12 wherein the air recovery (Delta AE) values are plotted against the $LogK_{OW}$ values. In both series of compounds, those with the highest recovery values are found in a relatively narrow range of $LogK_{OW}$ values.

Quantitative Criteria for Ranking of Sacrificial Agents Based on Their Molecular Parameters The data shown for alcohols and ethers in FIGS. 11 and 12 clearly shows that optimum_air enhancement and recovery is observed for compounds having $LogK_{OW}$ values in the range of −1 to +2. For these two families of chemicals, this range of $LogK_{OW}$ values thus identifies the most valuable sacrificial agents.

The air entrainment recovery values for all of the chemicals tested are illustrated in FIG. 13, plotted as function of $LogK_{OW}$. Although a significant scatter of the data points is observed, in part due to the uncertainty on calculated values as discussed earlier (particularly for ionic compounds, such as aryl sulfonates), an optimum range of $LogK_{OW}$ values is again clearly seen. For the overall group of chemicals, the optimum range of $LogK_{OW}$ values is somewhat broader, extending between −3 and +2; best candidate sacrificial agents are seen in the range of $LogK_{OW}$ values between −2 and +2.

A tentative explanation for the observation of an optimum range of $LogK_{OW}$ values with respect to SA performance may be suggested as follows. SA having low values of $LogK_{OW}$ are too water-soluble, or hydrophilic, to interact effectively with carbon in the fly ash. At the other end, SA having high values of $LogK_{OW}$ are too oil-soluble, or hydrophobic; such compounds, typically aliphatic oils, can interact effectively with fly ash carbon, but they also known to act as de-foamers. Hence, they do not promote, nor assist air entrainment.

A similar plot of air entrainment recovery (Delta AE) for all chemicals tested was also drawn as function of HLB values, as illustrated in FIG. 14. Because of the lack of assigned HLB values to some of the functional groups, a few of the 104 products tested could not be assigned a meaningful HLB value. Values assigned to some of the other compounds, for example, aromatic sulfonates (labelled Aromatic $SO_3$), and compounds containing the amino group, are probably overestimated (too high). As with the $LogK_{OW}$ values, there appears an optimum range of HLB values for the air recovery achieved with the various compounds tested, extending between 5 and 20.

The identification of potentially valuable sacrificial agents based on their $LogK_{OW}$ values is further confirmed by examining the distribution of product ratings as function of $LogK_{OW}$; this is illustrated in FIG. 15. In the latter, the $LogK_{OW}$ abscissa is separated in ranges of 0.5 Log units; from the data in Table 36, the number of candidate SA which achieved ratings of 3 or 4 in each consecutive 0.5 $LogK_{OW}$ range is plotted as the ordinate. From the distribution illustrated, the 'best' SA candidate, i.e., those with ratings of 3 or 4, are seen to cluster in the same $LogK_{OW}$ interval values as identified above: from −2 to +2.

Thus, the HLB and LogKow values can be used to predict the effectiveness of compounds as sacrificial agents in fly ash cementitious mixtures.

The testing protocol and results illustrated in Table 36, and the relationship of these results to HLB and LogKow values illustrated in FIGS. 13 and 14 pertain to single SA candidates. Since in surfactant science and technology, it is common to blend surfactants of different HLB values to achieve a mixture having an intermediate HLB value (see References 4 to 6 disclosed below), the same approach can be pursued; that is, two or more candidate sacrificial agents with different HLB (or similarly LogKow) values may be combined to achieve a mixed sacrificial agent having HLB, or LogKow, values within the desirable range.

The invention is illustrated in more detain in the following by means of Examples and Comparative Examples provided below. These details should not be used to limit the generality of the present invention.

COMPARATIVE EXAMPLES

In order to illustrate the problems of using fly ash in cementitious mixtures containing air entrainment additives, a variety of mixtures were prepared using fly ash and cement powder of different origins and different common air entrainment agents, namely a tall oil fatty acid salt (Air 40) and an alkyl aryl sulfonate salt (Air 30). The percentage air entrainment was then measured. The detailed conditions of mixture preparation and measurement techniques and conditions to obtain these results are provided in following sub-sections. Two commercial Type 10 (US Type-1) portland cement powders were employed—hereinafter referred to as PCA and PCC. The different types of fly ash used are shown in Table 1 below, together with the codes by which these materials are identified and the compositions in which these fly ashes were used in subsequent tests. The fly ash used in the different tests procedures, namely pastes, mortars and concrete, are identified in Table 1. For each fly ash used, the weight percentages of loss on ignition are reported, and are indicative of the carbon content of the fly ash. For the FA used in paste air entrainment and other measurements in aqueous slurries described later, the following other properties are also reported:

Fly ash class: F or C
Fly ash type: bituminous, sub-bituminous, lignite, western
BET specific surface area: standard BET nitrogen surface area
Specific density: determined by standard Le Chatelier flask using iso-propanol as solvent

TABLE 1

Key physico-chemical properties of the fly ash materials used in various cementitious mixtures.

| FA type | Code | Fly Ash used in Paste | | | FA used in Mortar LOI (%) | FA used in Concrete LOI (%) |
|---|---|---|---|---|---|---|
| | | BET ($m^2/g$) | Specific density ($g/cm^3$) | LOI (%) | | |
| b-F | B1 | 3.44 | 2.33 | 4.36 | 5.01 | 1.90, 2.06, 3.7, 4.70, 5.74 |
| b-F | B2 | | | | | 1.84, 4.05, 4.81 |
| s-C | C1 | 5.36 | 2.76 | 1.62 | 0.7 | 0.18, 0.62 |
| b-F | C2 | 2.63 | 2.20 | 3.32 | 3.04 | 2.90, 3.70, 4.68 |
| w-F | C3 | | | | 2.54 | |
| s-C | D | 2.40 | 2.60 | 0.25 | 0.13 | |
| s-C | E1 | | | | | 1.3, 2.3 |
| b-F | H1 | | | | 8.45 | 6.37 |
| b-F | H2 | | | | | 3.6, 4.9 |
| w-F | M1 | 1.54 | 2.35 | 0.35 | 0.21 | |
| b-F | M2 | 3.43 | 2.20 | 5.34 | 8.78 | 10.35 |
| b-F | M3 | 4.80 | 2.16 | 11.33 | 3.15 | |
| w-F | N | 2.01 | 2.32 | 0.30 | | |
| F lignite | R | 2.20 | 2.13 | 0.21 | 0.17 | | s: Sub-bituminous;
b: bituminous;
w: western;
C: class C;
F: class F

The results of the measurements of air entrainment in various mixes, respectively pastes, mortars and concrete, are shown in Tables 2, 3 and 4 below.

TABLE 2

Air entrained (vol %) in PCA cement paste with and without fly ash (50:50 fly ash:cement) by 1 part (0.0125 wt %) (col. 1), 4 parts (0.05 wt %) (col. 2) and 8 parts (0.1 wt %) (col. 3) of Air 30, (Maximum air protocol, see below).

| | | Column | | |
|---|---|---|---|---|
| | | 1 Air 30 1× (0.0125%) | 2 Air 30 4× (0.05%) | 3 Air 30 8× (0.1%) |
| Fly Ash | LOI (%) | | | |
| PCA | | 6 | 11 | 13 |
| R | 0.21 | 3 | 8 | 12 |
| D | 0.25 | 4 | 11 | 14 |
| M1 | 0.35 | 4 | 9 | 11 |
| C1 | 1.62 | 3 | 9 | 14 |
| B1 | 4.36 | 0 | 4 | 8 |
| M2 | 5.34 | 0 | 3 | 5 |
| M3 | 11.33 | 0 | 4 | 7 |
| Average (%) | | 2 | 7 | 10 |
| RSD (%) | | 86 | 46 | 36 |

TABLE 3

Air entrained (vol %) in PCA mortars with and without fly ash (30:70 fly ash:cement) by 0.002 wt % Air 30 or 0.005 wt % Air 40.

| | | Mortar (30:70 fly ash: cement) | |
|---|---|---|---|
| | LOI (%) | Air 30 0.002% | Air 40 0.005% |
| PCA | | 11.4 | 14.3 |
| D | 0.13 | 7.4 | 11.8 |
| R | 0.17 | 7.8 | 12.6 |
| M1 | 0.21 | 1.5 | 5.6 |
| C1 | 0.7 | 1.1 | 5.2 |
| C3 | 2.54 | 3.3 | 5.9 |
| C2 | 3.04 | 2.4 | 6.1 |
| M3 | 3.15 | 1.9 | 7.3 |
| B1 | 5.01 | 0 | 0.9 |
| M2 | 8.78 | 0 | 0.8 |
| H1 | 8.45 | 0 | 0.1 |
| Average (%) | | 3 | 6 |
| RSD (%) | | 107 | 73 |

TABLE 4

Air entrained (vol %) in PCA Concrete with and without fly ash (25:75 fly ash:cement) by 0.0057 wt % Air 30 (col. 1), 0.0031 wt % Air 40 (col. 2) or 0.0117 wt % Air 40 (col. 3).

| | | Column | | |
|---|---|---|---|---|
| | | 1 | 2 | 3 |
| | | Concrete (25:75 fly ash:cement) | | |
| | LOI (%) | Air 30 0.0057% | Air 40 0.0031% | Air 40 0.0117% |
| PCA | | 12.0 | 5.8 | 9.0 |
| B1 | 1.90 | 6.7 | 1.6 | |
| B1 | 2.10 | | | 5.3 |
| B1 | 4.70 | 2.0 | | |
| C2 | 2.90 | | | 5.0 |
| C2 | 3.70 | | 1.4 | 4.3 |
| C2 | 4.68 | | | 3.0 |
| PCC | | | | 10.0 |
| B1 | 2.06 | | | 5.9 |
| B1 | 5.74 | | | 5.9 |
| C1 | 0.18 | | 5.8 | |
| C1 | 0.62 | | 2.7 | |
| C2 | 2.90 | | | 5.8 |
| C2 | 3.70 | | | 3.5 |
| C2 | 4.70 | | | 2.0 |
| H1 | 6.37 | | | 3.3 |
| M2 | 10.35 | | | 1.6 |

In many of the pastes, mortars and concrete samples examined which contained fly ash, it was found difficult to entrain air, i.e., much less air is entrained compared to corresponding systems containing no fly ash.

In each group (paste, mortar and concrete) large variations in the percentages of air entrained were observed among the different types of fly ash. The variability in the percentage of entrained air for different fly ash-cement systems is illustrated (e.g., Tables 2 and 3) by the high values of the relative standard deviation (σ/average % air). This shows that there is a large variability in the behaviour of the mixtures relative to entrained air.

Although the percentage of air entrained was generally low for high-carbon fly ash, some fly ash with low carbon also exhibit very low percentage air entrainment. This shows that the loss on ignition of a particular fly ash is not a reliable indicator of the behaviour of the fly ash, so it is difficulty to predict an adequate dosage of air entrainment agent or admixtures.

In high-carbon fly ash, the amount of air entrained in the paste (50:50 fly ash:cement) was only poorly related to the concentration of air entrainment agents and admixtures, as illustrated by the data shown in Table 2, Columns 1, 2 and 3. Thus the behaviour of air entrainment as a function of concentration of air entrainment agent is unpredictable.

It was also noted that, at high dosages of air entrainment agents, the relative standard deviation values for pastes decrease because an upper limit is reached at 13-14% air for all the fly ash mixtures. Such a ceiling can also be observed in concrete at 12-15% air when a very large excess of air entrainment agent is added, regardless of the fly ash. The problem is that this ceiling is too high to apply an overdose of air entrainment agent in field work.

EXAMPLES

Equivalent studies to those summarised above were carried out on pastes and mixtures containing various kinds of fly ash, air entrainment agents and sacrificial agents according to the present invention. The results are shown in the Tables below.

Examples Relating to Adsorption and Precipitation of Air Entrainment Agents and Sacrificial Agents in Aqueous Fly Ash Slurries Experimental Protocols Adsorption/Precipitation of Sacrificial Agents (SA) or Air Entrainment Agents (AEA) in 10 wt % Aqueous Fly Ash Slurries at pH 12.5:

Preparation of SA or AEA solution: Aqueous solutions of the sacrificial agents were prepared at a concentration of 3 mM or 0.003M in 0.03N NaOH (pH 12.5); aqueous solutions of the commercial AEA of unknown molecular weight (Air 30 and Air 40) were prepared at 1050 mg/l corresponding approximately to 3 mM of DDBS, which has a molecular weight of 348 g/mol). The pH of the solutions were adjusted to 12.5 with NaOH.

Precipitation in slurry extract or leachate: To perform this test, FA or cement leachate were prepared in advance, by filtering two liters of a 10 wt % FA, or cement, slurry in 0.03N NaOH which had been left to stand under slow agitation for 30 min; 2.5 g of the filtrate solution was mixed with 22.5 g of the SA or AEA solution in a 50 ml polypropylene centrifuge tube; the latter was shaken vigorously in an orbital shaker (Eberbach Corporation) for 30 min at room temperature, centrifuged for 5 min and then the supernatant solution was filtered (0.45 μm). The SA or AEA content of the solution was determined using an Ultraviolet-Visible (UV) spectrometer or by COD (Chemical Oxygen Demand) measurement.

Similarly, the solubility of SA and AEA in saturated lime solution (pH 12.7) were measured to evaluate the extent of precipitation of the Ca-salts of the SA or AEA under these conditions. These experiments comprise: preparing a lime solution at pH 12.7 and mixing the latter with a solution of SA (3 mM) or AEA (1050 mg/l); the proportions were again 2.5 g of the lime solution and 22.5 g of the SA or AEA solution; the sample was agitated, filtered and analyzed for dissolved SA or AEA as described above for slurry leachate experiments.

Adsorption/precipitation in FA or cement slurries: In this protocol, aqueous slurries containing 10 wt % FA or cement were prepared as described above, except that in this case, the cement was added directly into a solution of the SA or AEA in the following proportions: 3.0 g cement or FA, and 27 g of 3 mM sacrificial agent, or 27 g of 1050 mg/l AEA; the latter were prepared in the same way as in the precipitation test above. The residual (soluble) SA or AEA content in the solution was also determined by UV or COD.

Results

Example 1

Adsorption (wt % adsorbed) of sacrificial agents or air entrainment agents in slurries containing 10 wt % PCA cement or fly ash at pH 12.5 and Precipitation (wt % precipitated) in solutions extracted from slurries containing 10 wt % PCA cement or fly ash at pH 12.5; initial concentrations: sacrificial agents (3 mM), Air 30 and Air 40 (0.105 wt %).

Entries in parentheses: % precipitation when reacted with solutions extracted from the fly ash slurries (Results in Table 5).

TABLE 5

| Fly Ash | LOI (%) | BA | EGPE | NA | ND | NS | Air 30 | Air 40 |
|---|---|---|---|---|---|---|---|---|
| PCA |  |  |  |  |  | 3 (1) | 79 (79) | 73 (74) |
| R | 0.21 |  |  |  |  | 24 (0) | 64 (52) | 65 (24) |
| D, class C | 0.25 |  |  |  |  | 59 (1) | 84 (9) | 69 (13) |
| N | 0.30 | 16 (11) | 1 (0) | 20 (0) | 26 (0) | 5 (0) |  |  |
| M1 | 0.35 | 13 (11) | 4 (1) | 90 (80) | 27 (0) | 11 (0) | 70 (59) | 70 (67) |
| C1, class C | 1.62 | 25 (11) | 12 (0) | 61 (0) | 84 (31) | 70 (10) | 89 (32) | 76 (25) |
| C2 | 3.32 | 20 (14) | 6 (0) | 4 (0) | 17 (0) | 5 (0) |  |  |
| B1 | 4.36 | 25 (12) | 12 (0) | 9 (0) | 14 (0) | 8 (0) | 25 (7) | 46 (19) |
| M2 | 5.34 | 23 (15) | 14 (0) | 9 (0) | 13 (0) | 8 (0) | 18 (7) | 30 (4) |
| M3 | 11.33 | 23 (13) | 14 (0) | 12 (0) | 18 (0) | 10 (0) | 55 (7) | 66 (0) |

As can be noted from the data in Table 5, a major fraction of the air entrainment agents tested (Air 30 and Air 40), was removed from the slurry solution due to adsorption onto the fly ash and cement particles, and precipitation as insoluble salts (see entries in parentheses: % precipitated).

Under the same conditions, the sacrificial agents are not significantly precipitated, except for 1-naphthoic acid in the presence of the M1 fly ash, where precipitation of calcium naphthoate is likely due to a high level of soluble Ca in this fly ash.

Because there is no significant precipitation of the SA in the fly ash leachate, the SA removed from the slurries must be removed through adsorption onto the fly ash. Adsorption of the sacrificial agents in alkaline fly ash slurries is significant and shows several distinct behaviours, which may be seen as:

low adsorption, increasing with increasing fly ash carbon, for example ethylene glycol phenyl ether;
  intermediate adsorption not related to fly ash carbon content: for example, benzylamine and sodium di-isopropyl naphthalene sulfonate; and
  strong adsorption on specific fly ash materials: for example 1-naphthoic acid sodium salt, sodium di-isopropyl naphthalene sulfonate and sodium 2-naphthalene sulfonate.

The trends observed in the behaviour of the sacrificial agents point to different classes of sacrificial agents which could be used to compete with adsorption of air entrainment agents in fly ash-cement pastes, or inhibit other detrimental fly ash-related processes, in the absence of interfering precipitation phenomena.

The observations on adsorption-precipitation behaviours clearly distinguishes the sacrificial agents additives from air entrainment agents surfactants; the latter are strongly adsorbed or precipitated in the presence of fly ash (last two columns), whereas the sacrificial agents are not. To persons skilled in the art, the sacrificial agents of Table 5 are not classified as 'surfactants' except for di-isopropyl naphthalene sulfonate which exhibits an inherent surface activity and is said to both a hydrotrope and a surfactant.

Examples Relating to Air Entrainment in Cement or Fly Ash:Cement Pastes

Experimental Protocols

The following protocols were followed for measurements of fluidity and air entrainment of various types of pastes compositions of examples below.

Preparation of pastes: Pastes were prepared by pouring 400 g of cementitious powder in the 350-400 g of solution (water and additives) in a vessel (8.4 cm dia.×14.5 cm height) while gently stirring with a spatula; the exact quantity of water depends on the selected W/B ratio (see below); rapid hand mixing was continued for 1 minute, followed by intense stirring at 25° C. during 2 min using a hand-held mixer (BRAUN model MR400). The level of air entrained is dependent on the mode of utilisation of the mixer, namely the height of the mixer from the bottom of the vessel and the length of the mixing stroke; the following protocols were adopted.

Minimum air protocol: The BRAUN mixer is positioned at 1.0 inch from the bottom of the mixing vessel and the up-down motion of the mixer is limited to a 1.0 inch displacement; this provided 'minimum air' entrained air levels and is later referred to as 'Minimum air protocol' (Results reported in Table 6, col. 1 and Table 7).

Maximum air protocol: The BRAUN mixer is positioned at 2.5 inch from the bottom of the mixing vessel and the up-down motion of the mixer is limited to a 2.5 inch displacement; this provided 'maximum air' entrained air levels and is later referred to as 'Maximum air protocol' (Results reported in Tables 2 and 8-11).

Fluidity measurements: For all air entrainment measurements, the initial fluidity of the paste (without additives) was controlled using the 'mini-slump' procedure widely used for paste and grouts. In this protocol, a portion of the paste was transferred into the min-slump cone (a 2¼" high, 1½" bottom diameter, ¾" top diameter cone); excess paste was skimmed-off with a straight; the cone was then raised and the spread diameter of the paste was recorded (average of two measurements). The fluidity is measured at 10 minutes after mixing. The paste is returned to the batch and reserved for subsequent AE measurements. The fluidity of the paste (without SA and AEA) is adjusted by changing the amount of water (water/cementitious ratio) which yields a spread diameter of 115±5 mm. The latter is monitored regularly.

Air entrainment measurements: For air entrainment measurements, a portion of the paste was transferred to overfill a Plexiglas cylinder (3¾ inches height, 2 inches interior diameter), which was then leveled flush to the top of the cylinder with a straight edge. The mass of the filled cylinder, minus the weight of the empty cylinder, is then recorded and used to calculate the amount of air according to the following formula:

$$\% \text{ Air} = \frac{[(\text{Mass of mix without } AEA \text{ or } SA) - (\text{Mass of mix with } AEA \text{ or/and } SA)]}{(\text{Mass of mix without } AEA \text{ or } SA)}$$

This procedure was carried out at three times at 30 min. intervals (6, 36 and 66 min); the paste was let to stand at rest between measurements, and was stirred gently by hand for one minute prior to the subsequent air entrainment measurements.

The following tables gives specific mixtures compositions of various pastes used for air entrainment measurements.

Typical mixture compositions for air entrainment measurements in pastes containing a single additive using 'Minimum air protocol' (results shown in Table 6, col. 1):

| Composition | Weight (g) | Wt % actives/CM |
|---|---|---|
| Fly ash | 200 | 50 |
| portland cement | 200 | 50 |
| Air 30 solution (5.07 wt % solid) | 7.89 | 0.1 |
| or Air 40 solution (4.99% solid) | 8.02 | 0.1 |
| or SA solution (1 wt % solid) | 40 | 0.1 |
| Water | Depending on the water/binder ratio (W/B) required for constant specified paste fluidity (W/B = 0.40 – 0.55) | |

Typical mixture compositions for air entrainment measurements in pastes containing Air 30 plus a sacrificial agent using 'Minimum air protocol' (results shown in Table 7):

| Composition | Weight (g) | Wt % Actives/CM |
|---|---|---|
| Fly ash | 200 | 50 |
| portland cement | 200 | 50 |
| Air 30 solution (5.07 wt % solid) | 7.89 | 0.1 |
| SA solution (1 wt % solid) | 20 | 0.05 |
| Water | According to (W/B) required for constant specified paste fluidity W/B = 0.40 – 0.55 | |

Typical mixture compositions for air entrainment measurements in pastes containing Air 30 plus a combination of sacrificial agent; the following example refers to the mixture of Air 30, ND and EGPE (ratio 1/4/4, 0.0125% Air 30, 0.05% ND and 0.05% EGPE) (results in Table 8, col. 10):

Preparation of a stock solution of SA and AEA: The sacrificial agents were blended with the AEA to give the desired ratio, for example 1/4/4, using the sample weights indicated in the Table below for a stock solution of Air 30, ND and EGPE.

| Component | % solid | Weight (g) | Concentration (wt %) | Ratio |
|---|---|---|---|---|
| Air 30 | 5.07 | 11.27 | 0.571 | 1 |
| ND | 35.47 | 6.444 | 2.285 | 4 |
| EGPE | 100 | 2.286 | 2.293 | 4 |
| Water | | 80 | | |
| Total | | 100 | 5.15 | |

The paste compositions prepared with the combined Air30:ND:EGPE at ratios 1:4:4, for a fixed dosage of Air 30 in the paste at 0.0125 wt %, are given below. The air entrainment results are reported in Table 8, col. 10.

| Component | Weight (g) |
|---|---|
| Fly ash | 200 g |
| ordinary portland cement | 200 g |
| Mixture of SA and AEA (0.571 wt % Air 30) | 8.76 |
| Water | According to (W/B) required for constant specified paste fluidity W/B = 0.40 – 0.55 |

Other combinations of air entrainment agents and sacrificial agents were prepared as stock solutions following the procedure outlined above, adjusting the weights of the various components to achieve the desired component ratios. The paste compositions were also prepared as described above, keeping the cement and fly ash content fixed at 200 g each; the stock solution containing the AEA and SA at pre-determined ratios was introduced to achieve a final Air 30 concentration of 0.0125 wt %.

Examples of Air Entrainment Results in Pastes

Example 2

Air entrained (vol %) in PCA cement paste containing 0.1 wt % (Table 6, col. 1) and 0.0125 wt % (Table 6, col. 2) air entrainment agents (Air 30 or Air 40) or selected sacrificial agents alone measured under 'Minimum air' and 'Maximum air' protocols (Results in Table 6).

TABLE 6

| | Column | |
|---|---|---|
| | 1<br>Minimum air protocol<br>0.1% SA or AEA | 2<br>Maximum air protocol<br>0.0125% SA or AEA |
| Air 30 | 4 | 6 |
| Air 40 | 4 | 9 |
| BA | 0 | 1 |
| NA | 0 | 0 |
| ND | 3 | 7 |
| EGPE | 0 | 1 |
| NS | 0 | 2 |

In comparison to the air entrained by the air entrainment agents (Air 30 and Air 40) in the cement pastes, the sacrificial agents alone do not entrain air significantly, except for sodium di-isopropyl naphthalene sulfonate. Comparison of the air entrainment results further distinguishes the sacrificial agents of the present invention from conventional surfactants and air entrainment agents.

Example 3

Air entrained (vol %) in 50:50 fly ash:PCA cement paste by 0.1 wt. % Air 30 alone and by 0.05 wt % sacrificial agents together with 0.1% Air 30 (Minimum air protocol) (Results in Table 7).

TABLE 7

| Fly ash | LOI (%) | Air 30 | +BA | +NA | +ND | +EGPE | +NS |
|---|---|---|---|---|---|---|---|
| R | 0.21 | 9 | 5 | 4 | 3 | 5 | 6 |
| D | 0.25 | 15 | 5 | 6 | 3 | 5 | 6 |
| M1 | 0.35 | 3 | 11 | 6 | 5 | 5 | 4 |
| C1 | 1.62 | 4 | 14 | 5 | 4 | 5 | 12 |
| B1 | 4.36 | 3 | 5 | 4 | 4 | 4 | 4 |
| M2 | 5.34 | 7 | 4 | 4 | 4 | 4 | 3 |
| M3 | 11.33 | 6 | 4 | 5 | 4 | 4 | 4 |
| Ave. (%) | | 7 | 7 | 5 | 4 | 4 | 5 |
| RSD (%) | | 63 | 57 | 18 | 18 | 13 | 54 |

As noted in preceding sections in the Example above, air entrainment in FA-cement (50:50) pastes, using a conventional AEA, exhibits high variability: Air 30 alone (0.1 wt %) entrains an average of 7% air in the different FA-cement pastes, with a relative standard deviation of 63%.

In combination with most of the sacrificial agents, Air 30 entrained somewhat less air on the average, but the RSD was reduced considerably in many cases; the reduction in RSD was particularly important with 1-naphthoic acid, sodium di-isopropyl naphthalene sulfonate and ethylene glycol phenyl ether, with RSD values less than 20%.

An additional important aspect of the present invention is the finding of a class of sacrificial agents which can reduce the variability of air entrainment in cementitious systems containing different fly ash materials with vastly different properties; particularly useful candidates are ethylene glycol phenyl ether, sodium di-isopropyl naphthalene sulfonate and 1-naphthoic acid.

Example 4

Air entrained (vol %) at 66 min in 50:50 fly ash:PCA cement paste by 1 part of Air 30 (0.0125%) alone and different parts (or at varying ratios) of two sacrificial agents's (sodium di-isopropyl naphthalene sulfonate (ND) and ethylene glycol phenyl ether (EGPE)), (Maximum air protocol) (Results in Table 8).

Addition of ethylene glycol phenyl ether at four (4) times the fixed Air 30 dosage yields an increase in the air entrained (7%), and a significant reduction in RSD (col. 5).

Addition of sodium di-isopropyl naphthalene sulfonate at four (4) times the fixed Air 30 dosage yields a significant increase in the air entrained (14%) in all fly ash:cement pastes, and an important reduction in RSD values (col. 4).

Adding selected combinations of the two sacrificial agents, ethylene glycol phenyl ether and sodium di-isopropyl naphthalene sulfonate, yields further improvement: Higher average % air entrained and lower RSD values (col. 6-10).

A further important aspect of the present invention is the finding that the use of combinations of sacrificial agents having different molecular properties and adsorption/precipitation behaviour further reduces the variability in the % air in different fly ash:cement pastes.

Example 5

Air entrained (vol %) at 66 min in 50:50 fly ash:PCA cement paste by 1 part of Air 30 (0.0125 wt %) combined with

TABLE 8

| | | | | | Col. | | | | |
|---|---|---|---|---|---|---|---|---|---|
| 1 | 2 | 3 | 4 | 5 | 6 | 7 | 8 | 9 | 10 |
| Line fly ash | LOI (%) | Air 30 | Air 30/ND | Air 30/EGPE | | | Air 30/ND/EGPE | | |
| | | | | Ratio | | | | | |
| | | 1 (0.0125%) | 1/4 | 1/4 | 1/1/2 | 1/1/4 | 1/1/6 | 1/2/4 | 1/4/4 |
| 1 PCA | | 6 | 16 | 8 | 6 | 13 | 13 | 14 | 23 |
| 2 R | 0.21 | 3 | 17 | 11 | 15 | 17 | 17 | 18 | 18 |
| 3 D | 0.25 | 4 | 17 | 13 | 19 | 19 | 19 | 19 | 22 |
| 4 M1 | 0.35 | 4 | 18 | 10 | 14 | 16 | 18 | 17 | 18 |
| 5 C1 | 1.62 | 3 | 17 | 10 | 12 | 14 | 15 | 15 | 19 |
| 6 B1 | 4.36 | 0 | 11 | 3 | 4 | 7 | 8 | 11 | 14 |
| 7 M2 | 5.34 | 0 | 6 | 1 | 4 | 6 | 8 | 9 | 11 |
| 8 M3 | 11.33 | 0 | 10 | 3 | 5 | 7 | 8 | 10 | 13 |
| 9 Ave. (%) | | 2 | 14 | 7 | 11 | 12 | 13 | 14 | 17 |
| 10 RSD (%) | | 86 | 32 | 65 | 58 | 43 | 38 | 29 | 23 |

Using the 'maximum air' test protocol and Air 30 at a dosage typical of that used for air entrainment in concrete, the air entrained in the fly ash-cement pastes averaged 2% with a RSD value of 86% (col. 3).

4 parts (0.05 wt %) of sodium di-isopropyl naphthalene sulfonate (ND) and 4 parts of various other non ionic sacrificial agents (X), (Air 30/ND/X=1/4/4), (Maximum air protocol) (Results in Table 9).

TABLE 9

| Line | fly ash | LOI (%) | EGPE | EGME | Di-EGBE | 1-Phe 2-Pro | Di-PGME | Glycerol | PEG 200 | PEG 1500 |
|---|---|---|---|---|---|---|---|---|---|---|
| 1 | PCA | | 23 | 18 | 22 | 17 | 23 | 16 | 18 | 20 |
| 2 | R | 0.21 | 18 | 17 | 22 | 16 | 20 | 18 | 18 | 18 |
| 3 | D | 0.25 | 22 | 20 | 24 | 18 | 25 | 18 | 20 | 21 |
| 4 | M1 | 0.35 | 18 | 17 | 21 | 16 | 20 | 16 | 19 | 18 |
| 5 | C1 | 1.62 | 19 | 20 | 21 | 18 | 21 | 18 | | |
| 6 | B1 | 4.36 | 14 | 12 | 16 | 13 | 16 | 12 | 14 | 14 |
| 7 | M2 | 5.34 | 11 | 8 | 11 | 9 | 11 | 7 | 9 | 9 |
| 8 | M3 | 11.33 | 13 | 12 | 17 | 13 | 15 | 11 | | |
| 9 | Ave. (%) | | 17 | 15 | 19 | 15 | 18 | 14 | 16 | 16 |
| 10 | RSD (%) | | 23 | 31 | 24 | 22 | 25 | 29 | 30 | 28 |

Example 6

Air entrained (vol %) at 66 min in 50:50 fly ash:PCA cement paste by 1 part of Air 30 (0.0125%) combined with 4 parts of sodium 2-naphthalene sulfonate (NS) and 4 parts of various other non-ionic sacrificial agents (X), (Air 30/NS/X=1/4/4), (Maximum air protocol) (Results in Table 10).

TABLE 10

| Line | fly ash | LOI (%) | EGPE | PEG 1500 |
|---|---|---|---|---|
| 1 | PCA |  |  | 11 |
| 2 | R | 0.21 | 11 | 16 |
| 3 | D | 0.25 | 15 | 19 |
| 4 | M1 | 0.35 | 11 | 18 |
| 5 | C1 | 1.62 | 9 |  |
| 6 | B1 | 4.36 | 4 | 8 |
| 7 | M2 | 5.34 | 3 | 5 |
| 8 | M3 | 11.33 | 3 |  |

Example 7

Air entrained (vol %) at 66 min in 50:50 fly ash:PCA cement paste by 1 part of Air 30 (0.0125 wt %) combined with 4 parts (0.05 wt %) of various other sulfonated sacrificial agents (X) and 4 parts of Butoxyethanol (ButOH), (Air 30/X/ButOH=1/4/4), (Maximum air protocol) (Results in Table 11).

TABLE 11

| Line | fly ash | LOI (%) | ND | Cumene | DBNS | NS |
|---|---|---|---|---|---|---|
| 1 | PCA |  | 23 | 14 | 17 | 13 |
| 2 | R | 0.21 |  |  |  |  |
| 3 | D | 0.25 | 24 | 18 | 20 | 18 |
| 4 | M1 | 0.35 |  |  |  |  |
| 5 | C1 | 1.62 |  |  |  |  |
| 6 | B1 | 4.36 | 17 | 7 | 11 | 7 |
| 7 | M2 | 5.34 | 11 | 5 | 7 | 5 |
| 8 | M3 | 11.33 |  |  |  |  |

Observations:

Table 7: Comparing average values of air entrained in the different fly ash:cement pastes, and the corresponding RSD values, several other sacrificial agents in the family of polyols and alcohol ethers, used in conjunction with sodium di-isopropyl naphthalene sulfonate, yield results similar to those found with ethylene glycol phenyl ether.

Table 8: Judging from the % air entrained as function of increasing fly ash carbon, the sodium 2-naphthalene sulfonate/ethylene glycol phenyl ether and sodium 2-naphthalene sulfonate/PEG combinations provide some improvement, though their performance is lower than that of sodium di-isopropyl naphthalene sulfonate/ethylene glycol phenyl ether.

Table 9: Again from examination of the % air entrained, the sacrificial agents combinations involving Butoxyethanol and several sulfonated sacrificial agents, also yield substantial improvements, though again, their performance is lower than that of sodium di-isopropyl naphthalene sulfonate/ethylene glycol phenyl ether These observations broadly identify two preferred classes of valuable sacrificial agents: sulfonated aromatics and glycols or glycol derivatives; most preferred is the sodium di-isopropyl naphthalene sulfonate/ethylene glycol phenyl ether combination.

Data from Tables 7 to 11 particularly indicate the value of two groups of chemicals:

1—Salts of sulfonated aromatic compounds derived from benzene or naphthalene, and bearing other alkyl residues (methyl, butyl, iso-propyl)

2—Low molecular weight glycol and glycol derivatives, namely ethers bearing an alkyl or aryl group.

Individual chemicals from other categories, such as amines (benzylamine worked well in mortars), sodium naphthoate (worked well in pastes); 20 or so other products from different chemical families were screened out of the test, early in the protocol.

The two main groups of sacrificial agents identified may be loosely classified in the family of hydrotropes ('Any species that enhances the solubility of another' (in water); 'Examples: alkyl-aryl sulfonates such as toluene sulfonate' (The Language of Colloid an Interface Science, A dictionnary of Terms', Laurel, L Schram, ACS Professional Reference Book, American Chemical Society, Washington, D.C., 1993). The low molecular weight glycol derivatives would also qualify as hydrotropes.

Hence, in addition to the requirements set forth by the detailed protocol for selection of potential candidates, most of the experimental results indicate that successful candidates need not be surfactants, but should exhibit 'hydrotropic' features.

Examples Pertaining to Air Entrainment in Mortars

Experimental Protocols

Air entrainment were measured in mortars containing portland cement only (control), or a combination of portland cement and fly ash in the ratio 70:30;

The mix compositions are given in the Table below and the measurements were performed according to standard protocols described in ASTM C185-88

| Components | Weight | Wt % (actives/CM) |
|---|---|---|
| Fly ash | 105 g | 30 |
| Ordinary portland cement | 245 g | 70 |
| Sand 20-30 | 1400 g | 400 |
| Air 30 (3.5 wt % solid) | 0.9 oz/cwt | 0.002 |
| or Air 40 (12 wt % solid) | 0.6 oz/cwt | 0.005 |
| SA (100 wt % solid) | 0.175 g | 0.05 |
| Water | 210-280 (To obtain a flow of 80-95% after 10 drops of flow table) W/B = 0.6-0.8 | |

Results

Example 8

Influence of selected sacrificial agents at 0.05 wt % on air entrainment by 0.002 wt % Air 30 in (30:70) fly ash:cement mortars or 0.0017 wt % Air 30 in PCA cement mortars (Results in Table 12).

TABLE 12

| Fly Ash | LOI (%) | 0.002 wt % Air 30 | +0.05 wt % EGPE | +0.05 wt % BA | +0.05 wt % NS |
|---|---|---|---|---|---|
| PCA (0.0017%) | | 11.4 | 14.0 | 11.4 | 13.4 |
| D | 0.13 | 7.4 | 14.9 | 13.2 | 11.4 |
| R | 0.17 | 7.8 | 13.5 | 13.4 | 12.0 |
| M1 | 0.21 | 1.5 | 5.4 | 4.7 | 5.8 |
| C1 | 0.70 | 1.1 | 4.7 | 3.9 | 4.3 |
| C3 | 2.54 | 3.3 | 5.9 | 6.0 | 4.8 |
| C2 | 3.04 | 2.4 | 6.9 | 5.9 | 5.9 |
| M3 | 3.15 | 1.9 | 7.6 | 1.5 | 6.9 |
| B1 | 5.01 | 0.0 | 3.6 | 3.0 | 4.0 |
| H1 | 8.45 | 0.0 | 3.1 | 1.8 | 2.7 |
| M2 | 8.78 | 0.0 | 2.8 | 2.1 | 2.8 |
| Average (%) | | 2.5 | 6.8 | 5.6 | 6.1 |
| RSD (%) | | 107 | 58 | 75 | 51 |

Observations:

In mortars, air entrainment by Air 30 alone is strongly reduced with many of the fly ash having high carbon content and several fly ash having low carbon; the RSD value is extremely high, in excess of 100%.

With combinations of Air 30 with different candidate sacrificial agents, the average % air increases substantially, and the variability, illustrated by the RSD values is decreased by approximately 50% in the case of ethylene glycol phenyl ether and sodium 2-naphthalene sulfonate.

Example 9

Influence of selected sacrificial agents at 0.05 wt % or 0.1 wt % (case of EGPE only) on air entrainment by 0.005 wt % Air 40 in (30:70) fly ash:cement mortars or 0.004 wt % Air 40 in PCA cement mortars (Results in Table 13).

TABLE 13

Figure 1:
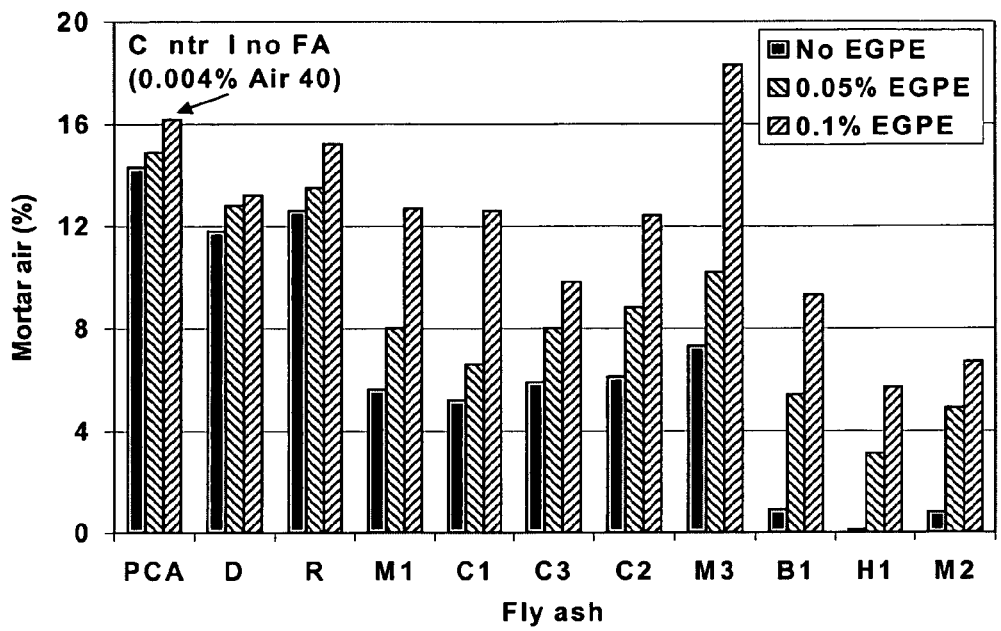
FIG. 1 is a chart based on the results shown in Table 13 below which illustrates how the addition of the sacrificial agent EGPE changes the air entrainment in mortars with and without fly ash. Each group of 3 bars shows air entrained with: first 0.005% Air 40 only; second 0.005% Air 40 plus 0.05% EGPE and third 0.005% Air 40 plus 0.1% EGPE. The bars identified 'PCA' refer to results obtained in control mortars containing 0.004% Air 40 and no fly ash.

(results of col. 2 and 3 shown in FIG. 1)

| | | Column | | | | |
|---|---|---|---|---|---|---|
| | | 1 | 2 | 3 | 4 | 5 |
| Fly Ash | LOI (%) | 0.005 wt % Air 40 | +0.05 wt % EGPE | +0.1 wt % EGPE | +0.05 wt % BA | +0.05 wt % NS |
| PCA (0.004%) | | 14.3 | 14.9 | 16.2 | 14.2 | 14.8 |
| D | 0.13 | 11.8 | 12.8 | 13.2 | 11.2 | 12.6 |
| R | 0.17 | 12.6 | 13.5 | 15.2 | 12.7 | 13.7 |
| M1 | 0.21 | 5.6 | 8.0 | 12.7 | 7.2 | 8.2 |
| C1 | 0.70 | 5.2 | 6.6 | 12.6 | 5.4 | 7.2 |
| C3 | 2.54 | 5.9 | 8.0 | 9.8 | 7.5 | 7.8 |
| C2 | 3.04 | 6.1 | 8.8 | 12.4 | 6.7 | 7.5 |
| M3 | 3.15 | 7.3 | 10.2 | 18.3 | 8.2 | 10.0 |
| B1 | 5.01 | 0.9 | 5.4 | 9.3 | 4.3 | 5.6 |
| H1 | 8.45 | 0.1 | 3.1 | 5.7 | 2.4 | 3.0 |
| M2 | 8.78 | 0.8 | 4.9 | 6.7 | 3.9 | 5.0 |
| Average (%) | | 5.6 | 8.1 | 12 | 6.9 | 8.0 |
| RSD (%) | | 73 | 39 | 32 | 44 | 39 |

Observations:

The results obtained with Air 40 are similar to those observed with Air 30: in the presence of the same sacrificial agents, a significant increase in the % air entrained and a strong reduction in the RSD values.

In the mortar containing PCA only, the air level is high and it is not significantly affected by addition of the SA. The same is true in mortars with FA which allow reasonable air entrainment, e.g. D and R fly ash. With other fly ash where air entrainment is low with Air 40 only, the presence of EGPE increases the level of air entrained very substantially in all cases tested.

These observations confirm, for mortars, the findings described earlier in fly ash:cement pastes for single sacrificial agents, with common concrete air entrainment agents tested: the proposed sacrificial agents can increase air content and reduce the % air variability among the different fly ashes.

Examples Pretaining to Air Entrainment in Concrete

Experimental Protocols

Air entrainment in fresh concrete mixtures were performed according to protocols described in ASTM C 231-97 with mix proportions as given below. In all concrete containing fly ash, the fly ash content was fixed at 25%. The dosage of air entrainment agents and of sacrificial agents are reported in the various Table of results presented below.

| Ingredient (per yard$^3$ of concrete) | Weight (lbs) |
|---|---|
| FA | 112.5 (25%) |
| Cement | 337.5 |
| River sand | 1285-1335 |
| ¾ inch crushed lime stone | 1650 |
| Water | 260-300 |

-continued

| Ingredient (per yard$^3$ of concrete) | Weight (lbs) |
|---|---|
| (To obtain a slump of 5-6 inches) W/B = 0.58-0.67 | |

The sacrificial agents were added to the cementitious mixtures in several ways:

1) mixing together with water and air entrainment agent solution
2) premixed with the fly ash
3) post-added into the fresh concreteconcrete which already contained the air entrainment agent.

Results

Results Pertaining to the Influence of Sacrificial Agents on Air Entrainment in Portland Cement Concrete (No Fly Ash)

This section is included to demonstrate the behaviour of the sacrificial agents and combinations of air entrainment and sacrificial agents in normal PC concrete, or concrete which would contained ideal, problem-free fly ash. The results are also intended to further distinguish between the properties of the sacrificial agents and those of the conventional air entrainment agents.

Example 10

Air entrainment by ethylene glycol phenyl ether alone at various dosages in PCC cement concrete (no fly ash) (Results in Table 14).

TABLE 14

| Line | Air 40% CM | ND % CM | EGPE % CM | Total SA % CM | ND/EGPE | Cement | fly ash | Fly ash % | LOI % | Air % |
|---|---|---|---|---|---|---|---|---|---|---|
| 1 | 0.000 | | 0.000 | 0.00 | | PCC | | | | 1.0 |
| 2 | 0.000 | | 0.010 | 0.01 | | PCC | | | | 1.9 |
| 3 | 0.000 | | 0.015 | 0.02 | | PCC | | | | 1.7 |
| 4 | 0.000 | | 0.030 | 0.03 | | PCC | | | | 2.0 |
| 5 | 0.000 | | 0.050 | 0.05 | | PCC | | | | 2.0 |
| 6 | 0.000 | | 0.075 | 0.08 | | PCC | | | | 2.1 |
| 7 | 0.000 | | 0.100 | 0.10 | | PCC | | | | 2.1 |

Observations:

The addition of a sacrificial agents such as ethylene glycol phenyl ether in cement-only concrete (without air entrainment agents) leads to an increase of about 1% in air entrained above the control values, even at very high dosages (line 7); such an effect is not significant in concrete practice, and thus ethylene glycol phenyl ether can be used even in concrete without fly ash (an excess of ethylene glycol phenyl ether does not effect the air entrained in cement concrete).

Example 11

Air entrainment by sodium di-isopropyl naphthalene sulfonate alone at various dosages in PCC cement concrete (no fly ash) (Results in Table 15).

TABLE 15

| Line | Air 40% CM | ND % CM | EGPE % CM | Total SA % CM | ND/EGPE | Cement | fly ash | Fly ash % | LOI % | Air % |
|---|---|---|---|---|---|---|---|---|---|---|
| 1 | 0.000 | 0.000 | | 0.00 | | PCC | | | | 1.0 |
| 2 | 0.000 | 0.001 | | 0.00 | | PCC | | | | 2.3 |
| 3 | 0.000 | 0.003 | | 0.00 | | PCC | | | | 4.1 |
| 4 | 0.000 | 0.003 | | 0.00 | | PCC | | | | 3.1 |
| 5 | 0.000 | 0.005 | | 0.01 | | PCC | | | | 4.6 |
| 6 | 0.000 | 0.005 | | 0.01 | | PCC | | | | 4.8 |
| 7 | 0.000 | 0.005 | | 0.01 | | PCC | | | | 4.6 |
| 8 | 0.000 | 0.010 | | 0.01 | | PCC | | | | 4.6 |
| 9 | 0.000 | 0.020 | | 0.02 | | PCC | | | | 3.9 |
| 10 | 0.000 | 0.030 | | 0.03 | | PCC | | | | 3.8 |
| 11 | 0.000 | 0.040 | | 0.04 | | PCC | | | | 3.9 |

Observations:

The incorporation of sodium di-isopropyl naphthalene sulfonate in cement-only concrete without air entrainment agents leads to a significant increase of the entrained air, i.e., 2-3% above control, The % air increment is low compared to conventional air entrainment agents at similar dosages and it does not vary substantially with sodium di-isopropyl naphthalene sulfonate concentration In applications where air entrainment is undesirable, the dosage of sacrificial agents having some surfactant character, such as sodium di-isopropyl naphthalene sulfonate, must be kept below some critical values.

Example 12

Air entrainment by sodium di-isopropyl naphthalene sulfonate and ethylene glycol phenyl ether together at different ratios and total dosages in PCC cement concrete (no fly ash) (Results in Table 16).

TABLE 16

| Line | Air 40 % CM | ND % CM | EGPE % CM | Total SA % CM | ND/ EGPE | Cement | fly ash | Fly ash % | LOI % | Air % |
|---|---|---|---|---|---|---|---|---|---|---|
| 1 | 0.000 |  | 0.000 | 0.00 |  | PCC |  |  |  | 1.0 |
| 1 | 0.000 | 0.001 | 0.010 | 0.01 | 1/8 | PCC |  |  |  | 3.5 |
| 2 | 0.000 | 0.002 | 0.015 | 0.02 | 1/8 | PCC |  |  |  | 3.8 |
| 3 | 0.000 | 0.004 | 0.030 | 0.03 | 1/8 | PCC |  |  |  | 3.8 |
| 4 | 0.000 | 0.006 | 0.050 | 0.06 | 1/8 | PCC |  |  |  | 4.4 |
| 5 | 0.000 | 0.009 | 0.075 | 0.08 | 1/8 | PCC |  |  |  | 3.4 |
| 6 | 0.000 | 0.003 | 0.010 | 0.01 | 1/4 | PCC |  |  |  | 3.8 |
| 7 | 0.000 | 0.004 | 0.015 | 0.02 | 1/4 | PCC |  |  |  | 3.5 |
| 8 | 0.000 | 0.008 | 0.030 | 0.04 | 1/4 | PCC |  |  |  | 4.1 |
| 9 | 0.000 | 0.013 | 0.050 | 0.06 | 1/4 | PCC |  |  |  | 3.6 |
| 10 | 0.000 | 0.019 | 0.075 | 0.09 | 1/4 | PCC |  |  |  | 3.6 |
| 11 | 0.000 | 0.005 | 0.010 | 0.02 | 1/2 | PCC |  |  |  | 5.1 |
| 12 | 0.000 | 0.008 | 0.015 | 0.02 | 1/2 | PCC |  |  |  | 5.2 |
| 13 | 0.000 | 0.015 | 0.030 | 0.05 | 1/2 | PCC |  |  |  | 4.1 |
| 14 | 0.000 | 0.025 | 0.050 | 0.08 | 1/2 | PCC |  |  |  | 3.9 |
| 15 | 0.000 | 0.038 | 0.075 | 0.11 | 1/2 | PCC |  |  |  | 3.7 |

Observations:

As shown by the results in Table 15, the addition of two sacrificial agents, ethylene glycol phenyl ether and sodium di-isopropyl naphthalene sulfonate, at varying dosages and ratios in cement-only concrete, without air entrainment agents, was found to increase the % air entrained above the control by 2-4%, The influence of the ethylene glycol phenyl ether-sodium di-isopropyl naphthalene sulfonate combination is similar to that of the sodium di-isopropyl naphthalene sulfonate alone so there is no significant synergy in air entrainment by these two sacrificial agents alone in the absence of air entrainment agents and fly ash.

Example 13

Influence of ethylene glycol phenyl ether at various dosages on Air entrainment by Air 40 (0.003 and 0.006 wt %) in PCA cement concrete (Results in Table 17).

Observations:

The presence of ethylene glycol phenyl ether in cement-only concrete containing an air entrainment agents leads to a slight increase in the % air entrained values. Thus, the results show that, in normal cement concrete (no fly ash), the addition of increasing levels of EGPE up to rather high dosages has no significant influence on air entrainment observed at a fixed dosage of Air 40 (0.003 or 0.006 wt %).

The sacrificial agents of the present invention do not alter the air entrainment performance of the conventional air entrainment agents used at 'normal' or 'typical' dosages.

Example 14

Influence of sodium di-isopropyl naphthalene sulfonate together with ethylene glycol phenyl ether, or with ethylene glycol methyl ether, at various ratios and total dosage, on air entrainment by Air 40 (0.008 wt %) in PCA cement concrete (Results in Table 18).

TABLE 17

Figure 2:
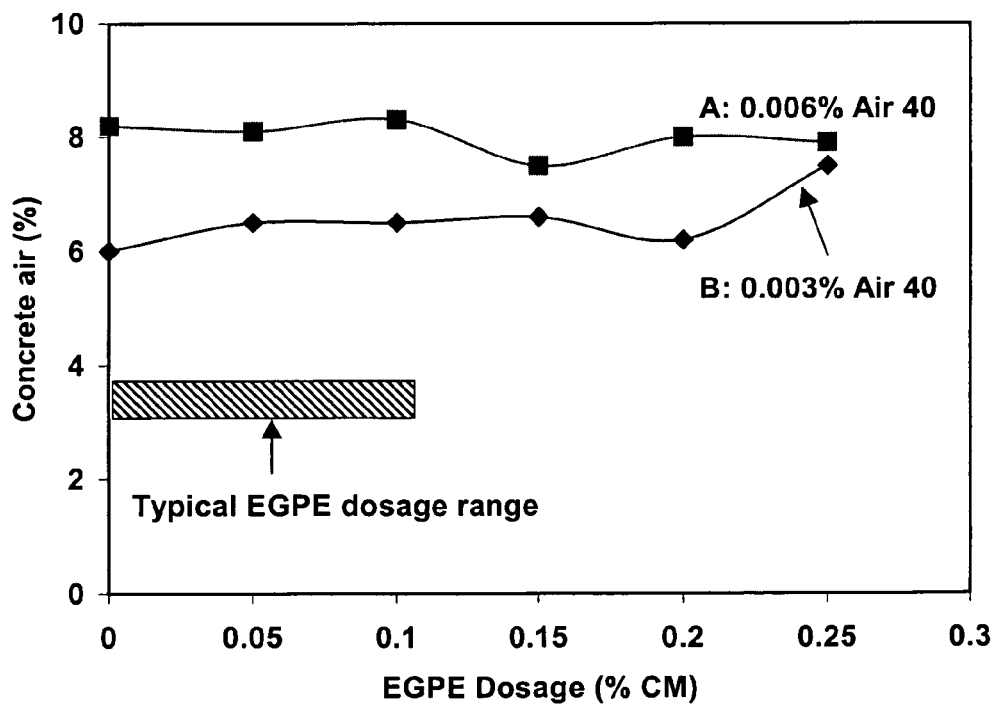
FIG. 2 is a graph based in the results shown in Table 17 below. The graph shows the amount of air entrained in concrete containing no fly ash, a conventional air entrainment agent (Air 40) and increasing amounts of a sacrificial agent according to the present invention (EGPE). Trace A shows the results for mixtures containing 0.006% Air 40 and Trace B shows the results for mixtures containing 0.003% Air 40. The horizontal shaded bar illustrates the range of typical EGPE dosages.

(results shown in FIG. 2)

| Line | Air 40 % CM | ND % CM | EGPE % CM | Total SA % CM | ND/ EGPE | Cement | fly ash | fly ash % | LOI % | Air % |
|---|---|---|---|---|---|---|---|---|---|---|
| 1 | 0.003 |  | 0.000 | 0.00 |  | PCA |  |  |  | 6.0 |
| 2 | 0.003 |  | 0.050 | 0.05 |  | PCA |  |  |  | 6.5 |
| 3 | 0.003 |  | 0.100 | 0.10 |  | PCA |  |  |  | 6.5 |
| 4 | 0.003 |  | 0.150 | 0.15 |  | PCA |  |  |  | 6.6 |
| 5 | 0.003 |  | 0.200 | 0.20 |  | PCA |  |  |  | 6.2 |
| 6 | 0.003 |  | 0.250 | 0.25 |  | PCA |  |  |  | 7.5 |
| 7 | 0.006 |  | 0.000 | 0.00 |  | PCA |  |  |  | 8.2 |
| 8 | 0.006 |  | 0.050 | 0.05 |  | PCA |  |  |  | 8.1 |
| 9 | 0.006 |  | 0.100 | 0.10 |  | PCA |  |  |  | 8.3 |
| 10 | 0.006 |  | 0.150 | 0.15 |  | PCA |  |  |  | 7.5 |
| 11 | 0.006 |  | 0.200 | 0.20 |  | PCA |  |  |  | 8.0 |
| 12 | 0.006 |  | 0.250 | 0.25 |  | PCA |  |  |  | 7.9 |

TABLE 18

| Line | Air 40 % CM | ND % CM | EGPE % CM | Total SA % CM | ND/ EGPE | Cement | fly ash | fly ash % | LOI % | Air % |
|---|---|---|---|---|---|---|---|---|---|---|
| 1 | 0.008 | 0.000 | 0.000 | 0.00 |  | PCA |  |  |  | 7.8 |
| 2 | 0.008 | 0.000 | 0.035 | 0.04 |  | PCA |  |  |  | 6.2 |
| 3 | 0.008 | 0.018 | 0.035 | 0.05 | 1/2 | PCA |  |  |  | 8.5 |
| 4 | 0.008 | 0.035 | 0.035 | 0.07 | 1/1 | PCA |  |  |  | 7.0 |
| 5 | 0.008 | 0.000 | 0.075 | 0.08 |  | PCA |  |  |  | 6.2 |
| 6 | 0.008 | 0.038 | 0.075 | 0.11 | 1/2 | PCA |  |  |  | 6.4 |
| 7 | 0.008 | 0.075 | 0.075 | 0.15 | 1/1 | PCA |  |  |  | 6.2 |

| Line | Air 40 % CM | ND % CM | EGME % CM | Total SA % CM | ND/ EGME | Cement | fly ash | fly ash % | LOI % | Air % |
|---|---|---|---|---|---|---|---|---|---|---|
| 8 | 0.008 | 0.000 | 0.050 | 0.05 |  | PCA |  |  |  | 7.2 |
| 9 | 0.008 | 0.025 | 0.050 | 0.08 | 1/2 | PCA |  |  |  | 7.5 |
| 10 | 0.008 | 0.050 | 0.050 | 0.10 | 1/1 | PCA |  |  |  | 6.8 |

Observations:

In cement-only concrete containing Air 40 as the air entrainment agent, the % air entrained does not vary significantly in the presence of various sacrificial agents combinations: sodium di-isopropyl naphthalene sulfonate with either ethylene glycol phenyl ether or ethylene glycol methyl ether.

These results confirm that the proposed sacrificial agents, and sacrificial agents combinations, have little or no influence on the air entrainment properties of some commercial air entrainment agents in cement-only concrete.

The performance sacrificial agents of the present invention are not significantly affected by differences in the chemical composition of cements PCC (previous results) and PCA (Tables 17 and 18).

Example 15

Influence of concrete chemical admixtures (Superplasticizer, SP; Water reducer, LW and set accelerator, AC) on air entrainment in PCA concrete by Air 40 (0.008%) in the presence of ethylene glycol phenyl ether as the sacrificial agent (Results in Table 19).

Observations:

At a fixed dosage of Air 40, the % air entrained is not significantly influenced by either:
  A ten-fold increase of the dosage of the SA (comparing lines 2 to 4, lines 5 to 8).
  The simultaneous addition of various other concrete admixtures:
    SP a PNS superplasticizer (comparing line 1 with lines 2 to 4)
    LW: a lignin-based water (comparing line 5 with lines 6 to 8)
    AC: a calcium-based set accelerator (comparing line 9 with lines 10 to 12)
  An additional finding of the present invention is that the role of ethylene glycol phenyl ether as a sacrificial agents of the present invention is not substantially altered by other common concrete chemical admixtures. Conversely, the sacrificial agents does not affect the performance of these other chemical admixtures.

Example 16

Influence of concrete admixtures (same as in previous Table) on air entrainment in PCA concrete by Air 40 (0.004, 0.006, 0.008 wt %) with sodium di-isopropyl naphthalene sulfonate and ethylene glycol methyl ether (EGME) as sacrificial agents at varying total dosage and fixed 1:2 ratio (Results in Table 20).

TABLE 19

| Line | Air 40 % CM | ND % CM | EGPE % CM | Total SA % CM | ND/ EGPE | Cement | SP % CM | LW % CM | AC % CM | Air % |
|---|---|---|---|---|---|---|---|---|---|---|
| 1 | 0.008 |  | 0.000 | 0.00 |  | PCA | 0.401 |  |  | 8.6 |
| 2 | 0.008 |  | 0.065 | 0.07 |  | PCA | 0.401 |  |  | 8.0 |
| 3 | 0.008 |  | 0.378 | 0.38 |  | PCA | 0.401 |  |  | 8.9 |
| 4 | 0.008 |  | 0.756 | 0.76 |  | PCA | 0.401 |  |  | 6.9 |
| 5 | 0.008 |  | 0.000 | 0.00 |  | PCA |  | 0.107 |  | 9.4 |
| 6 | 0.008 |  | 0.065 | 0.07 |  | PCA |  | 0.107 |  | 9.6 |
| 7 | 0.008 |  | 0.378 | 0.38 |  | PCA |  | 0.107 |  | 8.3 |
| 8 | 0.008 |  | 0.756 | 0.76 |  | PCA |  | 0.107 |  | 8.0 |
| 9 | 0.008 |  | 0.000 | 0.00 |  | PCA |  |  | 0.587 | 8.0 |
| 10 | 0.008 |  | 0.065 | 0.07 |  | PCA |  |  | 0.587 | 7.9 |
| 11 | 0.008 |  | 0.378 | 0.38 |  | PCA |  |  | 0.587 | 7.1 |
| 12 | 0.008 |  | 0.756 | 0.76 |  | PCA |  |  | 0.587 | 6.3 |

TABLE 20

| Line | Air 40 % CM | ND % CM | EGME % CM | Total SA % CM | ND/ EGME | Cement | SP % CM | LW % CM | AC % CM | Air % |
|---|---|---|---|---|---|---|---|---|---|---|
| 1 | 0.004 | 0.000 | 0.000 | 0.00 |  | PCA | 0.401 |  |  | 7.1 |
| 2 | 0.004 | 0.018 | 0.035 | 0.05 | 1/2 | PCA | 0.401 |  |  | 3.2 |
| 3 | 0.004 | 0.025 | 0.050 | 0.08 | 1/2 | PCA | 0.401 |  |  | 3.2 |
| 4 | 0.004 | 0.038 | 0.075 | 0.11 | 1/2 | PCA | 0.401 |  |  | 3.0 |
| 5 | 0.006 | 0.000 | 0.000 | 0.00 |  | PCA |  | 0.107 |  | 7.6 |
| 6 | 0.006 | 0.018 | 0.035 | 0.05 | 1/2 | PCA |  | 0.107 |  | 9.0 |
| 7 | 0.006 | 0.038 | 0.075 | 0.11 | 1/2 | PCA |  | 0.107 |  | 8.5 |
| 8 | 0.008 | 0.000 | 0.000 | 0.00 |  | PCA |  |  | 0.587 | 7.5 |
| 9 | 0.008 | 0.018 | 0.035 | 0.05 | 1/2 | PCA |  |  | 0.587 | 8.5 |
| 10 | 0.008 | 0.038 | 0.075 | 0.11 | 1/2 | PCA |  |  | 0.587 | 5.8 |

Observations:

In the presence of an alternate sacrificial agents combination sodium di-isopropyl naphthalene sulfonate/ethylene glycol methyl ether, the % air entrained by Air 40 is decreased in the presence of the superplasticizer (comparing lines 1-4), but not significantly modified by either the water reducer (LW, lines 5-7) or the set accelerator (AC, lines 8-10);

A slight reduction in % air entrained by the superplasticizer is not uncommon in concrete air entrainment (lines 1 to 4) and is easily dealt with in practice.

Further findings of the present invention:

Sacrificial agents use in conjunction with the main types of other concrete chemical admixtures do not lead to erratic air entrainment behaviours.

The sacrificial agents of the present invention are compatible with other types of concrete chemical admixtures, i.e., there is no detrimental influence on the respective function of these admixtures.

Results Pertaining to the Influence of Sacrificial Agents on Air Entrainment with Air 40 in Concrete containing B1-Fly Ash and PCA Cement at a Fixed Ratio of 25:75

The following examples were carried out to study the influence of dosage and ratio of most preferred SA with the same cement and FA from a constant source but varying LOI.

Example 17

Influence of ethylene glycol phenyl ether (0.1 wt %) on air entrainment with Air 40 at various dosages in B1 fly ash:PCA concrete;
B1 fly ash at 1.94% LOI (Results in Table 21).

Observations:

In the presence of a fly ash with a relatively low LOI, the % air entrained with a normal Air 40 dosage (0.003 wt %) is strongly depressed.

The addition of ethylene glycol phenyl ether (0.1 wt %) allows adequate air entrainment with the lowest (normal) air entrainment agents dosages.

In the presence of the sacrificial agents, the % air increases predictably with increasing dosage of Air 40.

It is thus further confirmed that the sacrificial agents of the present invention perform their intended function: allow the air entrainment agents to entrain normal levels of air, without significantly contributing themselves to the air entrainment.

Example 18

Influence of ethylene glycol phenyl ether (0.1 wt %) on air entrainment with Air 40 at various dosages in B1 fly ash:PCA concrete;

B1 fly ash at 4.7% LOI (Results in Table 22).

TABLE 21

| Line | Air 40 % CM | ND % CM | EGPE % CM | Total SA % CM | ND/ EGPE | Cement | fly ash | fly ash % | LOI % | Air % |
|---|---|---|---|---|---|---|---|---|---|---|
| 1 | 0.003 |  | 0.000 | 0.00 |  | PCA | B1 | 25 | 1.9 | 1.6 |
| 2 | 0.006 |  | 0.000 | 0.00 |  | PCA | B1 | 25 | 1.9 | 4.3 |
| 3 | 0.009 |  | 0.000 | 0.00 |  | PCA | B1 | 25 | 1.9 | 5.2 |
| 4 | 0.003 |  | 0.100 | 0.10 |  | PCA | B1 | 25 | 1.9 | 5.1 |
| 5 | 0.006 |  | 0.100 | 0.10 |  | PCA | B1 | 25 | 1.9 | 6.2 |
| 6 | 0.009 |  | 0.100 | 0.10 |  | PCA | B1 | 25 | 1.9 | 7.4 |

TABLE 22

| Line | Air 40 % CM | ND % CM | EGPE % CM | Total SA % CM | ND/ EGPE | Cement | fly ash | Fly ash % | LOI % | Air % |
|---|---|---|---|---|---|---|---|---|---|---|
| 1 | 0.003 | | 0.000 | 0.00 | | PCA | B1 | 25 | 4.7 | 1.8 |
| 2 | 0.006 | | 0.000 | 0.00 | | PCA | B1 | 25 | 4.7 | 1.6 |
| 3 | 0.009 | | 0.000 | 0.00 | | PCA | B1 | 25 | 4.7 | 2.6 |
| 4 | 0.003 | | 0.100 | 0.10 | | PCA | B1 | 25 | 4.7 | 3.0 |
| 5 | 0.006 | | 0.100 | 0.10 | | PCA | B1 | 25 | 4.7 | 3.7 |
| 6 | 0.009 | | 0.100 | 0.10 | | PCA | B1 | 25 | 4.7 | 4.5 |

Observations:
For this relatively high LOI fly ash, the % air entrained by Air 40 alone remains low at all dosages examined (2.6%).
In the presence of ethylene glycol phenyl ether, the % air increases with increasing air entrainment agents dosage, towards approx 5%.

Addition of increasing dosages of ethylene glycol phenyl ether (lines 3-7) leads to a substantial increase in the % air and a levelling-off near 6-8 vol %; this ceiling is particularly important for practical reasons, since it guards against excess air when overdosing the ethylene glycol phenyl ether.

Example 19

Influence of ethylene glycol phenyl ether (varying dosage) on air entrainment with Air 40 (0.003 wt %) in B1 fly ash:PCA concrete;
B1 fly ash at 4.7% LOI (Results in Table 23).

Example 20

Influence of ethylene glycol phenyl ether (varying dosage) on air entrainment with Air 40 (0.007 wt %) in B1 fly ash:PCA concrete;
B1 fly ash at 4.7% LOI (Results in Table 24).

TABLE 23

| Line | Air 40 % CM | ND % CM | EGPE % CM | Total SA % CM | ND/ EGPE | Cement | fly ash | Fly ash % | LOI % | Air % |
|---|---|---|---|---|---|---|---|---|---|---|
| 1 | 0.003 | | 0.000 | 0.00 | | PCA | | | | 5.5 |
| 2 | 0.003 | | 0.000 | 0.00 | | PCA | B1 | 25 | 4.7 | 1.0 |
| 3 | 0.003 | | 0.050 | 0.05 | | PCA | B1 | 25 | 4.7 | 2.9 |
| 4 | 0.003 | | 0.100 | 0.10 | | PCA | B1 | 25 | 4.7 | 2.7 |
| 5 | 0.003 | | 0.150 | 0.15 | | PCA | B1 | 25 | 4.7 | 3.6 |
| 6 | 0.003 | | 0.200 | 0.20 | | PCA | B1 | 25 | 4.7 | 5.3 |
| 7 | 0.003 | | 0.250 | 0.25 | | PCA | B1 | 25 | 4.7 | 5.6 |

Observations:
With a high-carbon fly ash. the % air entrained by a normal dosage of Air 40 is strongly depressed (comparing lines 1 and 2).

TABLE 24

| Line | Air 40 % CM | ND % CM | EGPE % CM | Total SA % CM | ND/ EGPE | Cement | fly ash | Fly ash % | LOI % | Air % |
|---|---|---|---|---|---|---|---|---|---|---|
| 1 | 0.007 | | 0.000 | 0.00 | | PCA | | | | 9.0 |
| 2 | 0.007 | | 0.017 | 0.02 | | PCA | | | | 8.7 |
| 3 | 0.007 | | 0.100 | 0.10 | | PCA | | | | 9.5 |
| 4 | 0.007 | | 0.200 | 0.20 | | PCA | | | | 10.0 |
| 5 | 0.007 | | 0.000 | 0.00 | | PCA | B1 | 25 | 4.7 | 2.4 |
| 6 | 0.007 | | 0.017 | 0.02 | | PCA | B1 | 25 | 4.7 | 4.0 |
| 7 | 0.007 | | 0.100 | 0.10 | | PCA | B1 | 25 | 4.7 | 5.7 |
| 8 | 0.007 | | 0.200 | 0.20 | | PCA | B1 | 25 | 4.7 | 8.0 |

Observations:
   The data obtained with a higher dosage of Air 40 (compared to the previous example) shows that:
   In cement-only concrete the % air entrained is not significantly affected by increasing dosages of ethylene glycol phenyl ether (lines 1 to 4).
   Even at this higher Air 40 dosage, the % air entrained remains low in this high LOI fly ash (line 5).
   In the fly ash-cement concrete, increasing dosages of ethylene glycol phenyl ether allow entrainment of air at a level close to that in cement-only concrete (lines 5-8).

Example 21

Influence of sodium di-isopropyl naphthalene sulfonate and ethylene glycol phenyl ether at fixed 1:3 ratio and varying total dosage on air entrainment with Air 40 (varying concentration) in B1 fly ash:PCA concrete;
B1 fly ash at different LOI (Results in Table 25).

Again, overdosing of the sacrificial agents combination (lines 10-12) does not lead to excessive air contents.

An important finding of the invention is that adequate combinations and dosages of the sacrificial agents of the present invention makes it possible to normalize the air entrainment behaviour of fly ash-concrete, regardless of the carbon content of the fly ash.

Example 22

Influence of sodium di-isopropyl naphthalene sulfonate and ethylene glycol phenyl ether at various ratios and total dosages on air entrainment with Air 40 (0.008 wt %) in B1 fly ash:PCA concrete;
B1 fly ash at 4.7% LOI (Results in Table 26).

TABLE 25

| Line | Air 40 % CM | ND % CM | EGPE % CM | Total SA % CM | ND/ EGPE | Cement | fly ash | Fly ash % | LOI % | Air % |
|---|---|---|---|---|---|---|---|---|---|---|
| 1 | 0.000 | 0.000 | 0.000 | 0.00 |  | PCA | B1 | 25 | 2.1 | 1.2 |
| 2 | 0.004 | 0.000 | 0.000 | 0.00 |  | PCA | B1 | 25 | 2.1 | 1.7 |
| 3 | 0.008 | 0.000 | 0.000 | 0.00 |  | PCA | B1 | 25 | 2.1 | 3.7 |
| 4 | 0.012 | 0.000 | 0.000 | 0.00 |  | PCA | B1 | 25 | 2.1 | 5.3 |
| 5 | 0.000 | 0.012 | 0.035 | 0.05 | 1/3 | PCA | B1 | 25 | 3.7 | 4.3 |
| 6 | 0.004 | 0.012 | 0.035 | 0.05 | 1/3 | PCA | B1 | 25 | 3.7 | 5.8 |
| 7 | 0.008 | 0.012 | 0.035 | 0.05 | 1/3 | PCA | B1 | 25 | 3.7 | 7.8 |
| 8 | 0.012 | 0.012 | 0.035 | 0.05 | 1/3 | PCA | B1 | 25 | 3.7 | 8.0 |
| 9 | 0.000 | 0.017 | 0.050 | 0.07 | 1/3 | PCA | B1 | 25 | 5.7 | 4.3 |
| 10 | 0.004 | 0.017 | 0.050 | 0.07 | 1/3 | PCA | B1 | 25 | 5.7 | 6.2 |
| 11 | 0.008 | 0.017 | 0.050 | 0.07 | 1/3 | PCA | B1 | 25 | 5.7 | 9.0 |
| 12 | 0.012 | 0.017 | 0.050 | 0.07 | 1/3 | PCA | B1 | 25 | 5.7 | 8.5 |

Observations:
   At a fixed ratio of sodium di-isopropyl naphthalene sulfonate/ethylene glycol phenyl ether (1/3), and realistic total sacrificial agents dosages (0.05-0.07%), the % air entrained varies smoothly with increasing Air 40 dosage, regardless of the LOI values of the fly ash (2.1, 3.7 and 5.7%),

TABLE 26

Figure 3:
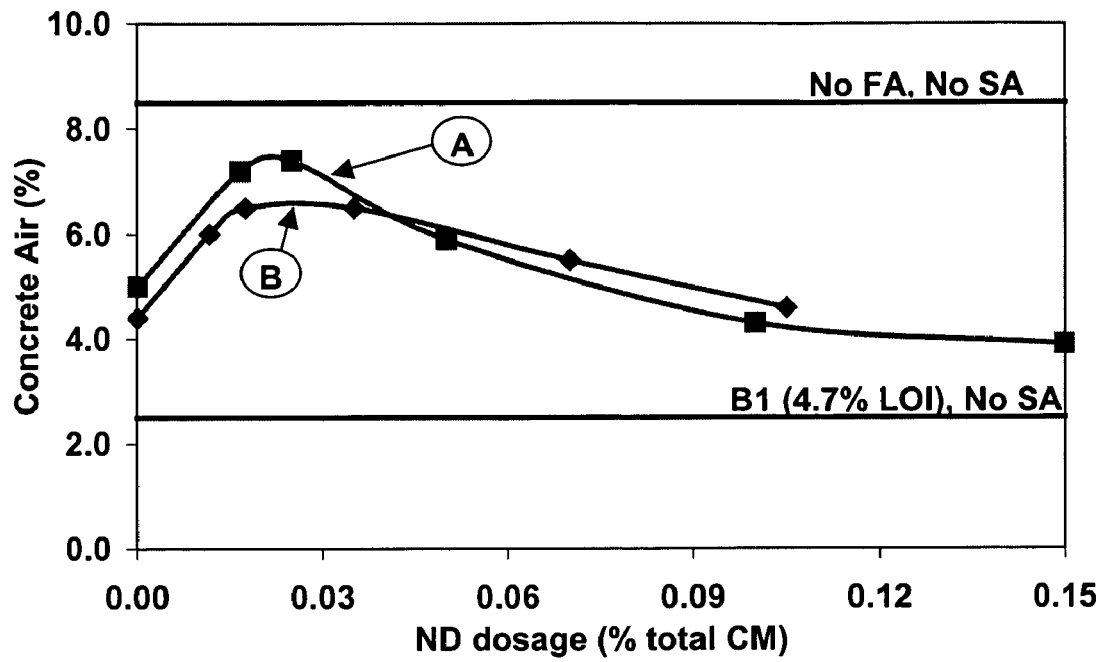
FIG. 3 is a graph based on the results shown in Table 26 which illustrate the influence of increasing dosages of sodium di-isopropyl naphthalene sulfonate (ND) on air entrainment in concrete containing 75% PCA cement and 25% B1 fly ash (4.7% LOI) and Air 40 at 0.008 wt %, and EGPE at 0.05% (curve A) or 0.035% (curve B). The upper line refers to concrete containing Air 40 at 0.008 wt %, but no fly ash and no sacrificial agents. The lower line refers to concrete containing 25% B1 fly ash (4.7% LOI), Air 40 at 0.008 wt % and no sacrificial agents.

(results shown in FIG. 3)

| Line | Air 40% CM | ND % CM | EGPE % CM | Total SA % CM | ND/EGPE | Cement | fly ash | Fly ash % | LOI % | Air % |
|---|---|---|---|---|---|---|---|---|---|---|
| 1 | 0.008 | 0 | 0 | 0 |  | PCA | No FA | 0 |  | 8.5 |
| 2 | 0.008 | 0 | 0 | 0 |  | PCA | B1 | 25 | 4.7 | 2.5 |
| 3 | 0.008 | 0 | 0.035 | 0.035 | 0 | PCA | B1 | 25 | 4.7 | 4.4 |
| 4 | 0.008 | 0.012 | 0.035 | 0.047 | 1/3 | PCA | B1 | 25 | 4.7 | 6 |
| 5 | 0.008 | 0.018 | 0.035 | 0.053 | 1/2 | PCA | B1 | 25 | 4.7 | 6.5 |
| 6 | 0.008 | 0.035 | 0.035 | 0.07 | 1/1 | PCA | B1 | 25 | 4.7 | 6.5 |
| 7 | 0.008 | 0.070 | 0.035 | 0.11 | 2/1 | PCA | B1 | 25 | 4.7 | 5.5 |
| 8 | 0.008 | 0.105 | 0.035 | 0.14 | 3/1 | PCA | B1 | 25 | 4.7 | 4.6 |
| 9 | 0.008 | 0 | 0.050 | 0.05 |  | PCA | B1 | 25 | 4.7 | 5 |
| 10 | 0.008 | 0.017 | 0.050 | 0.07 | 1/3 | PCA | B1 | 25 | 4.7 | 7.2 |
| 11 | 0.008 | 0.025 | 0.050 | 0.08 | 1/2 | PCA | B1 | 25 | 4.7 | 7.4 |
| 12 | 0.008 | 0.050 | 0.050 | 0.10 | 1/1 | PCA | B1 | 25 | 4.7 | 5.9 |
| 13 | 0.008 | 0.100 | 0.050 | 0.15 | 2/1 | PCA | B1 | 25 | 4.7 | 4.3 |
| 14 | 0.008 | 0.150 | 0.050 | 0.20 | 3 | PCA | B1 | 25 | 4.7 | 3.9 |

Observations:
   The % air values obtained show that increasing dosages of ND lead to increased air content but the latter levels-off and even droops again when excess sodium di-isopropyl naphthalene sulfonate dosages are added (as is the benefit of this invention, again distinct from normal AEA for which the air levels would continue to rise).
   At a fixed dosage of ethylene glycol phenyl ether, increasing the sodium di-isopropyl naphthalene sulfonate dosage to high values leads to a slight decrease in air entrained in these mixes (lines 1-3, and lines 5-8); this shows that sodium di-isopropyl naphthalene sulfonate does not behave as an air entrainment agents in the conventional sense.
   A further important finding is that the sacrificial agents of the present invention do not lead to excessive air entrainment when used in excess dosages, a crucial feature for the predictability of air entrainment behaviour.

Example 23

Influence of sodium di-isopropyl naphthalene sulfonate and ethylene glycol methyl ether (EGME) at various ratios and total dosages on air entrainment with Air 40 (0.008 wt %) in B1 fly ash:PCA concrete;
B1 fly ash at 4.7% LOI (Results in Table 27).

fonate/ethylene glycol methyl ether at various ratios and total dosages shows adequate concrete air levels in most cases (5-7%),
At excessive dosage (e.g. line 12) the % air is slightly reduced as observed earlier with the sodium di-isopropyl naphthalene sulfonate/ethylene glycol phenyl ether combination (Table 26); this again shows the absence of detrimental overdosage effect.
The results confirms that ethylene glycol methyl ether can also be used as part of a sacrificial agents combination in fly ash concrete.

Results Pertaining to the Influence of Sacrificial Agents on Air Entrainment in Concrete with Other Fly Ash and Other Cements The following examples are an extension of the study to confirm the applicability of most preferred SA in mixtures containing other combinations of fly ash and cements.

Example 24

Influence of sodium di-isopropyl naphthalene sulfonate (0.0016 wt %) and ethylene glycol phenyl ether at varying

TABLE 27

| Line | Air 40% CM | ND % CM | EGME % CM | Total SA % CM | ND/EGME | Cement | fly ash | Fly ash % | LOI % | Air % |
|---|---|---|---|---|---|---|---|---|---|---|
| 1 | 0.008 | 0.000 | 0.000 | 0.00 | | PCA | B1 | 25 | 4.7 | 2.3 |
| 2 | 0.008 | 0.000 | 0.035 | 0.04 | | PCA | B1 | 25 | 4.7 | 4.0 |
| 3 | 0.008 | 0.012 | 0.035 | 0.05 | 1/3 | PCA | B1 | 25 | 4.7 | 6.2 |
| 4 | 0.008 | 0.018 | 0.035 | 0.05 | 1/2 | PCA | B1 | 25 | 4.7 | 7.5 |
| 5 | 0.008 | 0.035 | 0.035 | 0.07 | 1 | PCA | B1 | 25 | 4.7 | 7.4 |
| 6 | 0.008 | 0.000 | 0.050 | 0.05 | | PCA | B1 | 25 | 4.7 | 4.2 |
| 7 | 0.008 | 0.017 | 0.050 | 0.07 | 1/3 | PCA | B1 | 25 | 4.7 | 6.6 |
| 8 | 0.008 | 0.025 | 0.050 | 0.08 | 1/2 | PCA | B1 | 25 | 4.7 | 7.1 |
| 9 | 0.008 | 0.050 | 0.050 | 0.10 | 1 | PCA | B1 | 25 | 4.7 | 6.6 |
| 10 | 0.008 | 0.025 | 0.075 | 0.10 | 1/3 | PCA | B1 | 25 | 4.7 | 6.7 |
| 11 | 0.008 | 0.038 | 0.075 | 0.11 | 1/2 | PCA | B1 | 25 | 4.7 | 6.8 |
| 12 | 0.008 | 0.075 | 0.075 | 0.15 | 1 | PCA | B1 | 25 | 4.7 | 4.8 |

Observations:
   The % air entrained by Air 40 with the sacrificial agent combination sodium di-isopropyl naphthalene suldosages on air entrainment with Air 40 (0.005%)) in H2 fly ash:PCC concrete;
H2 fly ash at 3.6 and 4.9% LOI (Results in Table 28).

TABLE 28

Figure 4:
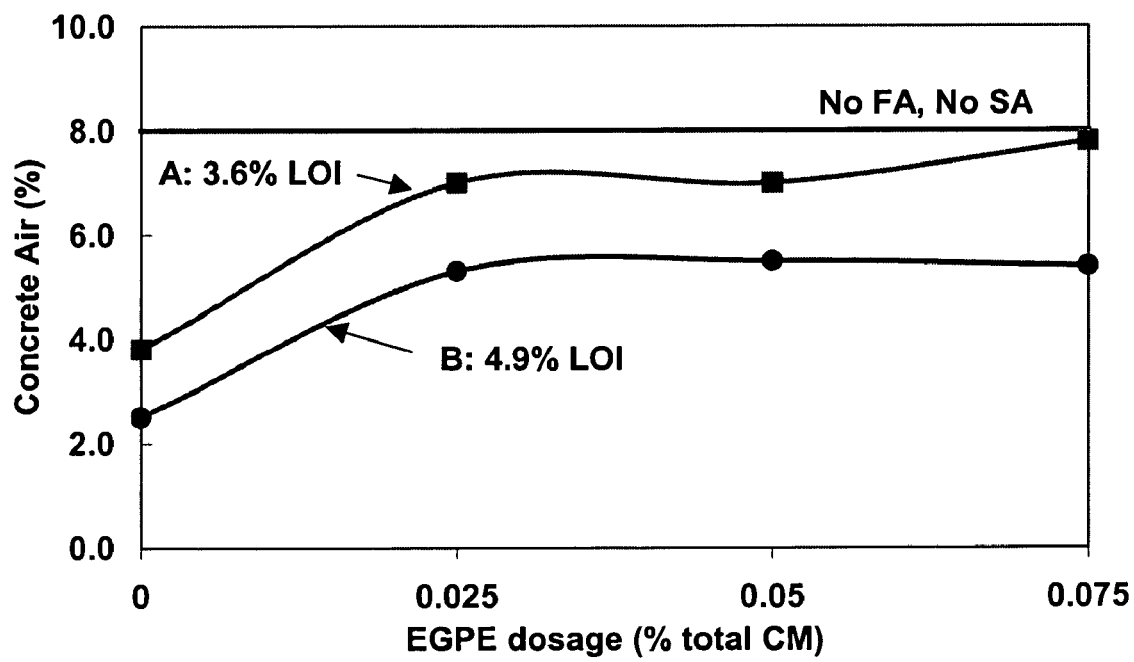
FIG. 4 is a graph based on the results shown in Table 28 below which illustrate the influence of increasing dosages of ethylene glycol phenyl ether (EGPE) on air entrainment in concrete containing 75% PCC cement and 25% H2 fly ash (3.6% LOI (curve A) and 4.9% LOI (curve B)), Air 40 at 0.005 wt %, and sodium di-isopropyl naphthalene sulfonate at 0.0016 wt %. The upper line refers to concrete containing Air 40 at 0.005 wt %, but no fly ash and no sacrificial agents.

(results in FIG. 4)

| Line | Air 40% CM | ND % CM | EGPE % CM | Total SA % CM | ND/EGPE | Cement | Fly ash | Fly ash % | LOI % | Air % |
|---|---|---|---|---|---|---|---|---|---|---|
| 1 | 0.005 | 0.0000 | 0.000 | 0 | | PCC | | | | 8.0 |
| 2 | 0.005 | 0.0000 | 0.000 | 0 | | PCC | H2 | 25 | 3.6 | 3.8 |
| 3 | 0.005 | 0.0016 | 0.000 | 0.002 | | PCC | H2 | 25 | 3.6 | 3.8 |
| 4 | 0.005 | 0.0016 | 0.025 | 0.03 | 1/16 | PCC | H2 | 25 | 3.6 | 7.0 |
| 5 | 0.005 | 0.0016 | 0.050 | 0.07 | 1/31 | PCC | H2 | 25 | 3.6 | 7.0 |
| 6 | 0.005 | 0.0016 | 0.075 | 0.10 | 1/47 | PCC | H2 | 25 | 3.6 | 7.8 |
| 7 | 0.005 | 0.0000 | 0.000 | 0 | | PCC | H2 | 25 | 4.9 | 2.5 |
| 8 | 0.005 | 0.0016 | 0.000 | 0.002 | | PCC | H2 | 25 | 4.9 | 2.5 |
| 9 | 0.005 | 0.0016 | 0.025 | 0.03 | 1/16 | PCC | H2 | 25 | 4.9 | 5.3 |
| 10 | 0.005 | 0.0016 | 0.050 | 0.07 | 1/31 | PCC | H2 | 25 | 4.9 | 5.5 |
| 11 | 0.005 | 0.0016 | 0.075 | 0.10 | 1/47 | PCC | H2 | 25 | 4.9 | 5.4 |

Observations:

In this particular case, the air entrainment is increased to near 'normal' (without fly ash) levels with very low ND:E-GPE ratios and moderate total dosage of the combined sacrificial agent.

Example 25

Influence of sodium di-isopropyl naphthalene sulfonate and ethylene glycol phenyl ether at fixed 1:3 ratio and varying total dosages on air entrainment with Air 40 (0.012 wt %) in B1 fly ash:PCC concrete;
B1 fly ash at four different LOI (Results in Table 29).

Example 26

Influence of sodium di-isopropyl naphthalene sulfonate and ethylene glycol phenyl ether at fixed 1:3 ratio and varying total dosages on air entrainment with Air 40 (0.005 wt %) in E1 fly ash:PCC concrete;

TABLE 29

Figure 5:
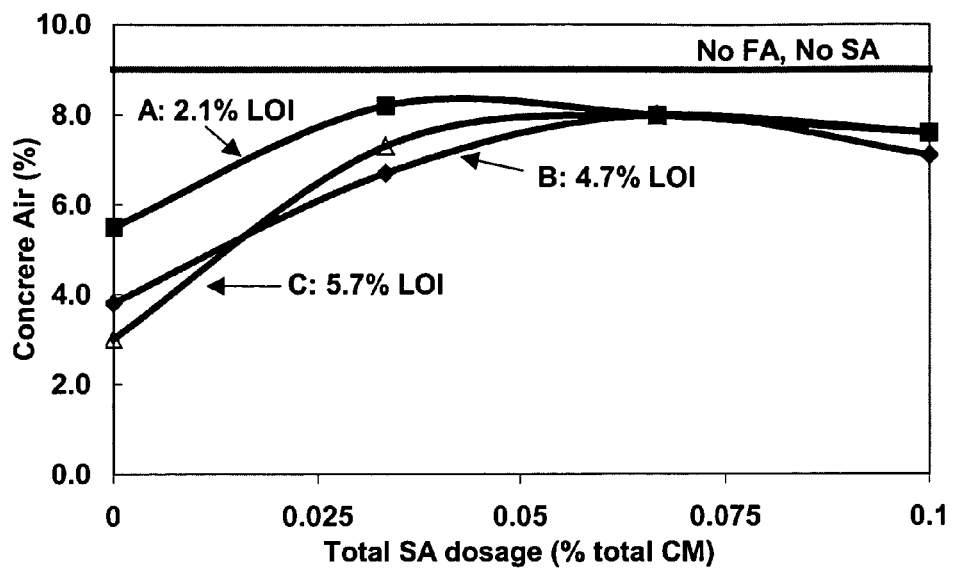
FIG. 5 is a graph based on the results shown in Table 29 below which illustrate the influence of increasing dosages of a 1:3 mixture of ND:EGPE on air entrainment in concrete containing 75% PCC cement and 25% B1 fly ash (2.1% LOI (curve A), 4.7% LOI (curve B) and 5.7% LOI (curve C)) and Air 40 at 0.012 wt %. The upper line refers to concrete containing Air 40 at 0.012 wt %, but no fly ash and no sacrificial agents.

(Results illustrated in FIG. 5)

| Line | Air 40% CM | ND % CM | EGPE % CM | Total SA % CM | ND/EGPE | Cement | Fly ash | Fly ash % | LOI % | Air % |
|---|---|---|---|---|---|---|---|---|---|---|
| 1 | 0.012 | 0.000 | 0.000 | 0 | | PCC | | | | 9.0 |
| 2 | 0.012 | 0.000 | 0.000 | 0 | | PCC | B1 | 25 | 2.06 | 5.5 |
| 3 | 0.012 | 0.008 | 0.025 | 0.03 | 1/3 | PCC | B1 | 25 | 2.06 | 8.2 |
| 4 | 0.012 | 0.017 | 0.05 | 0.07 | 1/3 | PCC | B1 | 25 | 2.06 | 8.0 |
| 5 | 0.012 | 0.025 | 0.075 | 0.10 | 1/3 | PCC | B1 | 25 | 2.06 | 7.6 |
| 7 | 0.012 | 0.000 | 0.000 | 0 | | PCC | B1 | 25 | 3.70 | 3.8 |
| 8 | 0.012 | 0.008 | 0.025 | 0.03 | 1/3 | PCC | B1 | 25 | 3.70 | 6.7 |
| 9 | 0.012 | 0.017 | 0.05 | 0.07 | 1/3 | PCC | B1 | 25 | 3.70 | 8.0 |
| 10 | 0.012 | 0.025 | 0.075 | 0.10 | 1/3 | PCC | B1 | 25 | 3.70 | 7.1 |
| 12 | 0.012 | 0.000 | 0.000 | 0 | | PCC | B1 | 25 | 4.70 | 3.2 |
| 13 | 0.012 | 0.008 | 0.025 | 0.03 | 1/3 | PCC | B1 | 25 | 4.70 | 7.0 |
| 14 | 0.012 | 0.017 | 0.05 | 0.07 | 1/3 | PCC | B1 | 25 | 4.70 | 7.6 |
| 15 | 0.012 | 0.025 | 0.075 | 0.10 | 1/3 | PCC | B1 | 25 | 4.70 | 7.6 |
| 17 | 0.012 | 0.000 | 0.000 | 0 | | PCC | B1 | 25 | 5.74 | 3.0 |
| 18 | 0.012 | 0.008 | 0.025 | 0.03 | 1/3 | PCC | B1 | 25 | 5.74 | 7.3 |
| 19 | 0.012 | 0.017 | 0.050 | 0.07 | 1/3 | PCC | B1 | 25 | 5.74 | 8.0 |
| 20 | 0.012 | 0.025 | 0.075 | 0.10 | 1/3 | PCC | B1 | 25 | 5.74 | 7.6 |

E1 fly ash at two different LOI (Results in Table 30).

TABLE 30

Figure 6:
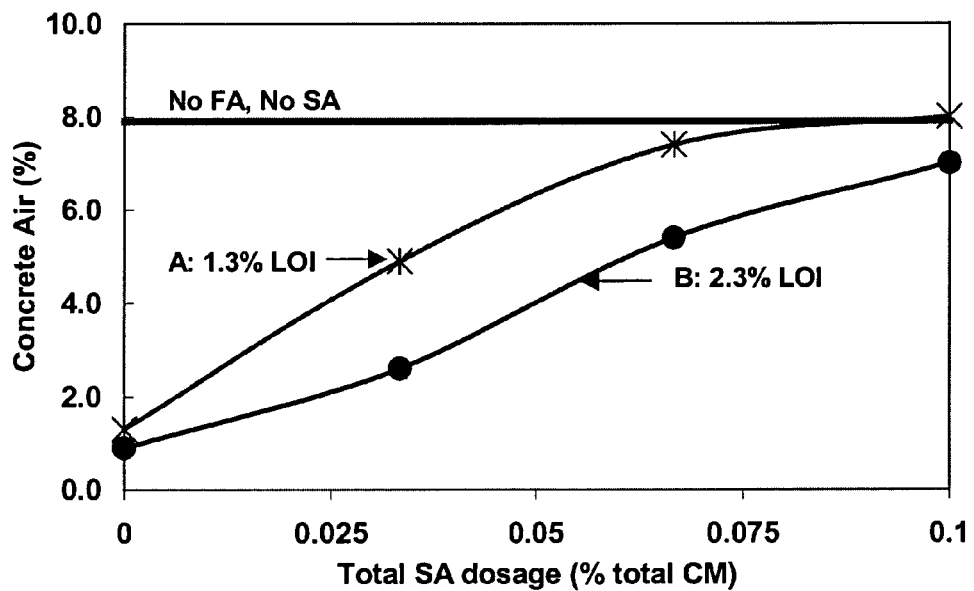
FIG. 6 is a graph based on the results shown in Table 30 below which illustrate the influence of increasing dosages of a 1:3 mixture of ND:EGPE on air entrainment in concrete containing 75% PCC cement and 25% E1 fly ash (1.3% LOI (curve A) and 2.3% LOI (curve B)) and Air 40 at 0.005 wt %. The upper line refers to concrete containing Air 40 at 0.005 wt %, but no fly ash and no sacrificial agents.

(Results shown in FIG. 6)

| Line | Air 40% CM | ND % CM | EGPE % CM | Total SA % CM | ND/EGPE | Cement | Fly ash | Fly ash % | LOI % | Air % |
|---|---|---|---|---|---|---|---|---|---|---|
| 1 | 0.005 | 0.000 | 0.000 | 0 | | PCC | | | | 7.9 |
| 2 | 0.005 | 0.000 | 0.000 | 0 | | PCC | E1 | 25 | 1.28 | 1.3 |
| 3 | 0.005 | 0.008 | 0.025 | 0.03 | 1/3 | PCC | E1 | 25 | 1.28 | 4.9 |
| 4 | 0.005 | 0.017 | 0.050 | 0.07 | 1/3 | PCC | E1 | 25 | 1.28 | 7.4 |
| 5 | 0.005 | 0.025 | 0.075 | 0.10 | 1/3 | PCC | E1 | 25 | 1.28 | 8.0 |
| 6 | 0.005 | 0.000 | 0.000 | 0 | | PCC | E1 | 25 | 2.29 | 0.9 |
| 7 | 0.005 | 0.008 | 0.025 | 0.03 | 1/3 | PCC | E1 | 25 | 2.29 | 2.6 |
| 8 | 0.005 | 0.017 | 0.050 | 0.07 | 1/3 | PCC | E1 | 25 | 2.29 | 5.4 |
| 9 | 0.005 | 0.025 | 0.075 | 0.10 | 1/3 | PCC | E1 | 25 | 2.29 | 7.0 |

Observations:

In this series of tests, the air entrainment agent dosage is high so the % air value in cement-only concrete is high (9%), The % air entrained in FA-cement concrete is not related to the LOI in the absence of sacrificial agent.

Regardless of the % LOI (2.06, 3.7, 4.7 or 5.74), relatively low dosages of the sacrificial agents combination (0.075 wt %) yields % air entrainment values comparable to that in cement-only concrete.

Observations:
Although the LOI values of these FA are relatively low, they sharply reduce the % air when present in concrete (from 7.9% to approximately 1%),
In the presence of increasing dosages of the ND/EGPE combination, the % air values are increased to values close to those in cement-only concrete.

Example 27

Influence of sodium di-isopropyl naphthalene sulfonate and ethylene glycol phenyl ether at fixed 1:3 ratio and varying total dosages on air entrainment with Air 40 (varying dosages) in C1 fly ash:PCC concrete;
C1 fly ash at 0.62% LOI (Results in Table 31).

TABLE 31

Figure 7:
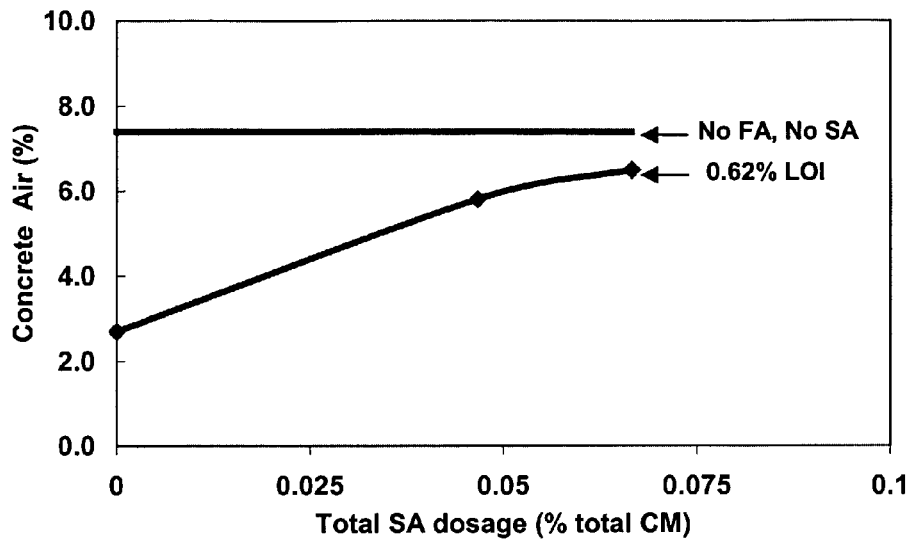
FIG. 7 is a graph based on the results shown in Table 31 below which illustrate the influence of increasing dosages of a 1:3 mixture of ND:EGPE on air entrainment in concrete containing 75% PCC cement and 25% C1 fly ash (0.62% LOI) and Air 40 at 0.003 wt %. The upper line refers to concrete containing Air 40 at 0.003 wt %, but no fly ash and no sacrificial agents.

(results in FIG. 7)

| Line | Air 40% CM | ND % CM | EGPE % CM | Total SA % CM | ND/EGPE | Cement | fly ash | Fly ash % | LOI % | Air % |
|---|---|---|---|---|---|---|---|---|---|---|
| 1 | 0.003 | | | 0.00 | | PCC | | | | 7.4 |
| 2 | 0.003 | | | 0.00 | | PCC | C1 | 25 | 0.62 | 2.7 |
| 3 | 0.003 | 0.012 | 0.035 | 0.05 | 1/3 | PCC | C1 | 25 | 0.62 | 5.8 |
| 4 | 0.003 | 0.017 | 0.050 | 0.07 | 1/3 | PCC | C1 | 25 | 0.62 | 6.5 |
| 5 | 0.003 | | | 0.00 | | PCC | | | | 6.0 |
| 6 | 0.007 | | | 0.00 | | PCC | | | | 8.7 |
| 7 | 0.012 | | | 0.00 | | PCC | | | | 9.4 |
| 8 | 0.000 | 0.008 | 0.025 | 0.03 | 1/3 | PCC | C1 | 25 | 0.62 | 4.5 |
| 9 | 0.004 | 0.008 | 0.025 | 0.03 | 1/3 | PCC | C1 | 25 | 0.62 | 5.5 |
| 10 | 0.008 | 0.008 | 0.025 | 0.03 | 1/3 | PCC | C1 | 25 | 0.62 | 8.1 |
| 11 | 0.012 | 0.008 | 0.025 | 0.03 | 1/3 | PCC | C1 | 25 | 0.62 | 9.2 |

Observations:
 With this particular fly ash, the % air entrained is strongly depressed, in spite of its relatively low LOI value (lines 1-2).
 Addition of increasing amounts of sodium di-isopropyl naphthalene sulfonate and ethylene glycol phenyl ether at a fixed ratio (⅓), allows to recover adequate entrained air levels (lines 3-4).
 Increasing the Air 40 dosage, at fixed content of sodium di-isopropyl naphthalene sulfonate/ethylene glycol phenyl ether, also yields a smooth increase of the air entrained with air entrainment agents dosage as desired in practice (lines 8-11); the latter increase is comparable with the air entrained in cement-only concrete in identical conditions (lines 5-7).

Results Pretaining to the Performance of Sacrificial Agents in the Presence of Activated Carbon Added Intentionnally in the Fly Ash The following examples show the effects of intentionally increasing the carbon content of the fly ash by adding activated carbon; the latter may or may not be similar to the carbon originally present in the fly ash.

In the testing referenced described below, the activated carbon used was DARCO FGD from Norit Americas Inc. This is a lignite coal-based activated carbon manufactured specifically for the removal of heavy metals and other contaminants typically found in incinerator flue gas emission streams. Its use has been reported effective for the removal of mercury in coal combustion gas streams. The material used was 95% minus a 325 sieve with general characteristics of a specific surface area of 600 m$^2$/g and an iodine number of 600 g/mg.

Example 28

Influence of sodium di-isopropyl naphthalene sulfonate and ethylene glycol phenyl ether at fixed 1:3 ratio and total dosage (0.07 wt %) on air entrainment with Air 40 (0.004 wt %) in C1 fly ash:PCC concrete containing activated carbon added at 0.5 and 1 wt % on fly ash;
C1 fly ash at 0.18% LOI, (Results in Table 32).

TABLE 32

| Line | Air 40% CM | ND % CM | EGPE % CM | Total SA % CM | ND/EGPE | Cement | fly ash | fly ash % | LOI % | Air % | Activated Carbon/ fly ash % |
|---|---|---|---|---|---|---|---|---|---|---|---|
| 1 | 0.004 | | | 0.00 | | PCC | C1 | 25 | 0.18 | 5.7 | None |
| 2 | 0.004 | | | 0.00 | | PCC | C1 | 25 | 0.18 | 1.0 | 0.50 |
| 3 | 0.004 | | | 0.00 | | PCC | C1 | 25 | 0.18 | 0.8 | 1.00 |
| 4 | 0.004 | 0.017 | 0.050 | 0.07 | 1/3 | PCC | C1 | 25 | 0.18 | 7.0 | 0.50 |
| 5 | 0.004 | 0.017 | 0.050 | 0.07 | 1/3 | PCC | C1 | 25 | 0.18 | 5.7 | 1.00 |

Observations:
 The addition of low amounts of activated carbon to a concrete containing a low LOI fly ash strongly depresses the level of air entrainment by Air 40 (lines 1-3). Introduction of the sodium di-isopropyl naphthalene sulfonate/ ethylene glycol phenyl ether combination restores the air entrainment to normal levels.

Results Pertaining to the Influence of the Mode of Addition on the Performance of Sacrificial Agents In previous examples, the sacrificial agents were added together with the air entrainment agents during the concrete batching process. The data below relates to alternate means of addition of the sacrificial agents.

Example 29

Comparative air entrainment in B1 fly ash:PCA concrete by Air 30 or Air 40 (varying dosages) and ethylene glycol phenyl ether (0.01 wt %) when the sacrificial agents is added either during batching or pre-mixed with the fly ash; B1 fly ash at 4.7% LOI, (Results in Table 33).

TABLE 33

| Line | ND % CM | EGPE % CM | Total SA % CM | ND/EGPE | Cement | fly ash | Fly ash % | LOI % | Air % |
|---|---|---|---|---|---|---|---|---|---|
| Air 30% CM | | | | | | | | | |
| 1 | 0.006 | 0.100 | 0.10 | | PCA | B1 | 25 | 4.7 | 11.4 |
| 2* | 0.006 | 0.100 | 0.10 | | PCA | B1 | 25 | 4.7 | 10.0 |
| Air 40% CM | | | | | | | | | |
| 1 | 0.003 | 0.100 | 0.10 | | PCA | B1 | 25 | 4.7 | 2.7 |
| 2* | 0.003 | 0.100 | 0.10 | | PCA | B1 | 25 | 4.7 | 2.9 |
| 3 | 0.008 | 0.100 | 0.10 | | PCA | B1 | 25 | 4.7 | 4.9 |
| 4* | 0.008 | 0.100 | 0.10 | | PCA | B1 | 25 | 4.7 | 4.7 |

*premix sacrificial agents with fly ash

Observations:

When the ethylene glycol phenyl ether is premixed to the fly ash material before batching the concrete, the observed % air is comparable to that observed with the simultaneous addition of ethylene glycol phenyl ether, with both types of common air entrainment agents (comparing lines 1 and 2*, 3 and 4*).

The same observation was made for both types of common concrete air entrainment agents Air 30 and Air 40.

Example 30

Comparison of results for sacrificial agents added during concrete mixing, or after concrete mixing. The sacrificial agents combination is sodium di-isopropyl naphthalene sulfonate:ethylene glycol phenyl ether at 1:15 ratio and varying total dosages; H2 fly ash:PCC concrete;
H2 fly ash at 3.96% or 5.7% LOI (Results in Table 34)

The sacrificial agents of the present invention can thus be introduced at various point in the concrete fabrication process, namely: pre-mix with the fly ash before making concrete, during the concrete batching process, before introduction of the air entrainment agents, together with the air entrainment agents, or after the air entrainment agents when the concrete mixing is completed.

Results Pertaining to Properties of Air Void Systems in Fly Ash Concrete Prepared with and without Sacrificial Agents An important aspect of the air entrained in concrete is its distribution within the pastes. Standard concrete practices defined by the American Concrete Institute (ACI) or ASTM provide specific requirements on 'bubble' size, size distribution, surface area, etc. The critical parameters of air voids

TABLE 34

| Line | Air 40% CM | ND % CM | EGPE % CM | Total SA % CM | ND/EGPE | Cement | Fly ash | fly ash % | LOI % | Air % |
|---|---|---|---|---|---|---|---|---|---|---|
| 1 | 0.005 | | | 0.000 | | PCC | H2 | 25 | 3.96 | 2.4 |
| 2* | 0.005 | 0.0017 | 0.025 | 0.027 | 1/15 | PCC | H2 | 25 | 3.96 | 4.5 |
| 3** | 0.005 | 0.0017 | 0.025 | 0.027 | 1/15 | PCC | H2 | 25 | 3.96 | 5.6 |
| 4 | 0.005 | | | 0.000 | | PCC | H2 | 25 | 5.70 | 1.9 |
| 5* | 0.005 | 0.0033 | 0.050 | 0.053 | 1/15 | PCC | H2 | 25 | 5.70 | 4.4 |
| 6** | 0.005 | 0.0033 | 0.050 | 0.053 | 1/15 | PCC | H2 | 25 | 5.70 | 5.1 |

*sacrificial agents added 0-15 minutes after making concrete with Air 40
**sacrificial agents added together with Air 40 during mixing operation Observations:

A comparison of the entries in lines 1-3, or lines 4-6, shows that the sacrificial agents is also effective in increasing air entrainment in fly ash concrete when added after the concrete mixing operation is completed. In this case the % air achieved is somewhat lower than if the sacrificial agents and air entrainment agents are added simultaneously.

obtained in air entrained concrete with and without sacrificial agents are reported in Table 35.

Example 31

Results of Petrographic Analysis of Air Voids Systems for several fly ash concrete (Results in Table 35).

TABLE 35

| | | | | | | | | ACI/ASTM specifications |
|---|---|---|---|---|---|---|---|---|
| Fly ash | None | B1 | B1 | B2 | B2 | H2 | H2 | |
| Fly ash LOI (%) | NA | 5.7 | 5.7 | 1.8 | 4.8 | 2.7 | 4.9 | |
| Air 40 Dosage (% CM) | 0.003 | 0.012 | 0.005 | 0.007 | 0.007 | 0.005 | 0.005 | |
| EGPE (% of total CM) | 0 | 0 | 0.05 | 0 | 0.075 | 0 | 0.05 | |
| ND (% of total CM) | 0 | 0 | 0.013 | 0 | 0.025 | 0 | 0.0016 | |
| Fresh Air Content (%) | 6.0 | 5.9 | 6.3 | 6.0 | 6.0 | 5.2 | 5.5 | |
| Air Content (%) | 7.37 | 7.78 | 6.73 | 8.54 | 6.27 | 5.17 | 6.06 | — |
| Void Frequency (in.$^{-1}$) | 12.77 | 12.43 | 10.35 | 15.13 | 10.24 | 10.42 | 11.05 | Minimum 8 |
| Paste/Air Ratio | 3.10 | 2.58 | 3.22 | 2.73 | 4.01 | 4.16 | 3.97 | Maximum 10 |
| Average Chord Length (in.) | 0.006 | 0.006 | 0.007 | 0.006 | 0.006 | 0.005 | 0.005 | — |
| Specific Surface (in.$^{-1}$) | 693 | 639 | 615 | 709 | 653 | 807 | 729 | Minimum 600 |
| Spacing Factor (in.) | 0.004 | 0.004 | 0.005 | 0.004 | 0.006 | 0.005 | 0.005 | Maximum 0.008 |
| Paste Content (%) | 22.87 | 20.04 | 21.67 | 23.28 | 25.14 | 21.49 | 24.04 | — |
| Coarse Aggregate (%) | 42.84 | 45.87 | 49.51 | 37.67 | 38.91 | 44.01 | 41.94 | — |
| Fine Aggregate (%) | 26.93 | 26.31 | 22.09 | 30.51 | 29.68 | 29.34 | 27.96 | — |
| Traverse Area (In.$^2$) | 14.9 | 14.9 | 14.0 | 14.9 | 14.9 | 14.9 | 14.9 | 11 |
| Traverse Length (in.) | 94.4 | 94.4 | 92.7 | 94.4 | 94.4 | 94.4 | 94.4 | 90 |
| Total Point Counted | 1452 | 1452 | 1426 | 1452 | 1452 | 1452 | 1452 | 1350 |
| Magnification | 65 | 65 | 65 | 65 | 65 | 65 | 65 | 50 |

Observations:

The introduction of the sacrificial agents combination sodium di-isopropyl naphthalene sulfonate/ethylene glycol phenyl ether does significantly influence the air void parameters in the concrete.

Examples Relating to Second Testing Protocol

Example 32

A wide variety of chemical compounds were chosen as potentially useful sacrificial agents and were evaluated through the second test protocol described above. The results obtained for 104 chemicals tested are collected in Table 36 and grouped by families of related compounds; for example, alcohols, polyols, ethers, etc; the entries in Table 36 are as explained below, and the significance of some of these entries is illustrated in FIG. 8.

Col. 1: Chemical name of compound tested as potential sacrificial agent

Col. 2: Level of air entrainment by the candidate sacrificial agent, at a concentration of 0.1 wt %, in a Portland cement paste ('A' in FIG. 8)

Col. 3: Air entrainment by 0.0125 wt % of DDBS in the FA/cement paste in the presence of 0.05 wt % of the candidate sacrificial agent Col. 4: Air entrainment by 0.0125 wt % of DDBS in the FA/cement paste in the presence of 0.10 wt % of the candidate sacrificial agent Col. 5: Sacrificial agent overall rating index (described below)

Col. 6: Hydrophilic-Lipophilic Balance (HLB) values of candidate sacrificial agent (source and significance of HLB data given below)

Col. 7: Logarithm of the Oil(octanol)/water partition coefficient ($K_{ow}$) of the candidate sacrificial agents (source and significance of data given below).

TABLE 36

Data from paste air testing protocol for relative assessment of various candidate sacrificial agents

| | PCA + 0.1% SA | B1 + 0.0125% DDBS + 0.05% SA | B1 + 0.0125% DDBS + 0.1% SA | SA Rating (0-4) | HLB | LogKow |
|---|---|---|---|---|---|---|
| Alcohols | | | | | | |
| Methanol | 0.6 | 1.9 | 2.2 | 0 | 7.5 | −0.63 |
| Ethanol | 1.5 | 3.1 | 3.3 | 0 | 7.0 | −0.14 |
| n-Propanol | 2.0 | 3.5 | 4.4 | 1 | 6.5 | 0.35 |
| i-Propanol | 2.4 | 3.7 | 4.1 | 1 | 6.5 | 0.28 |
| 1-Butanol | 1.2 | 5.9 | 6.5 | 4 | 6.0 | 0.84 |
| 2-Butanol | 1.4 | 6.0 | 6.6 | 4 | 6.0 | 0.77 |
| tert-Butanol | 0.8 | 6.3 | 7.0 | 4 | 6.0 | 0.73 |
| 1-Pentanol | 0.9 | 4.9 | 4.7 | 3 | 5.6 | 1.33 |
| 3-Pentanol | 0.5 | 6.1 | 6.3 | 4 | 5.6 | 1.26 |
| Neopentanol | 0.8 | 4.9 | 4.7 | 3 | 5.6 | 1.22 |
| Hexanol | 0.0 | 4.2 | 2.7 | 1 | 5.1 | 1.82 |
| 1-Octanol | 0.0 | 2.1 | 1.4 | 0 | 4.1 | 2.81 |
| 1-Decanol | 0.0 | 2.1 | 1.7 | 0 | 3.2 | 3.79 |
| Benzyl alcohol | 0.6 | 4.1 | 5.4 | 3 | 5.5 | 1.08 |
| Phenyl ethyl alcohol | 0.7 | 4.5 | 5.5 | 3 | 5.1 | 1.57 |

TABLE 36-continued

Data from paste air testing protocol for relative assessment of various candidate sacrificial agents

| Polyols, diols | | | | | | |
|---|---|---|---|---|---|---|
| Ethylene Glycol | 0.0 | 2.4 | 2.8 | 0 | 8.3 | −1.20 |
| Propylene Glycol | 0.5 | 3.0 | 3.6 | 0 | 7.8 | −0.78 |
| 2,3-Butanediol | 1.2 | 3.6 | 3.7 | 0 | 7.3 | −0.36 |
| Glycerol | 0.1 | n.a. | 2.3 | 2 | 9.1 | −1.65 |
| Inositol | 0.1 | 2.1 | 2.1 | 0 | 11.9 | −2.08 |
| Sorbitol | 0.5 | 2.2 | 4.2 | 1 | 11.6 | −3.01 |
| Ethers | | | | | | |
| Ethylene Glycol Methyl Ether | 0.7 | 3.3 | 4.3 | 1 | 8.2 | −0.91 |
| Ethylene Glycol Ethyl Ether | 1.2 | 5.0 | 6.8 | 4 | 7.3 | −0.42 |
| Ethylene Glycol n-Propyl Ether | 1.4 | 7.4 | 7.4 | 4 | 6.9 | 0.08 |
| Ethylene Glycol n-Butyl Ether | 2.0 | 8.8 | 9.5 | 4 | 6.4 | 0.57 |
| Ethylene Glycol iso-Butyl Ether | 1.7 | 8.8 | 9.5 | 4 | 6.0 | 0.49 |
| Ethylene Glycol Phenyl Ether | 1.5 | 6.9 | 8.1 | 4 | 5.4 | 1.10 |
| Propylene Glycol Phenyl Ether | 1.0 | 7.2 | 6.7 | 4 | 4.9 | 1.52 |
| di-Propylene Glycol mono Methyl Ether | 1.1 | 8.7 | 9.7 | 4 | 7.2 | −0.35 |
| di-Ethylene Glycol Butyl Ether | 2.7 | 9.9 | 11.2 | 4 | 6.7 | 0.29 |
| Ethylene Glycol di-Methyl Ether | 1.5 | 4.9 | 5.8 | 4 | 7.3 | −0.21 |
| p-Dimethoxybenzene | 0.7 | 4.7 | 4.0 | 2 | 6.5 | 2.15 |
| Esters | | | | | | |
| Methylpropionate | 0.2 | 2.7 | 3.5 | 0 | 7.5 | 0.86 |
| Methyloctanoate | 0.0 | 4.8 | 2.2 | 2 | 5.1 | 3.32 |
| Methyllaurate | 1.0 | 4.6 | 2.8 | 1 | 3.2 | 5.28 |
| Methylpalmitate | 2.5 | 5.3 | 3.4 | 2 | 1.3 | 7.25 |
| Methyloleate | 0.5 | 5.1 | 2.7 | 2 | 0.5 | 8.02 |
| Ethyl acetate | 0.8 | 3.2 | 3.3 | 0 | 7.5 | 0.86 |
| E.G. mono-ethyl ether acetate | 0.0 | 4.7 | 4.7 | 2 | 7.7 | 0.59 |
| Ethylpropionate | 0.9 | 4.9 | 4.6 | 3 | 7.0 | 1.36 |
| Ethylbutyrate | 0.7 | 5.2 | 4.3 | 3 | 6.5 | 1.85 |
| Ethylcaproate | 0.0 | 4.3 | 2.4 | 1 | 5.6 | 2.83 |
| N-Butyl phthalate | 0.0 | 2.2 | 2.1 | 0 | 5.0 | 4.61 |
| Dimethyl malonate | 0.2 | 2.5 | 2.6 | 0 | 9.8 | −0.09 |
| Tween 20 (POE(20)sorbitan monolaurate) | 2.6 | 9.2 | 8.5 | 4 | 16.7 | −3.4 |

| | PCA + 0.1% SA | B1 + 0.0125% DDBS + 0.05% SA | B1 + 0.0125% DDBS + 0.1% SA | SA Rating (0-4) | HLB | LogKow(*) |
|---|---|---|---|---|---|---|
| Carboxylic acids and derivatives | | | | | | |
| Hexanoic acid | 2.4 | 5.1 | 4.9 | 4 | 6.5 | −1.76 |
| Oleic acid | 2.1 | 2.2 | 1.9 | 0 | 1.0 | 3.92 |
| Adipic acid | 0.2 | 1.9 | 2.2 | 0 | 9.3 | −5.03 |
| Sodium Salicylate | 0.4 | 2.9 | 3.0 | 0 | 7.8 | −1.49 |
| 4-Hydroxybenzoic acid | 1.0 | 2.1 | 2.4 | 0 | 7.8 | −2.10 |
| 2,5-Dihydroxybenzoic acid | 0.0 | 1.9 | 1.6 | 0 | 9.2 | −1.97 |
| Phenyl acetic acid | 0.2 | 2.8 | 4.2 | 1 | 6.3 | −2.02 |
| 2-Naphthoic acid | 1.3 | 3.2 | 4.2 | 1 | 5.2 | −1.09 |

| | PCA + 0.1% SA | B1 + 0.0125% DDBS + 0.05% SA | B1 + 0.0125% DDBS + 0.1% SA | SA Rating (0-4) | HLB | LogKow |
|---|---|---|---|---|---|---|
| Aromatic Sulfonates | | | | | | |
| 4-Hydroxybenzenesulfonic acid | 0.1 | 2.1 | 2.0 | 0 | 18.5 | −3.43 |
| 4-Ethyl benzene sulfonic acid | 1.3 | 4.8 | 6.2 | 3 | 16.3 | −1.91 |
| 2-Naphthalenesulfonate Na | 1.0 | 4.4 | 5.3 | 3 | 15.2 | −1.78 |
| p-Toluene Sulfonic acid | 0.7 | 3.9 | 5.1 | 3 | 16.4 | −2.40 |
| 2,6-naphthalene disulfonate Na | 0.0 | 2.3 | 3.0 | 0 | 27.5 | −3.51 |
| Naphthalene trisulfonate Na | 0.2 | 2.5 | 2.5 | 0 | 39.7 | −5.25 |
| 4,5-Dihydroxynaphthalene-2,7-disulfonic acid, disodium salt | 0.0 | 2.0 | 2.5 | 0 | 29.9 | −4.48 |
| 4-Amino-3-hydroxynaphthalene sulfonate Na | 0.4 | 3.1 | 2.9 | 0 | 26.0 | −3.17 |
| Methyl naphthalene sulfonate Na | 7.3 | 6.0 | 8.8 | 4 | 15.1 | −1.23 |

TABLE 36-continued

Data from paste air testing protocol for relative assessment of various candidate sacrificial agents

| Amines | | | | | | |
|---|---|---|---|---|---|---|
| Triethylamine | 0.5 | 5.2 | 5.1 | 4 | 12.8 | 1.51 |
| Tripropylamine | 0.3 | 2.6 | 2.4 | 0 | 11.4 | 2.99 |
| n-butyl amine | 1.2 | 5.7 | 8.1 | 4 | 13.5 | 0.83 |
| Aniline (Phenylamine) | 1.7 | 3.7 | 5.6 | 2 | 13.5 | 1.08 |
| Benzyl amine | 1.1 | 4.5 | 6.1 | 3 | 12.0 | 1.07 |
| Alcoholamines | | | | | | |
| Di-ethanolamine | 0.3 | 2.7 | 2.6 | 0 | 16.5 | −1.71 |
| Tri-ethanolamine | 0.6 | 2.5 | 3.1 | 0 | 16.7 | −2.48 |
| 2-(2-Aminoethoxy)ethanol | 0.5 | 3.1 | 3.9 | 1 | 16.1 | −1.89 |
| Di-isopropanolamine | 1.1 | 4.6 | 5.5 | 3 | 15.6 | −0.88 |
| Tri-isopropanolamine | 1.3 | 5.6 | 7.6 | 4 | 15.5 | −1.22 |
| 2,3-diaminopropionic acid monohydrochloride | 0.3 | 1.7 | 1.9 | 0 | 26.7 | −4.46 |
| Amides | | | | | | |
| Urea | 0.1 | n.a. | 2.0 | 2 | 25.2 | −1.56 |
| Dimethylurea | 0.5 | n.a. | 2.9 | 2 | 24.4 | −0.62 |
| n-butyl urea | 2.1 | 5.3 | 7.5 | 4 | 23.4 | 0.38 |
| Ammonium salts | | | | | | |
| Tetramethyl ammonium hydroxide | 0.1 | 2.5 | 2.9 | 0 | 14.9 | −2.47 |
| Tetraethyl ammonium hydroxide | 0.1 | 2.3 | 3.0 | 0 | 13.0 | −0.51 |
| Tetrapropyl ammonium hydroxide | 0.6 | 3.9 | 4.8 | 3 | 11.1 | 1.45 |
| Tetrabutyl ammonium chloride | 0.6 | 4.9 | 4.1 | 3 | n.a. | 1.71 |
| Benzyltnmethyl ammonium hydroxide | 1.0 | 2.3 | 3.0 | 0 | 11.9 | −0.77 |
| Polyglycols | | | | | | |
| tri-Ethylene Glycol | 0.9 | 3.1 | 4.1 | 1 | 9.0 | −1.75 |
| Polyethylene glycol 200 | 0.9 | 4.3 | 5.7 | 3 | 9.3 | −2.02 |
| Polyethylene glycol 400 | 1.0 | 8.1 | 9.6 | 4 | 11.1 | −3.26 |
| Polyethylene glycol 2000 | 2.1 | 10.2 | 11.5 | 4 | n.a. | n.a. |
| tri-Propylene glycol | 1.6 | 7.8 | 9.2 | 4 | 7.6 | −0.50 |
| Polypropylene glycol 425 | 0.8 | 9.7 | 11.2 | 4 | 7.0 | 0.08 |
| Polypropylene glycol 2200 | 0.0 | 1.5 | 1.0 | 0 | 3.2 | 4.37 |
| P(EG-ran-propylene-glycol) 2500 | 2.3 | 9.8 | 12.2 | 4 | n.a. | n.a. |
| PEO-PPO 0.33:1 triblock copolymer | 1.7 | 3.1 | 3.0 | 0 | n.a. | 3.52 |
| Phosphates | | | | | | |
| Sodium phosphate dibasic | 0.0 | 2.1 | 2.3 | 0 | n.a. | −5.80 |
| Dimethylphosphate Na | 1.3 | 2.5 | 2.7 | 0 | n.a. | −0.66 |
| Sodium tripolyphosphate | 0.2 | 2.2 | 1.9 | 0 | n.a. | −13.26 |
| Miscellaneous | | | | | | |
| 2-Butanone (Methyl ethyl ketone) | 0.3 | 3.7 | 4.1 | 1 | 6.2 | 0.26 |
| Methyl isobutylketone (MIBK) | 0.3 | 5.6 | 3.9 | 2 | 5.2 | 1.16 |
| Dimethylsulfoxide | 0.0 | 2.5 | 3.1 | 0 | n.a. | −1.22 |
| Ethylene carbonate | 0.0 | 2.5 | 1.9 | 0 | 19.8 | −0.34 |
| Propylene carbonate | 0.4 | 2.5 | 2.9 | 0 | 18.9 | 0.08 |
| Acetonitrile | 0.5 | 2.3 | 2.5 | 0 | n.a. | −0.15 |
| Buryraldehyde | 0.0 | 4.0 | 4.0 | 2 | 6.4 | 0.82 |
| 1-Methyl-2-Pyrrolidinone | 1.9 | 3.6 | 3.8 | 0 | 15.1 | −0.10 |
| 1-Ethyl-2-Pyrrolidinone | 2.5 | 4.3 | 5.6 | 3 | 14.6 | 0.38 |
| n-Vinyl-2-Pyrrolidinone | 2.8 | 3.7 | 4.3 | 1 | 14.9 | 0.25 |
| Alpha-Pinene | 0.4 | 2.4 | 2.9 | 0 | 2.5 | 4.27 |

(*)Sodium salts

REFERENCES

1. Dodson, V., Concrete admixtures. Structural Engineering Series, Ed. Van Nostrand Reinhold, New York, 211 pp., 1990.
2. Rixom, R. and Mailvaganam N., Chemical Admixtures for Concrete. 3$^{rd}$ Ed. E&FN SPON, London, Chap. 3, 437 pp., 1999.
3. Ramachandran, V. S., Concrete Admixtures Handbook. Properties, Sciences, and Technology. Ed. Noyes, New Jersey, 626 pp., 1984.
4. Griffin, W. C., Classification of Surface Active Agents by "HLB", Journal of the Society of Cosmetic Chemists, V 1, pp. 311-326, 1949

5. Griffin, W. C., Calculation of HLB Values of Non-Ionic Surfactants, Journal of the Society of Cosmetic Chemists, V 5, pp. 249-259, 1954
6. 'The HLB Sytem, A time-saving guide to emulsifier selection', Ed., Chemmunique, Publication by ICI Americas Inc., 1980.
7. Adamson A. W. and Gast A. P., Physical Chemistry of Surfaces, Ed. John Wiley&Sons, Inc., $6^{th}$ ed., 1997.
8. Davies, J. T., Proc. $2^{nd}$ International Congress on Surface Activity, London, Vol. 1, p.426, 1957.
9. McGowan, J. C., A new approach for the calculation of hydrophile-lipophile balance values of surfactants, Tenside, Surfactants, Detergents, V 27(4), pp. 229-230, 1990
10. Sowada, R. and McGowan, J. C., Calculation of hydrophile-lipophile balance (HLB) group numbers for some structural units of emulsifying agents, Tenside, Surfactants, Detergents, V 29(2), pp. 109-113, 1992.
11. Meylan, W. M. and Howard, P. H., Atom/fragment contribution method for estimating octanol-water partition coefficients, J. Pharm. Sci. V 84, pp. 83-92, 1995. and Interactive LogKow (KowWin) Demo, http://esc.syrres.com/interkow/kowdemo.htm, Syracuse Research Corporation, North Syracuse, N.Y.
12. Interactive PhysProp Database Demo, http://esc.syrres.com/interkow/physdemo.htm, Syracuse Research Corporation, North Syracuse, N.Y.
13. Tetko, I. V.; Tanchuk, V. Yu. Application of Associative Neural Networks for Prediction of Lipophilicity in ALOGPS 2.1 Program. J. Chem. Inf. Comput. Sci., V 42(5), pp. 1136-1145, 2002, and Tetko, I. V and Tanchuk, V. Y., http://146.107.217.178/lab/alogps/start.html, Virtual Computational Chemistry Laboratory.

The disclosures of the above references are specifically incorporated herein by reference.

What we claim is:

1. A method of reducing or eliminating the effect of fly ash or other combustible ashes on air entrainment in an air-entraining cementitious mixture, comprising the steps of:
   forming a cementitious mixture comprising water, cement, fly ash or another combustible ash, and an air entrainment agent, and entraining air in the mixture;
   wherein a sacrificial agent is also included in the cementitious mixture in at least the amount necessary to neutralize the detrimental effects of components of said fly ash or other combustible ash on air entrainment activity, the sacrificial agent comprising a material or mixture of materials that, when present in the same cementitious mixture without fly ash or the other combustible ash in said amount causes less than 2 vol. % additional air content in the cementitious mixture,
   wherein the sacrificial agent comprises an organic compound, with the proviso that said sacrificial agent does not comprise polyethylene glycol (PEG) or aromatic compounds having carboxylic acid groups, or salts thereof.

2. The method of claim 1, wherein said amount of said sacrificial agent exceeds an amount necessary to neutralize said detrimental effects of said components of said fly ash or other combustible ash.

3. The method of claim 1, wherein said fly ash or other combustible ash may vary in content of said components from a minimum content to a maximum content according to a source or batch of said fly ash or other combustible ash, and wherein said amount of said at least one sacrificial agent exceeds an amount necessary to neutralize said detrimental effects of said components of said fly ash when present in said maximum content.

4. The method of claim 1, wherein said sacrificial agent comprises a compound selected from the group consisting of aromatic compounds bearing either sulfonate or amino functional groups or combinations of said groups, glycols and glycol derivates having molecular weights of 2000 Da or less, and mixtures thereof, with the proviso that said glycol derivative is not polyethylene glycol (PEG).

5. The method of claim 1, wherein said sacrificial agent comprises a compound selected from the group consisting of benzylamine, sodium 2-naphthalene sulfonate, sodium di-isopropyl naphthalene sulfonate, sodium cumene sulfonate, sodium di-butyl naphthalene sulfonate, ethylene glycol phenyl ether, ethylene glycol methyl ether, butoxyethanol, di-ethylene glycol butyl ether, di-propylene glycol methyl ether, 1-phenyl 2-propylene glycol, and mixtures thereof.

6. The method of claim 1, wherein said sacrificial agent comprises a member of a class of organic chemicals, said class being selected from the group consisting of alcohols, diols, polyols, ethers, esters, carboxylic acids, carboxylic acid derivatives, aromatic sulfonates, amines, alcoholamines, amides, ammonium salts, polyglycols, and mixtures thereof, with the provisos that said polyglycols are not polyethylene glycols, and said carboxylic acids and said carboxylic acid derivatives are not aromatic carboxylic acids or salts thereof.

7. The method of claim 6, wherein said sacrificial agent has a value of $LogK_{ow}$ in the range of −3 to +2.

8. The method of claim 6, wherein said sacrificial agent has a value of $LogK_{ow}$ in the range of −2 to +2.

9. The method of claim 6, wherein said sacrificial agent has an HLB value in the range of 5 to 20.

10. The method of claim 9, wherein said sacrificial agent is a mixture of compounds of different HLB values that together provide the sacrificial agent with an HLB value in said range of 5 to 20.

11. The method of claim 1, wherein said sacrificial agent comprises an alcohol selected from the group consisting of n-propanol, i-propanol, 1-butanol, 2-butanol, tertiary butanol, 1-pentanol, 3-pentanol, neopentanol, hexanol, benzyl alcohol phenylethyl alcohol, and mixtures thereof.

12. The method of claim 1, wherein said sacrificial agent comprises an ether selected from ethylene glycol methyl ether, ethylene glycol ethyl ether, ethylene glycol n-propyl ether, ethylene glycol n-butyl ether, ethylene glycol iso-butyl ether, ethylene glycol phenyl ether, propylene glycol phenyl ether, di-propylene glycol mono methyl ether, di-ethylene glycol butyl ether, ethylene glycol di-methyl ether, tri-ethylene glycol, tri-propylene glycol, polypropylene glycol 425 and P(EG-ran-propylene-glycol) 2500, p-dimethoxybenzene, and mixtures thereof.

13. The method of claim 1, wherein said sacrificial agent comprises an ester selected from the group consisting of methyloctanoate, methyllaurate, methylpalmitate, methyloleate, ethylene glycol mono-ethyl ether acetate, ethylpropionate, ethylbutyrate, ethylcaproate, POE(20) sorbitan monolaurate, and mixtures thereof.

14. The method of claim 1, wherein said sacrificial agent comprises hexanoic acid.

15. The method of claim 1, wherein said sacrificial agent comprises an aromatic sulfonate selected from the group consisting of 4-ethyl benzene sulfonic acid, 2-naphthalenesulfonate Na, p-toluene sulfonic acid, methyl naphthalene sulfonate, and mixtures thereof.

16. The method of claim 1, wherein said sacrificial agent comprises an amine selected from the group consisting of triethylamine, n-butyl amine, aniline, benzyl amine, and mixtures thereof.

17. The method of claim 1, wherein said sacrificial agent comprises an alcoholamine selected from the group consisting of 2-(2-aminoethoxy)ethanol, di-isopropanolamine, tri-isopropanolamine, and mixtures thereof.

18. The method of claim 1, wherein said sacrificial agent comprises an amide selected from the group consisting of urea, dimethlyurea, n-butyl urea, and mixtures thereof.

19. The method of claim 1, wherein said sacrificial agent comprises an ammonium salt selected from the group consisting of tetrapropyl ammonium hydroxide, tetrabutyl ammonium chloride, and mixtures thereof.

20. The method of claim 1, wherein said sacrificial agent comprises a polyglycol selected from the group consisting of tri-ethylene glycol, tri-propylene glycol, polypropylene glycol 425, P(EG-ran-propylene-glycol) 2500,and mixtures thereof.

21. The method of claim 1, wherein said sacrificial agent comprises a compound selected from the group consisting of 2-butanone, methylisobutylketone, butyraldehyde, 1-ethyl-2-pyrrolidinone, N-vinyl-2-pyrrolidinone, and mixtures thereof.

22. The method of claim 1, wherein the sacrificial agent present is a mixture of two or more compounds.

23. The method of claim 1, wherein said sacrificial agent comprises a compound having hydrophobic lipophilic balance rating in the range of 5 to 20.

24. The method of claim 1, wherein said sacrificial agent comprises a compound for which $LogK_{ow}$ is in the range of −3 to +2.

25. The method of claim 1, wherein said sacrificial agent comprises a compound for which $LogK_{ow}$ is in the range of −2 to +2.

26. The method of claim 1, wherein said sacrificial agent comprises a compound having a second protocol ranking of 1 or more.

27. The method of claim 1, wherein said sacrificial agent comprises a compound having a second protocol ranking of 2 or more.

28. The method of claim 1, wherein said sacrificial agent comprises a compound having a second protocol ranking of 3 or more.

29. The method of claim 1, wherein said sacrificial agent comprises a compound having a second protocol ranking of 4.

30. The method of claim 1, wherein said sacrificial agent comprises a combination of ethylene glycol phenyl ether and sodium di-isopropyl naphthalene sulfonate.

31. The method of claim 30, wherein the relative proportion of said ethylene glycol phenyl ether and said sodium di-isopropyl naphthalene sulfonate is in the range of relative weight ratios between 1:5 and 50:1.

32. The method of claim 1, wherein said sacrificial agent is mixed with said air entrainment agent prior to mixing said sacrificial agent and said air entrainment agent with the fly ash or other combustible ash, cement and water.

33. The method of claim 1, wherein said sacrificial agent is mixed with the fly ash or other combustible ash prior to mixing said sacrificial agent and said fly ash or other combustible ash with said cement, water and said air entrainment agent.

34. The method of claim 33, wherein said sacrificial agent is added to said fly ash or other combustible ash by spraying a liquid comprising said sacrificial agent onto said fly ash or other combustible ash.

35. The method of claim 33, wherein said sacrificial agent is added to said fly ash or other combustible ash by mixing a spray-dried solid containing said sacrificial agent with said fly ash or other combustible ash.

36. The method of claim 1, wherein said sacrificial agent is added after the fly ash or other combustible ash, cement, water and air entrainment agent have been mixed together.

37. The method of claim 1, wherein said amount of sacrificial agent is at least 0.01% by weight of said fly ash or other combustible ash.

38. The method of claim 1, wherein said amount of sacrificial agent is in the range of 0.01 to 2.0% by weight of said fly ash or other combustible ash.

39. The method of claim 1, wherein said amount of sacrificial agent is in the range of 0.1 to 1.0% by weight of said fly ash or other combustible ash.

40. The method of claim 1, wherein said amount of said sacrificial agent is in the range of 0.01% to 0.5% by weight of the total amount of cementitious material including said fly ash or other combustible ash.

41. The method of claim 1, wherein said amount of said sacrificial agents is in the range of 0.01% to 0.2% by weight of the total amount of cementitious material including fly ash or other combustible ash.

42. The method of claim 1, wherein an additional material selected from the group consisting of sand, aggregate, concrete modifier, and combinations thereof, is incorporated into said mixture.

43. The method of claim 1, wherein said cementitious mixture is formed by mixing an amount of said sacrificial agent with said fly ash or other combustible ash to form a pre-treated fly ash or other combustible ash, and then mixing said pre-treated fly ash or other combustible ash with said water, said air entrainment agent and said cement.

44. The method of claim 1, wherein said cementitious mixture is formed by mixing said air entrainment agent and said sacrificial agent to form a component mixture, and then mixing said component mixture with said water, fly ash or other combustible ash and cement, and entraining said air in said mixture.

45. The method of claim 1, wherein water, cement, fly ash or other combustible ash, air entrainment agent and sacrificial agent are mixed together simultaneously while entraining said air in the mixture.

46. The method of claim 1, wherein said sacrificial agent is mixed with said water, cement and fly ash or other combustible ash before said air entrainment agent is added.

47. The method of claim 1, wherein said sacrificial agent is mixed with said water, cement and fly ash or other combustible ash at the same time as said air entrainment agent.

48. The method of claim 6, wherein the sacrificial agent comprises an ether.

49. The method of claim 48, wherein the ether is further defined as a glycol ether.

50. The method of claim 49, wherein the glycol ether comprises ethylene glycol methyl ether, ethylene glycol ethyl ether, ethylene glycol n-propyl ether, ethylene glycol n-butyl ether, ethylene glycol iso-butyl ether, ethylene glycol phenyl ether, propylene glycol phenyl ether, di-propylene glycol mono methyl ether, di-ethylene glycol butyl ether, ethylene glycol di-methyl ether, tri-ethylene glycol, tri-propylene glycol, P(EG-ran-propylene-glycol) 2500, or mixtures thereof.

51. The method of claim 50, wherein the glycol ether comprises ethylene glycol phenyl ether.

52. The method of claim 48, wherein the ether is further defined as a polyglycol ether.

53. The method of claim 52, wherein the polyglycol ether comprises polypropylene glycol 425, P(EG-ran-propylene-glycol) 2500, or mixtures thereof.

54. The method of claim 1, wherein said fly ash or other combustible ash consists essentially of fly ash.

55. The method of claim 1, wherein said fly ash or other combustible ash comprises a blend of fly and another combustible ash.

56. The method of claim 6, wherein the sacrificial agent comprises an amine.

57. The method of claim 22, wherein the mixture of two or more compounds together have a hydrophobic lipophilic balance rating in the range of 5 to 20.

58. The method of claim 22, wherein the mixture of two or more compounds together have a $LogK_{ow}$ is in the range of −3 to +2.

59. The method of claim 22, wherein the mixture of two or more compounds together have a $LogK_{ow}$ is in the range of −2 to +2.

60. The method of claim 1, wherein the sacrificial agent, when present in the same cementitious mixture without fly ash or the other combustible ash in said amount causes less than 1 vol. % additional air content in the cementitious mixture.

61. The method of claim 1, further comprising the step of selecting a sacrificial agent comprising a material or mixture of materials to reduce or eliminate the effect of fly ash or another combustible ash on air entrainment in a cementitious mixture and selecting an amount of the sacrificial agent such that the amount is at least an amount necessary to neutralize the detrimental effects of components of said fly ash on air entrainment activity and the amount of sacrificial agent causes less than 2 vol. % additional air content in the same cementitious mixture without fly ash or the other combustible ash.

62. The method of claim 61, wherein said fly ash or other combustible ash has a predetermined maximum carbon content and the amount of sacrificial agent exceeds the amount necessary to neutralize the maximum carbon content in the fly ash or other combustible ash.

63. The method of claim 2, wherein the sacrificial agent amount used does not result in a substantial increase in air entrainment compared to providing the sacrificial agent in an amount necessary to neutralize the detrimental effects of components of said fly ash on air entrainment activity.

64. The method of claim 63, wherein the sacrificial agent causes less than 2 vol. % additional air content in the cementitious mixture without fly ash.

65. The method of claim 1, wherein said components are carbon content.

66. A method of reducing or eliminating the effect of fly ash on air entrainment in an air-entraining cementitious mixture, comprising the steps of:

forming a cementitious mixture comprising water, cement, fly ash, and an air entrainment agent, and entraining air in the mixture;

wherein a sacrificial agent is also included in the cementitious mixture in at least the amount necessary to neutralize the detrimental effects of the carbon content of said fly ash on air entrainment activity, the sacrificial agent comprising a material or mixture of materials that, when present in the same cementitious mixture without fly ash in said amount causes less than 2 vol. % additional air content in the cementitious mixture, wherein the sacrificial agent comprises an organic compound, with the proviso that said sacrificial agent does not comprise polyethylene glycol (PEG) or aromatic compounds having carboxylic acid groups, or salts thereof.

67. A method of addressing the variance of carbon content in fly ash used in cementitious compositions to provide a cementitious composition with a substantially constant level of air entrainment, comprising:

forming a cementitious mixture comprising water, cement, fly ash, an air entrainment agent, and a sacrificial agent and entraining air in the mixture, wherein the fly ash has a maximum carbon content; and selecting a sacrificial agent for the cementitious mixture and an amount of the sacrificial agent such that the amount of the sacrificial agent exceeds the amount necessary to neutralize the maximum carbon content in the fly ash, wherein the sacrificial agent comprises a material or mixture of materials that, when present in the same cementitious mixture without fly ash in said amount causes less than 2 vol. % additional air content in the cementitious mixture, and wherein the sacrificial agent comprises an organic compound, with the proviso that said sacrificial agent does not comprise polyethylene glycol (PEG) or aromatic compounds having carboxylic acid groups, or salts thereof.

* * * * *